(12) United States Patent
Xavier

(10) Patent No.: US 7,009,623 B2
(45) Date of Patent: *Mar. 7, 2006

(54) IMAGE PROCESSING APPARATUS AND METHOD, RECORDING MEDIUM, AND PROGRAM THEREOF

(75) Inventor: Michel Xavier, Chiba (JP)

(73) Assignee: Sony Corporation, Tokyo (JP)

( * ) Notice: Subject to any disclaimer, the term of this patent is extended or adjusted under 35 U.S.C. 154(b) by 39 days.

This patent is subject to a terminal disclaimer.

(21) Appl. No.: 11/081,602

(22) Filed: Mar. 17, 2005

(65) Prior Publication Data

US 2005/0157951 A1  Jul. 21, 2005

Related U.S. Application Data

(63) Continuation of application No. 10/694,781, filed on Oct. 29, 2003.

(30) Foreign Application Priority Data

Oct. 31, 2002  (JP)  .............................. 2002-318276

(51) Int. Cl.
*G09G 5/00* (2006.01)
(52) U.S. Cl. ...................... 345/606; 345/610; 345/611; 345/581; 345/629; 345/643
(58) Field of Classification Search ................ 345/606, 345/610, 611, 581, 629, 643
See application file for complete search history.

(56) References Cited

U.S. PATENT DOCUMENTS

| | | | |
|---|---|---|---|
| 5,790,269 A | 8/1998 | Masaki et al. | |
| 5,872,902 A | 2/1999 | Kuchkuda et al. | |
| 6,016,151 A | 1/2000 | Lin | |
| 6,626,216 B1 | 9/2003 | Minagoshi | |
| 6,665,454 B1 | 12/2003 | Silverbrook et al. | |
| 6,731,300 B1 * | 5/2004 | Ramani et al. | ............. 345/611 |
| 6,756,989 B1 * | 6/2004 | Morgan et al. | ............. 345/582 |
| 6,803,989 B1 | 10/2004 | Silverbrook | |
| 6,819,333 B1 * | 11/2004 | Sadowski | ................... 345/647 |
| 6,823,091 B1 * | 11/2004 | Slavin | ........................ 382/300 |
| 6,828,983 B1 | 12/2004 | Vijayakumar et al. | |
| 6,879,329 B1 * | 4/2005 | Katayama et al. | ........... 345/629 |
| 6,894,699 B1 * | 5/2005 | Someya et al. | ............. 345/611 |

FOREIGN PATENT DOCUMENTS

| | | |
|---|---|---|
| JP | 62-043989 | 2/1987 |
| JP | 2002-215121 | 7/2002 |
| JP | 2003-016442 | 1/2003 |

* cited by examiner

*Primary Examiner*—Matthew C. Bella
*Assistant Examiner*—Mike Rahmjoo
(74) *Attorney, Agent, or Firm*—Oblon, Spivak, McClelland, Maier & Neustadt

(57) ABSTRACT

An image processing apparatus is provided for accurately recognizing an edge direction to perform an accurate image interpolation. A direction determining unit recognizes an edge direction of a remarked pixel and outputs it with information on its position to a reliability ranking unit and a directional distribution generating unit. A direction interpolating unit interpolates the remarked pixel in terms of directional interpolation. The reliability ranking unit determines whether or not a interpolated pixel is properly interpolated by the direction interpolating unit, ranks its reliability, and outputs a result to a directional distribution generating unit. This directional distribution generating unit generates directional distribution based on directional information and reliability information. A direction selecting unit recognizes an edge direction based on the directional distribution generated by the directional distribution generating unit.

1 Claim, 44 Drawing Sheets

☐ A AREA
⌷ B AREA

DIRECTION CALCULATION (N=3)

DIRECTION CALCULATION (N=3)

FIG. 51
A 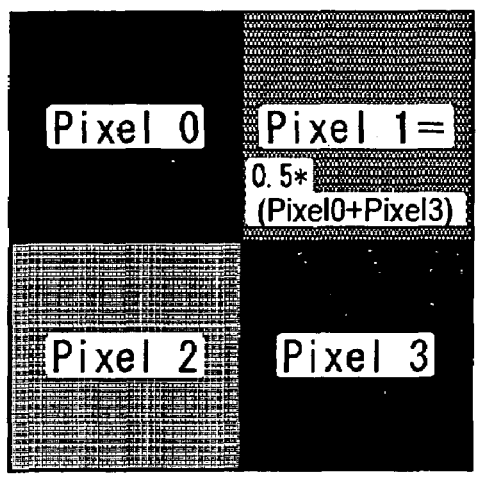 B 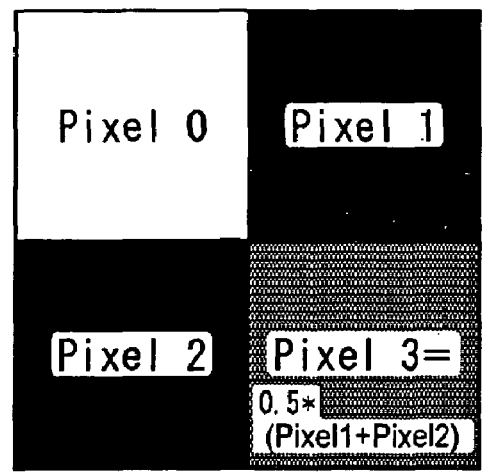

IMAGE PROCESSING APPARATUS AND METHOD, RECORDING MEDIUM, AND PROGRAM THEREOF

CROSS REFERENCES TO RELATED APPLICATIONS

The present invention claims priority to its priority document No. 2002-318276 filed in the Japanese Patent Office on Oct. 31, 2002, and U.S. patent application Ser. No. 10/694,781 filed Oct. 29, 2003, the entire contents of which being incorporated by reference herein.

BACKGROUND OF THE INVENTION

1. Field of the Invention

The present invention relates to an apparatus and a method, and a recording medium storing a computer executable program for image processing, and particularly to an apparatus and a method, and a recording medium a computer executable program for image processing, which are applicable to a variety of sources such as still images and moving images and allow redrawing of images with clear and natural edges and texture in such a manner that it appeals to human visual sense, whereby making it possible to obtain high-resolution images of high quality.

2. Description of the Related Art

With an increase in opportunities to use digital image-based equipment (digital camera and camera-built-in type video tape recorder), there is a growing need for so-called digital zoom processing. Various methods have been devised to increase the resolution of digital images. Many of related art methods includes the following three methods. The first method is a zero-order-hold interpolation using adjacent pixels as they are. It is a simple interpolation method especially in terms of hardware. The second method is a bilinear interpolation method inserting new pixels both in the vertical and horizontal directions. For interpolation of adjacent pixels, it is considered as a very good method. The third method is a B-spline interpolation method that is resistant to noise and does not produce mosaic patterns.

Also, edges are so enhanced that an interlace screen may be converted to a progressive screen. (for example, see Japanese Patent Application Laid-open 2002-215121).

SUMMARY OF THE INVENTION

However, the first method can produces only a small effect with a particularly high magnification resulting notorious noise that is known as "mosaic pattern" in its magnified image. Further, edges are greatly damaged, creating jaggies presenting nothing but gross eyesore. The second method has a drawback in generating a fuzzy overall image, and the resolution of the image would not be improved. Further, the third method produces a considerably blurred image, and, relatively speaking, its hardware is also complicated.

In order to solve the above-mentioned problem, it is proposed in Japanese Patent Application Laid-open No. 2001-201729 to interpolate a pixel of interest from pixels on either direction of a diagonal line passing therethrough, the pixel present above or under the line adjacent thereto or on the left or on the right column thereof so as to enlarge an image so that edges in the image may be enhanced. The pixel of interest will be referred to as "remarked pixel" in the following sections of the instant patent application. However, in interpolating the pixel, correlation between the pixel to be interpolated and a pixel thereon or thereunder or an adjacent pixel at the left or the right thereof is obtained, whereas, if correlation cannot be identified, it is so arranged that linear interpolation between the pixels thereon and thereunder or at the left or the right thereof may be performed. Consequently, a correct interpolation of the pixel cannot necessarily be generated. For example, in some cases, it is not possible to use a pixel due to be interpolated between the pixels adjacent to the remarked pixel in a slant direction. Accordingly, there is a problem such that an enlarged, clear image may not generate as a result.

The present invention is made in view of situation described above, and is provided so as to enable suppression of an image error, which may occur at the time of a resolution change process, in an efficient and simple manner with little computational processing load. The resolution change process may be performed on various types of still images and motion images ranging from computer graphics to photographs.

A first image processing apparatus according to one embodiment of the present invention has: energy calculating means for calculating a central pixel energy at a pixel position of interest; edge enhancement means for enhancing an edge based on the central pixel energy calculated by the energy calculating means; edge direction detecting means for detecting a direction of the edge enhanced by the edge enhancement means; linear interpolation means for interpolating a linear interpolated pixel at the pixel position of interest by linear interpolation; selected direction interpolating means for interpolating a selected direction interpolated pixel in a selected direction at the pixel position of interest based on the edge direction detected by the edge direction detecting means, and compositing and interpolating means for interpolating a composition interpolated pixel by compositing the linear interpolated pixel and the selected direction interpolated pixel.

The energy calculating means may be configured to calculate the central pixel energy in the horizontal or vertical direction of a predetermined pixel of the original image from pixel values of adjacent pixels present in a proximity of the pixel.

The image processing apparatus may be configured to further include; maximum and minimum value detecting means for detecting a maximum value and a minimum value of pixel values of pixels that are arrayed in the vertical direction or horizontal direction while having the predetermined pixel at the center, the pixels being included in the adjacent pixels used by the energy calculating means; first comparing means for comparing the central pixel energy with the minimum value and a predetermined threshold value, the predetermined threshold value being greater than the minimum value and smaller than the maximum value; and texture enhancing means for enhancing texture based on the central pixel energy calculated by the energy calculating means. Furthermore, the texture enhancing means may be configured to judges that the predetermined pixel belongs to a texture area and a filter processing is performed to enhance the texture if the central pixel energy is found to be equal or greater than the minimum value and smaller than the threshold according to a first comparison result of the first comparing means.

The filter processing may be configured to be one-dimensional filter processing that is performed by adding products that are obtained by multiplying predetermined filter coefficients and corresponding pixels.

The predetermined filter coefficient may be configured to have a value corresponding to the central pixel energy.

The filter processing may be configured to be respectively carried out in the vertical direction and the horizontal direction of the original image.

The image processing apparatus may be configured to further include: maximum and minimum value detecting means for detecting a maximum value and a minimum value of pixel values of pixels that are arrayed in the vertical direction or horizontal direction while having the predetermined pixel at the center, the pixels being included in the adjacent pixels used by the energy calculating means; and second comparing means for comparing the central pixel energy with a predetermined threshold value and the maximum value, the predetermined threshold value being greater than the minimum value and smaller than the maximum value. Furthermore, the edge enhancing means judges that the predetermined pixel belongs to an edge area, and a clipping processing is performed after execution of a filter processing to enhance the edge if the central pixel energy is found to be equal or greater than the minimum value and smaller than the threshold according to a second comparison result of the second comparing means.

The filter processing may be configured to be one-dimensional filter processing that is performed by adding products that are obtained by multiplying predetermined filter coefficients and corresponding pixels.

The predetermined filter coefficient may be configured to have a value corresponding to the central pixel energy.

The filter processing may be configured to be respectively carried out in the vertical direction and the horizontal direction of the original image.

The image processing apparatus may be configured to further include third comparing means for comparing a pixel value of the pixels subjected to the filter processing with the maximum value and the minimum value. Further, the clipping processing may be configured to replace the pixel value of the pixel subjected to the filtering processing with the maximum value if the pixel value of the pixel subjected to the filter processing is found to be greater than the maximum value according to a third comparison result of the third comparing means. Further, the clipping processing may be configured to replace the pixel value of the pixel subjected to the filtering processing with the minimum value if the pixel value of the pixel subjected to the filter processing is found to be less than the minimum value according to the third comparison result of the third comparing means The edge direction detecting means may be configured to include: edge direction interpolating means for interpolating an edge direction interpolated pixel for the pixel position of interest; reliability detecting means for detecting the reliability of the edge direction interpolated pixel that is interpolated by the edge direction interpolating means; and direction selecting means for selecting an edge direction of a highest reliability based on detection results by the reliability detecting means.

The compositing and interpolating means may be configured to interpolate, as the composite interpolated pixel, pixels of a progressive image if the original image is an interlace image and enlarged twofold in the vertical direction.

A first image processing method according to one embodiment of the present invention includes: an energy calculating step for calculating a central pixel energy at a pixel position of interest; an edge enhancement step for enhancing an edge based on the central pixel energy calculated by the energy calculating step; an edge direction detecting step for detecting a direction of the edge enhanced by the edge enhancement step; a linear interpolation step for interpolating a linear interpolated pixel at the pixel position of interest by linear interpolation; a selected direction interpolating step for interpolating a selected direction interpolated pixel in a selected direction at the pixel position of interest based on the edge direction detected by the edge direction detecting step, and a compositing and interpolating step for interpolating a composition interpolated pixel by compositing the linear interpolated pixel and the selected direction interpolated pixel.

A program stored in a first recoding medium according to one embodiment of the present invention includes: an energy calculating step for calculating a central pixel energy at a pixel position of interest; an edge enhancement step for enhancing an edge based on the central pixel energy calculated by the energy calculating step; an edge direction detecting step for detecting a direction of the edge enhanced by the edge enhancement step; a linear interpolation step for interpolating a linear interpolated pixel at the pixel position of interest by linear interpolation; a selected direction interpolating step for interpolating a selected direction interpolated pixel in a selected direction at the pixel position of interest based on the edge direction detected by the edge direction detecting step, and a compositing and interpolating step for interpolating a composition interpolated pixel by compositing the linear interpolated pixel and the selected direction interpolated pixel.

A first program according to one embodiment of the present invention causes an computer to execute a process including: an energy calculating step for calculating a central pixel energy at a pixel position of interest; an edge enhancement step for enhancing an edge based on the central pixel energy calculated by the energy calculating step; an edge direction detecting step for detecting a direction of the edge enhanced by the edge enhancement step; a linear interpolation step for interpolating a linear interpolated pixel at the pixel position of interest by linear interpolation; a selected direction interpolating step for interpolating a selected direction interpolated pixel in a selected direction at the pixel position of interest based on the edge direction detected by the edge direction detecting step, and a compositing and interpolating step for interpolating a composition interpolated pixel by compositing the linear interpolated pixel and the selected direction interpolated pixel.

A second image processing apparatus according to one embodiment of the present invention includes: direction detecting means for detecting a direction of an edge at a pixel position of interest; edge direction interpolating means for interpolating an edge direction interpolated pixel at the pixel position of interest based on the edge direction detected by the direction detecting means; reliability detecting means for detecting a reliability of the edge direction interpolated pixel interpolated by the edge direction detecting means; direction detecting means for detecting a direction of the edge of a highest reliability detected by the reliability detecting means; linear interpolation means for interpolating a linear interpolated pixel at the pixel position of interest by linear interpolation; direction selecting interpolating means for interpolating a selected direction interpolated pixel at the pixel position of interest based on the edge direction detected by the direction detecting means, and compositing and interpolating means for interpolating a composition interpolated pixel by compositing the linear interpolated pixel and the selected direction interpolated pixel.

The image processing apparatus may be configured to further include consistency determining means for determining consistency of a local structure of the edge direction interpolated pixel interpolated by the edge direction detecting means. Further, the reliability detecting means may be configured to detect the reliability of the edge direction interpolated pixel by the edge direction interpolating means based on a result of determination by the consistency determining means.

The image processing apparatus may be configured to further include directional distribution generating means for generating a directional distribution based on a relationship between the reliability and the edge direction. Further, the direction selecting means may be configured to select an edge direction having a highest reliability based on the directional distribution.

The image processing apparatus may be configured to further include weighting means for setting a weight of a direction selecting interpolated pixel based on the reliability of a direction having the highest reliability selected by the direction selecting means from the directional distribution. Further, the compositing and interpolating means may be configured to interpolate a composite interpolated pixel by using a coefficient corresponding to the weight set by the weighting means and by taking a linear sum of the linear interpolated pixel and the selecting interpolated pixel.

The compositing and interpolating means may be configured to interpolate, as the composite interpolated pixel, pixels of a progressive image if the original image is an interlace image and enlarged twofold in the vertical direction.

A second image processing method according to one embodiment of the present invention includes: a direction detecting step for detecting a direction of an edge at a pixel position of interest; an edge direction interpolating step for interpolating an edge direction interpolated pixel at the pixel position of interest based on the edge direction detected by the direction detecting step; a reliability detecting step for detecting a reliability of the edge direction interpolated pixel interpolated by the edge direction detecting step; a direction detecting step for detecting a direction of the edge of a highest reliability detected by the reliability detecting step; a linear interpolation step for interpolating a linear interpolated pixel at the pixel position of interest by linear interpolation; a direction selecting interpolating step for interpolating a selected direction interpolated pixel at the pixel position of interest based on the edge direction detected by the direction detecting step; and a compositing and interpolating step for interpolating a composition interpolated pixel by compositing the linear interpolated pixel and the selected direction interpolated pixel.

A program stored in a second recoding medium according to one embodiment of the present invention includes: a direction detecting step for detecting a direction of an edge at a pixel position of interest; an edge direction interpolating step for interpolating an edge direction interpolated pixel at the pixel position of interest based on the edge direction detected by the direction detecting step; a reliability detecting step for detecting a reliability of the edge direction interpolated pixel interpolated by the edge direction detecting step; a direction detecting step for detecting a direction of the edge of a highest reliability detected by the reliability detecting step; a linear interpolation step for interpolating a linear interpolated pixel at the pixel position of interest by linear interpolation; a direction selecting interpolating step for interpolating a selected direction interpolated pixel at the pixel position of interest based on the edge direction detected by the direction detecting step, and a compositing and interpolating step for interpolating a composition interpolated pixel by compositing the linear interpolated pixel and the selected direction interpolated pixel.

A second program according to one embodiment of the present invention for causing an computer to execute a processing that includes: a direction detecting step for detecting a direction of an edge at a pixel position of interest; an edge direction interpolating step for interpolating an edge direction interpolated pixel at the pixel position of interest based on the edge direction detected by the direction detecting step; a reliability detecting step for detecting a reliability of the edge direction interpolated pixel interpolated by the edge direction detecting step; a direction detecting step for detecting a direction of the edge of a highest reliability detected by the reliability detecting step; a linear interpolation step for interpolating a linear interpolated pixel at the pixel position of interest by linear interpolation; a direction selecting interpolating step for interpolating a selected direction interpolated pixel at the pixel position of interest based on the edge direction detected by the direction detecting step, and a compositing and interpolating step for interpolating a composition interpolated pixel by compositing the linear interpolated pixel and the selected direction interpolated pixel.

In the first image processing apparatus, method and program according to the present invention, the central pixel energy at a pixel position of interest is calculated, an edge is enhanced based on the calculated central pixel energy, a direction of the enhanced edge is detected, the linear interpolated pixel at the pixel position of interest is interpolated by the linear interpolation based on the detected edge direction, the selected direction interpolated pixel is interpolated at the pixel position of interest based on the detected direction of the edge, and the linear interpolated pixel and the selected direction interpolated pixel are composed to interpolate the composition interpolated pixel.

In the second image processing apparatus, method and program according to the present invention, the direction of an edge at a pixel position of interest is detected, an edge direction interpolated pixel is interpolated at the pixel position of interest based on the detected edge direction, reliability of the edge direction interpolated pixel is detected, an edge direction of the highest reliability is selected from the detected reliability, the linear interpolated pixel is interpolated at the pixel position of interest by the linear interpolation, the selected direction interpolated pixel at the pixel position of interest is interpolated based on the selected edge direction, and the linear interpolated pixel and the selected direction interpolated pixel are composed to interpolate the composition interpolated pixel.

BRIEF DESCRIPTION OF THE DRAWINGS

The above and other objects, features and advantages of the present invention will become more apparent from the following description of the presently preferred exemplary embodiment of the invention taken in conjunction with the accompanying drawing, in which:

FIG. 51 is a diagram of assistance in explaining the processing at a step 247 of FIG. 48 and at a step 252 of FIG. 49;

DETAILED DESCRIPTION OF THE EMBODIMENTS

Figure 1:
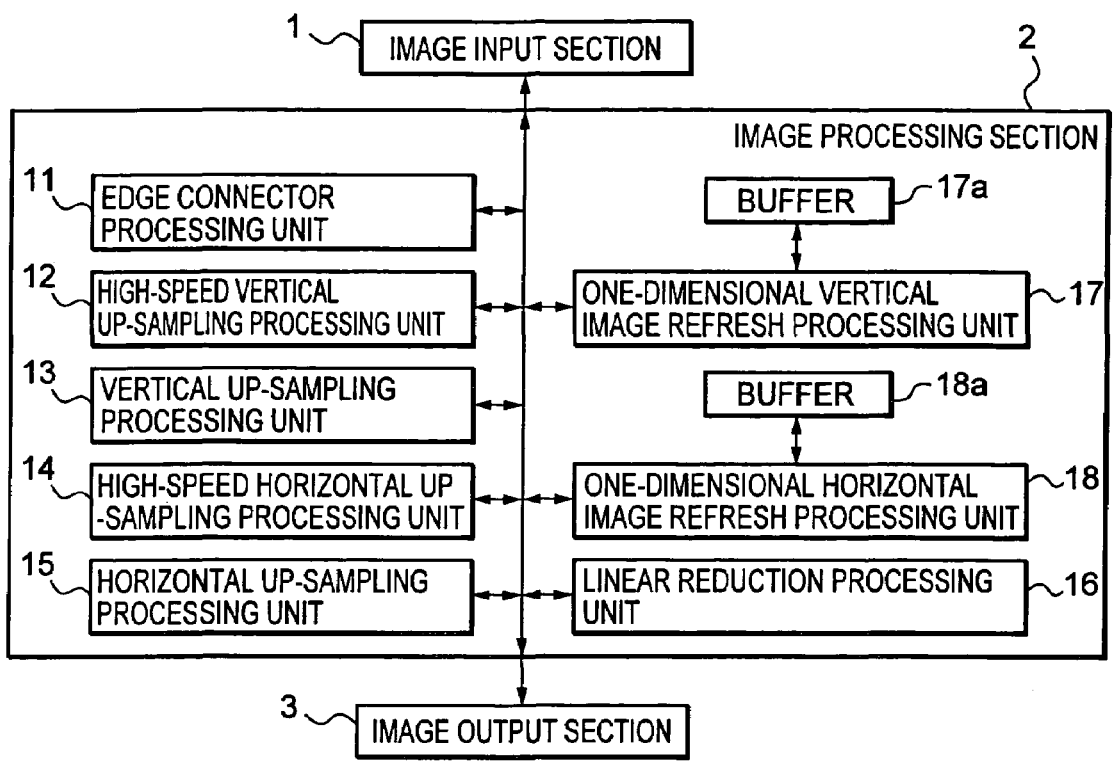
FIG. 1 is a block diagram of a configuration of an image processing apparatus to which the present invention is applied.

FIG. 1 is a configuration of an image processing apparatus to which the present invention is applied. In the image processing apparatus 2, image data to be handled by an imaging input unit 1 is read from a recording medium or is inputted by receiving what is transmitted via a network, and then outputted to an image processing section 2. The image processing section 2 changes (enlarges or reduces) resolution of an image inputted from the imaging input unit 1 and outputs it to an imaging output unit 3. The imaging output unit 3 permits image data supplied from the image processing section 2 to be shown in a display unit, to be recorded in a recording medium, or to be transferred to other devices via a transmission medium.

In the image processing section 2, an edge connector processing unit 11 is provided. The edge connector processing unit 11 executes processing to make an image edge thicker. Namely, a small size image is of low resolution, having little reliable information so that enlarging it is difficult. If the edge is as slender (thin) as single pixel, it is difficult to detection an edge by using one of a high-speed vertical up-sampling processing unit 12, a vertical up-sampling processing unit 13, a high-speed horizontal up-sampling processing unit 14, and a horizontal up-sampling processing unit 15, thus making it difficult to perform interpolation processing along the edge direction accurately. Hence, pre-processing is carried out on the original image to facilitate edge detection. Such pre-processing to the extent of not destroying imaging information is carried out on an image such as a computer icon or a word processor font that has a loose connection.

The high-speed vertical up-sampling processing unit 12 and the vertical up-sampling processing unit 13 carry out processing in the vertical direction to increase respective resolution of the original image by z times. The high-speed vertical up-sampling processing unit 12 carries out processing if the z value is greater than 1 and smaller than 2, while the vertical up-sampling processing unit 13 carries out processing if the z value is 2.

The high-speed horizontal up-sampling processing unit 14 and the horizontal up-sampling processing unit 15 carry out processing in the horizontal direction to increase respective resolutions of the original image by z times. The high-speed horizontal up-sampling processing unit 14 carries out processing if the z value is greater than 1 and smaller than 2, while the horizontal up-sampling processing unit 15 carries out processing if the z value is 2.

A linear reduction processing unit 16 carries out processing to reduce ((Z<1)times) resolution of the original image.

A one-dimensional vertical image refresh processing unit 17 and a one-dimensional horizontal image refresh processing unit 18, while making use of buffers 17*a* and 18*a* as necessary, respectively process image data in the vertical direction or in the horizontal direction using a one-dimensional filter and enhance the edge and texture with no visual incongruity. Namely, when image data is recorded in a recording medium, high-frequency components are suppressed due to physical influence of the recording medium, so that a phenomenon of blurring an edge portion and a texture portion in an image may occur. Consequently, the one-dimensional vertical image refresh processing unit 17 and the one-dimensional horizontal image refresh processing unit 18 carry out corresponding filter processing to obtain the central pixel energy of each pixel. Furthermore, from the central pixel energy value, it is determined whether the pixel belongs to the edge or the texture. In case of belonging to the edge, clipping processing is further carried out to control distortion caused by the filter processing.

Further, there are two kinds of filters respectively available as filters to be used for the one-dimensional vertical image refresh processing unit 17 and the one-dimensional horizontal image refresh processing unit 18. A user may set up arbitrary ones if necessary. One of the two kinds of filters has a function that allows detailed control of frequency region characteristic, while the other filter, though being unable to control the frequency region characteristic in detail in comparison with the former filter, enables to decrease the processing volume. These filters are similar except that different elements are required to make up the filter, and processing is also similar. In the following description, the former filter is called Type A and the latter filter is called Type B.

Figure 2:
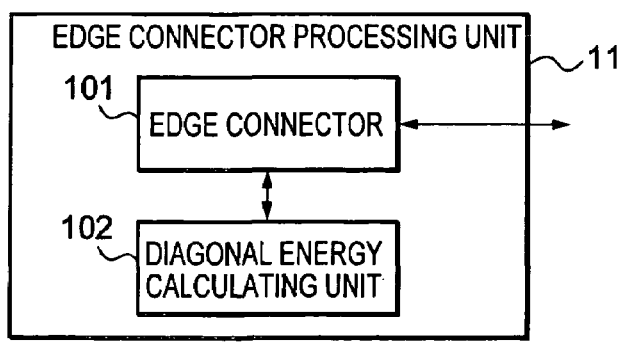
FIG. 2 is a block diagram of configuration of an edge connector processing unit of FIG. 1.

Next, detailed configuration of an edge connector 11 will be described with reference to a block diagram in FIG. 2. An edge connecting unit 101 outputs detected edge information to a diagonal energy calculating unit 102, thickens the edge based on the calculated left and right diagonal energy, and connects the thickened edge.

Next, detailed configuration of a high-speed vertical up-sampling processing unit 12 will be described with reference to a block diagram in FIG. 2. The high-speed vertical up-sampling processing unit 112 controls a vertical direction interpolating unit 112 so as to generate an interpolated pixel, generates an enlarged image in the vertical direction, and outputs it.

Figure 3:
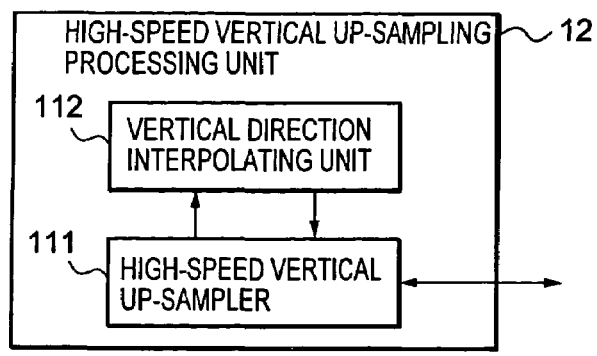
FIG. 3 is a block diagram of configuration of a high-speed vertical up-sampling processing unit of FIG. 1.
Figure 4:
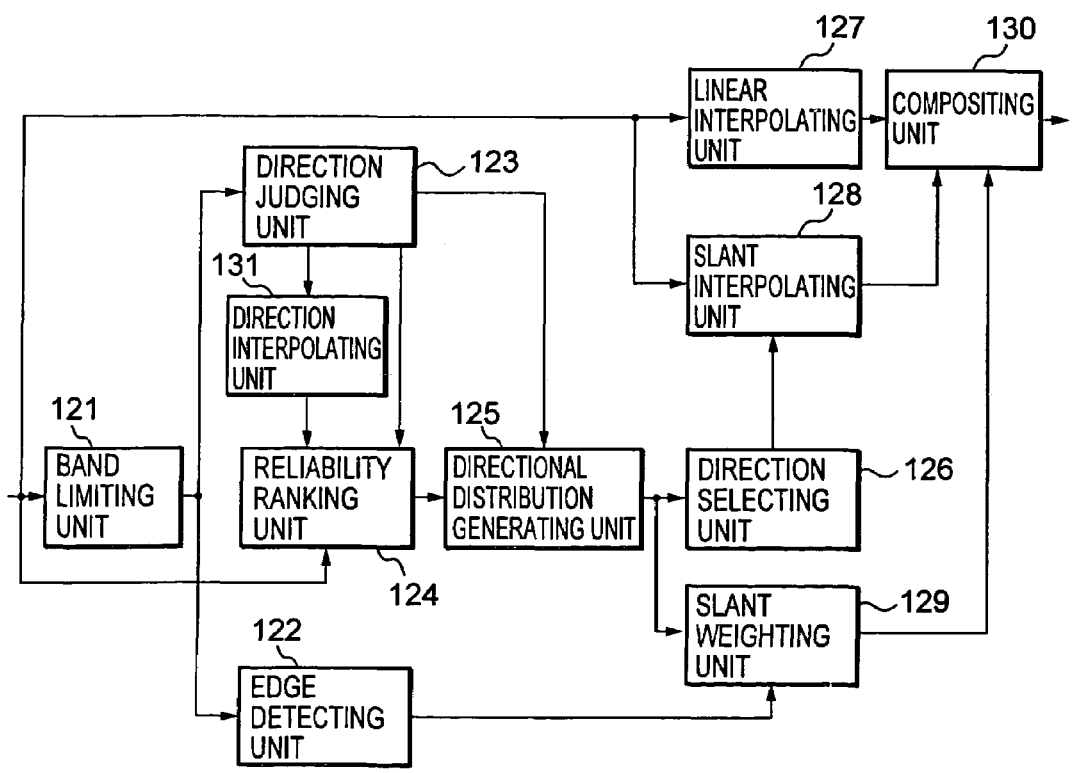
FIG. 4 is a block diagram of configuration of a vertical-direction interpolating unit of FIG. 3.

Next, configuration of the vertical direction interpolating unit 112 of FIG. 3 will be described with reference to a block diagram in FIG. 4.

A band limiting unit 121 consists of, for example, an LPF (Low Pass Filter) and the like, and smoothes pixel values of respective pixels of an inputted image, limits a band region, and outputs to a direction judging unit 123 and an edge detecting unit 122.

The edge detecting unit 122 calculates local energy from an image signal subjected to the band limiting, detects whether there is an edge or not based on the detected value, and outputs to an slant weighting unit 129.

The direction judging unit 123 judges an edge direction and outputs information on the judged edge direction to a reliability ranking unit 124 and a directional distribution generating unit 125, while outputting pixel information to a direction interpolating unit 131. The reliability ranking unit 124, based on inputted image information and edge direction information inputted from the direction judging unit 123, obtains reliability of the edge direction information, and outputs it to the directional distribution generating unit 125. The directional interpolating unit 131, based on information from the direction judging unit 123, interpolates a pixel using values of pixels disposed in that direction.

The directional distribution generating unit 125, based on the edge directional information inputted from the direction judging unit 123 and corresponding reliability information from the reliability ranking unit 124, generates directional distribution and supplies it to a direction selecting unit 126 and a slant weighting unit 129. The direction selecting unit 126 selects a direction of high reliability based on the directional distribution and outputs selected directional information to a slant interpolating unit 128. The slant weighting unit 129 calculates a weight to be attached to a slant direction edge and outputs it to a compositing unit 130.

A linear interpolating unit 127 generates an interpolated pixel in the inputted image using pixels lying vertically above and below proximity thereof or pixels lying at the left and the right proximity thereof by the use of linear interpolation, and output it to the compositing unit 130. A slant interpolating unit 128 generates an interpolated pixel in the inputted image using information on pixels adjacent to one another in such a way that the interpolated is sandwiched in a direction inputted from the direction selecting unit 126, and outputs the interpolated pixel to the compositing unit 130. The compositing unit 130, based on information on weighting in a slant direction inputted from the slant weighting unit 129, respectively weights a pixel value of the interpolated pixel generated by the linear interpolation and a pixel value of the interpolated pixel generated by the slant interpolation in the slant interpolating unit 128, and performs addition (a linear sum obtained with the weight as coefficients), thereby performing the composition and outputting the resultant pixel as the interpolated pixel.

Figure 5:
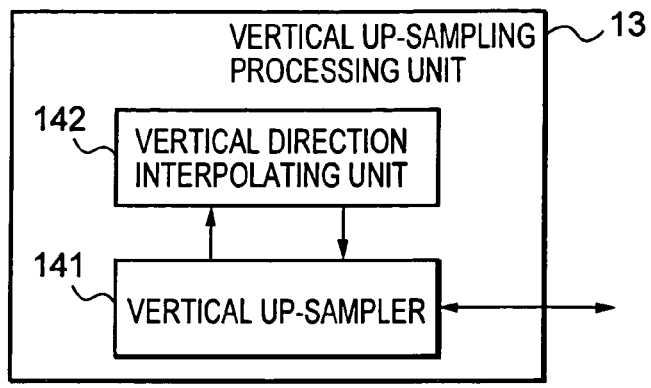
FIG. 5 is a block diagram of configuration of a vertical up-sampling processing unit of FIG. 1.

Next, configuration of the vertical up-sampling processing unit 13 will be described with reference to a block diagram in FIG. 5. A vertical up-sampler 141 controls a vertical direction interpolating unit 142 to generate and output an interpolated pixel. It should be noted that configuration of the vertical direction interpolating unit 142 was described with reference to FIG. 4. Since it is similar to the vertical interpolating unit of the high-speed vertical up-sampling processing unit 12 in FIG. 3, its description will be omitted.

Figure 6:
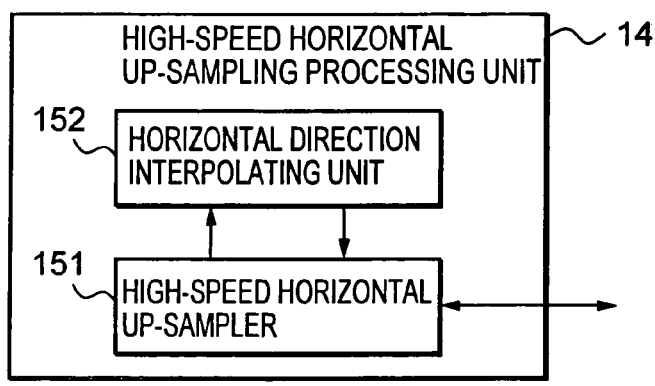
FIG. 6 is a block diagram of configuration of a high-speed horizontal up-sampling processing unit of FIG. 1.

Next, the high-speed horizontal up-sampling processing unit 14 will be described with reference to a block diagram of FIG. 6. The high-speed horizontal up-sampler 151 outputs information on adjacent pixels of a pixel due to be interpolated to enable a horizontal direction interpolating unit 152 to generate an interpolated pixel, generating and outputting an image enlarged in the vertical direction. It should be noted that configuration of the horizontal direction interpolating unit 152 uses a similar method as that of the vertical direction interpolating unit 112 of the high-speed vertical up-sampling processing unit 12 in FIG. 3, which is described with reference to FIG. 4 to process pixels in the horizontal direction. Accordingly, its explanation will omitted.

Figure 7:
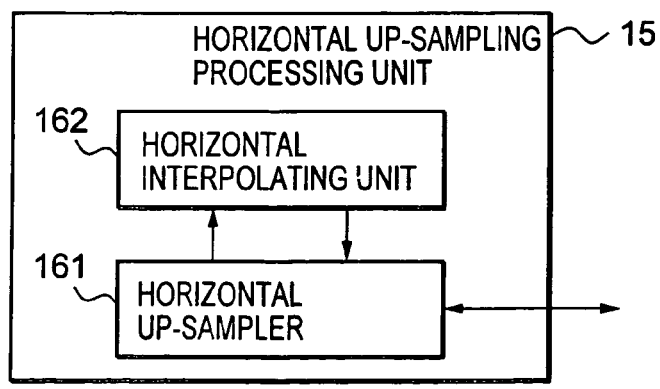
FIG. 7 is a block diagram of configuration of a horizontal up-sampling processing unit of FIG. 1.

Next, configuration of the horizontal up-sampling processing unit 15 will be described with reference to a block diagram of FIG. 7. A horizontal up-sampler 161 generates an interpolated pixel and outputs it to a vertical direction interpolating unit 162. It should be noted that configuration of the vertical direction interpolating unit 162 uses a similar method as that of the vertical interpolating unit 112 of the high-speed vertical up-sampling processing unit 12 in FIG. 3, which is described with reference to FIG. 4. Accordingly, its description will be omitted.

Figure 8:
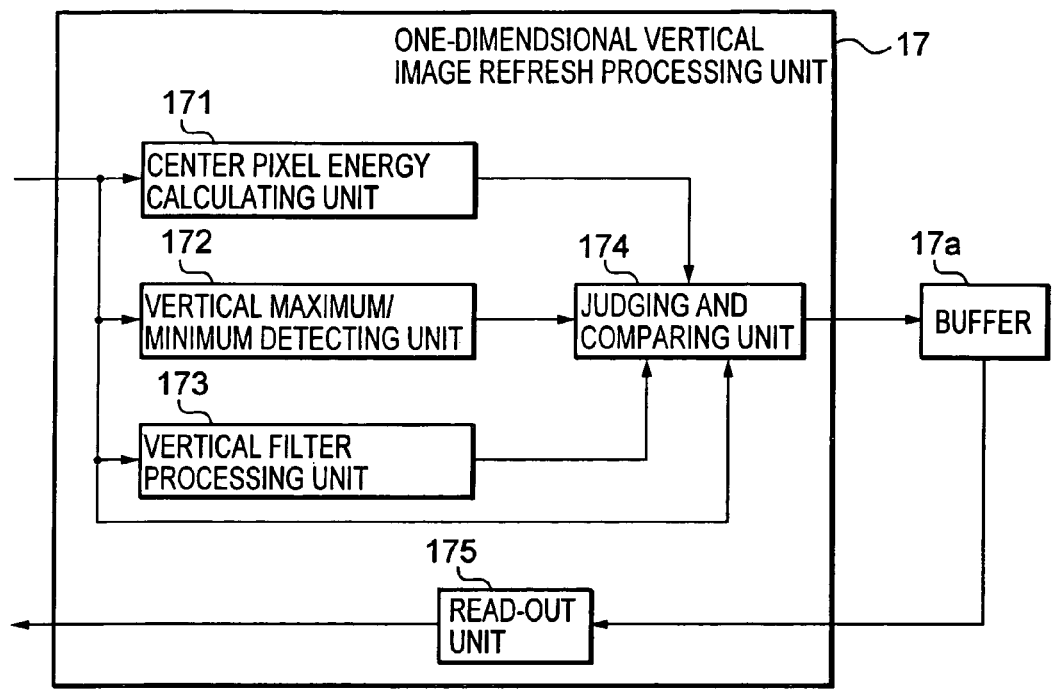
FIG. 8 is a block diagram of configuration of a one-dimensional vertical image refresh processing unit of FIG. 1.

Next, configuration of a one-dimensional vertical image refresh processing unit 17 will be described with reference to a block diagram in FIG. 8. From a plurality of pixels present in a vertical direction line corresponding to a remarked pixel of an inputted image, a central pixel energy calculating unit 171 calculates and outputs its central pixel energy to a judging and comparing unit 174. From a plurality of pixels present in a vertical direction line corresponding to the remarked pixel of the inputted image, a vertical maximum/minimum detecting unit 172 extracts and outputs a pixel value of its maximum value and a pixel value of its minimum value to the judging and comparing unit 174.

A vertical filter processing unit 173 carries out filter processing on a plurality of pixels corresponding to the remarked pixel of the inputted image in the vertical direction, and outputs it to the judging and comparing unit 174. From the central pixel energy value inputted from the central pixel energy calculating unit 171 and the value obtained by the filter processing in the vertical direction in the vertical filter processing unit 173, the judging and comparing unit 174 determines whether the pixel belongs to an edge or texture. In the case of belonging to the edge, it is compared with the maximum value or the minimum value that is inputted from the vertical maximum/minimum detecting unit 172, and is subjected to clipping and outputted to the buffer 17a. The output unit 175 reads and outputs image signals stored in the buffer 17a as necessary.

Figure 9:
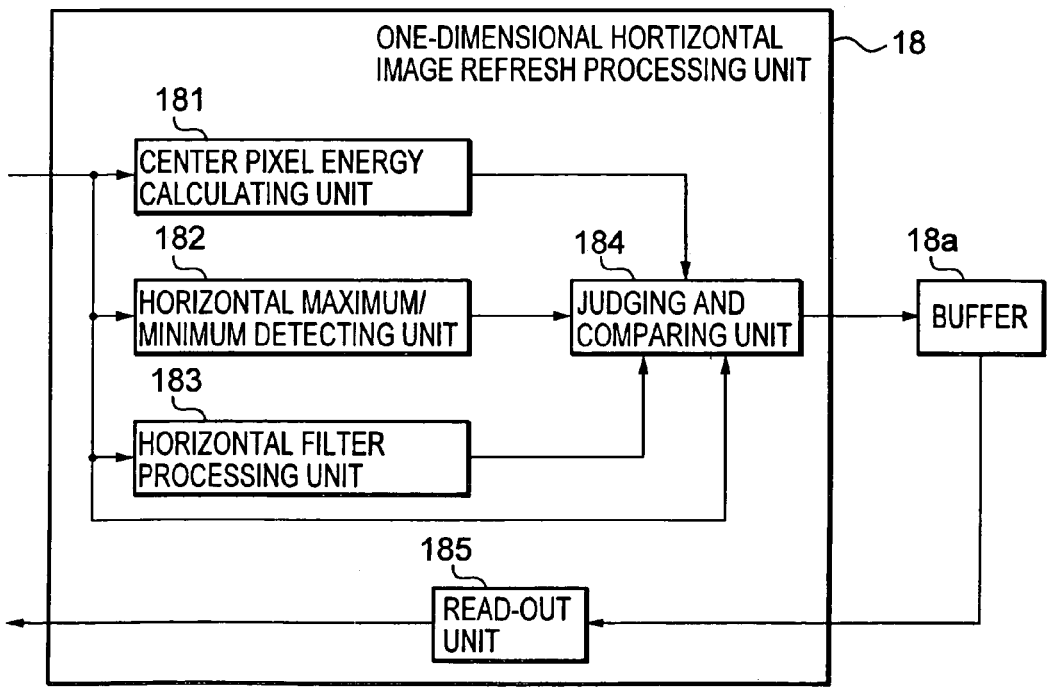
FIG. 9 is a block diagram of configuration of a one-dimensional horizontal image refresh processing unit of FIG. 1.

Next, configuration of a one-dimensional horizontal image refresh processing unit 18 will be described with reference to a block diagram in FIG. 9. From a plurality of pixels corresponding to the remarked pixel of the inputted image, a central pixel energy calculating unit 181 calculates and outputs its central pixel energy to a judging and comparing unit 184. From a plurality of pixels present on a horizontal direction line corresponding to the remarked pixel of the inputted image, a horizontal maximum value/minimum value detecting unit 182 extracts and outputs a pixel value of its maximum value and a pixel value of its minimum value to the judging and comparing unit 184.

A horizontal filter processing unit 183 carries out filter processing on a plurality of pixels corresponding to the remarked pixel of the inputted image in the horizontal direction, and outputs to the judging and comparing unit 184. From a central pixel energy value inputted from the central pixel energy calculating unit 181 and a value obtained by the filter processing in the horizontal direction from the horizontal filter processing unit 183, it is determined by the judging and comparing unit 184 whether the pixel belongs to an edge or texture. In the case of belonging to the edge, it is compared with the maximum value or the minimum value, which is inputted from the horizontal maximum value/minimum value detecting unit 182, and is subjected to clipping and outputted to the buffer 18a. The output unit 185 reads out and outputs image signals stored in the buffer 18a as necessary.

Figure 10:
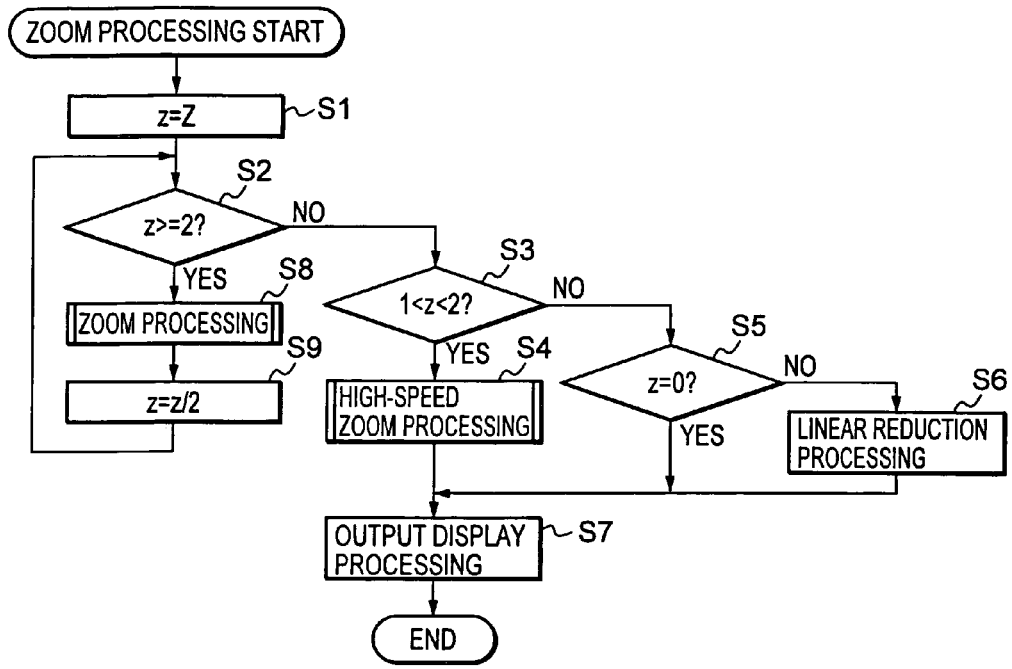
FIG. 10 is a flowchart of assistance in explaining zoom processing of an image processing apparatus of FIG. 1.

Next, zoom processing of the image processing section 2 will be described with reference to a flowchart in FIG. 10. First, at step S1, the image processing section 2 sets a value of magnification Z as a variable z. Next, at step S2, the image processing section 2 determines as to whether a value of the variable z is equal to 2 or larger. If it is smaller than 2, the process goes to step S3. If the value of the variable z is greater than 1 and smaller than 2, the process proceeds on to step S4 where the image processing section 2 carries out a high-speed zoom processing. The high-speed zoom processing will be described in detail later with reference to a flowchart in FIG. 11. Subsequently, at step S7, output display processing will be carried out.

If it is determined that the variable z is a value not between 1 and 2, the process goes to step S5 where it is determined whether the variable z is 0 or not. If the variable z is not 0 (if variable z is less than 1), the process moves to step S6 where a linear reduction processing is carried out by a typical linear reduction processing unit 16. Subsequently, at step S7, the output display processing is carried out. Namely, a generated image is shown on a display unit by an image output section 3.

On the other hand, if the variable z is determined to be 0 at the step S5, since the processing to enlarge it has already been completed as a result of performing the zoom processing for a predetermined number of times at the step S6, the process goes to the step S7 to carry out output display processing.

At the step S2, if the variable z is determined to be greater than 2, the process moves to step S8, and the image processing section 2 carries out the zoom processing. This zoom processing will be described in detail later with reference to a flowchart in FIG. 50.

After the step S8, the process goes to step S9, and the image processing section divides the variable z by 2. Then, the process returns to the step S2 where the process thereafter is carried out repeatedly.

Namely, if the variable z is greater than 2, the processing at the step S8 is repeated for a predetermined number of times until the variable becomes a value smaller than 2. If the variable z becomes smaller than 2 and if the variable z is in between 1 and 2, the high-speed zoom processing is carried out at the step S4, whereas, if the variable z is less than 1, the standard linear reduction processing is carried out at the step S6. The standard linear reduction processing may be realized by using a bi-linear filter.

Next, the high-speed zoom processing at the step S4 will be described with reference to a flowchart in FIG. 11. First, at step S21, the image processing section 2 determines whether or not a mode that is set by a user is an image mode. If the set mode is not the image mode (if an image subject to processing is an image of loose connection such as an icon or a font requiring the edge connector processing), the process moves to step S26 where the edge connector processing is carried out. The edge connector processing will be described in detail later with reference to FIG. 46 and FIG. 47. It should be noted that in this processing, the image of loose connection is pre-processed before an image of tight connection.

If the mode set at step S31 is determined to be the image mode (in the case of an image subject to processing is an image of tight connection), after the processing at the step S26, the process goes to step S22 where the image processing section 2 carries out an one-dimensional vertical image refresh processing.

At this point, referring to a flowchart in FIG. 12, the one-dimensional vertical image refresh processing by the one-dimensional vertical image refresh processing unit 17 will be described.

At the step S31, it is determined if there is any pixel that is no processed yet in the image data inputted from the image input section 1. If it is determined that there is a pixel not processed, the process goes to the step S32.

Figure 13:
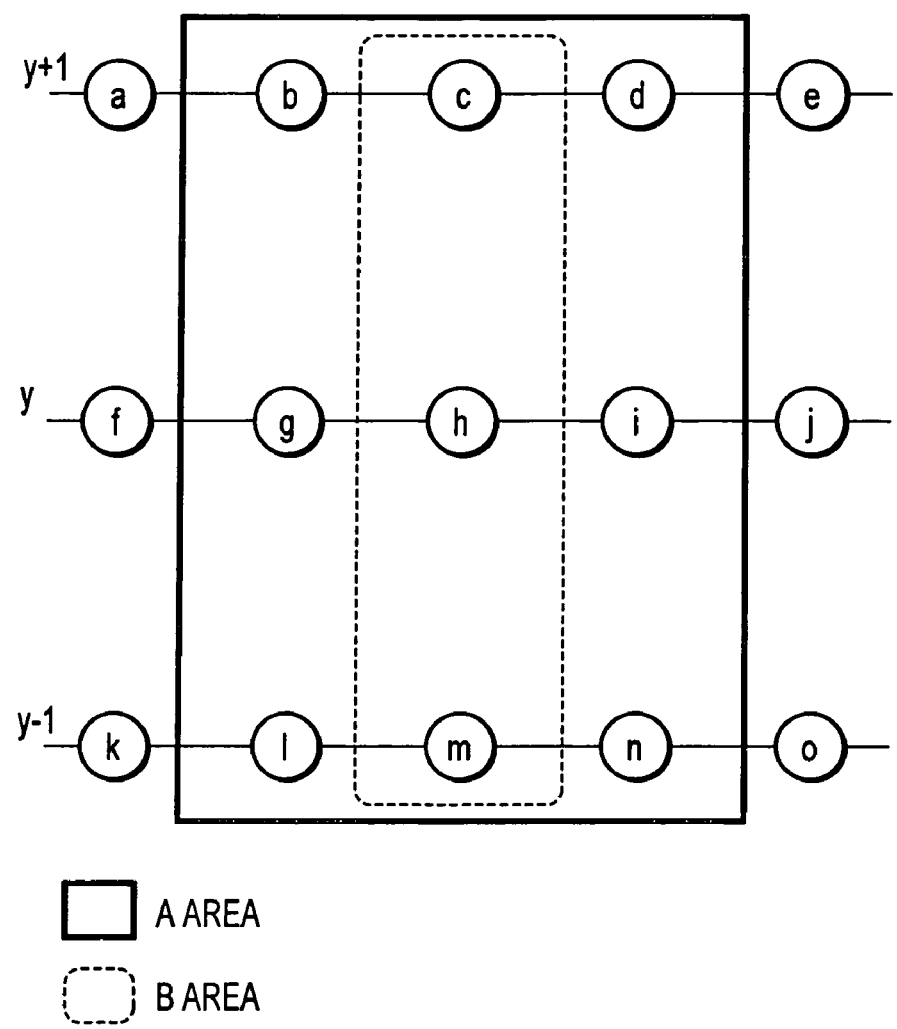
FIG. 13 is a diagram of assistance in explaining the one-dimensional vertical image refresh processing at the step 22 of FIG. 11.

At the step S32, the central pixel energy calculating unit 171 retrieves an unprocessed pixel and calculates a vertical-direction central pixel energy of the retrieved unprocessed pixel. For example, suppose image data shown in FIG. 13 is inputted and on each line in vertical directions of y+1, y, and y−1 are disposed pixels from a to e, pixels from f to j, and pixels from k to o. Then, vertical-direction central pixel energy EV-h of area A (a range enclosed by a solid line) in the proximity of pixel h is given by:

$$EV\text{-}h = |(b+c+d)-(l+m+n)| \quad (1)$$

where b, c, d, l, m and n are pixel values of pixels b, c, d, l, m and n. Namely, the vertical-direction central pixel energy EV of the equation (1) is a sum of absolute values of differences between pixel values present on a line above the center that is positioned at the unprocessed pixel and pixel values present on a line thereunder. Consequently, if correlated pixels are present thereabove and thereunder, there is no appreciable discrepancy in the differences of their pixel values, so that the vertical-direction central pixel energy becomes small, while on the other hand, if pixels having no correlation are present thereabove and thereunder, there is often appreciable discrepancy in the differences of their pixel values, resulting in increasing the vertical-direction central pixel energy.

The central pixel energy calculating unit 171 obtains the vertical-direction central pixel energy EV-h of the unprocessed pixel by calculating the above equation (1).

Figure 17:
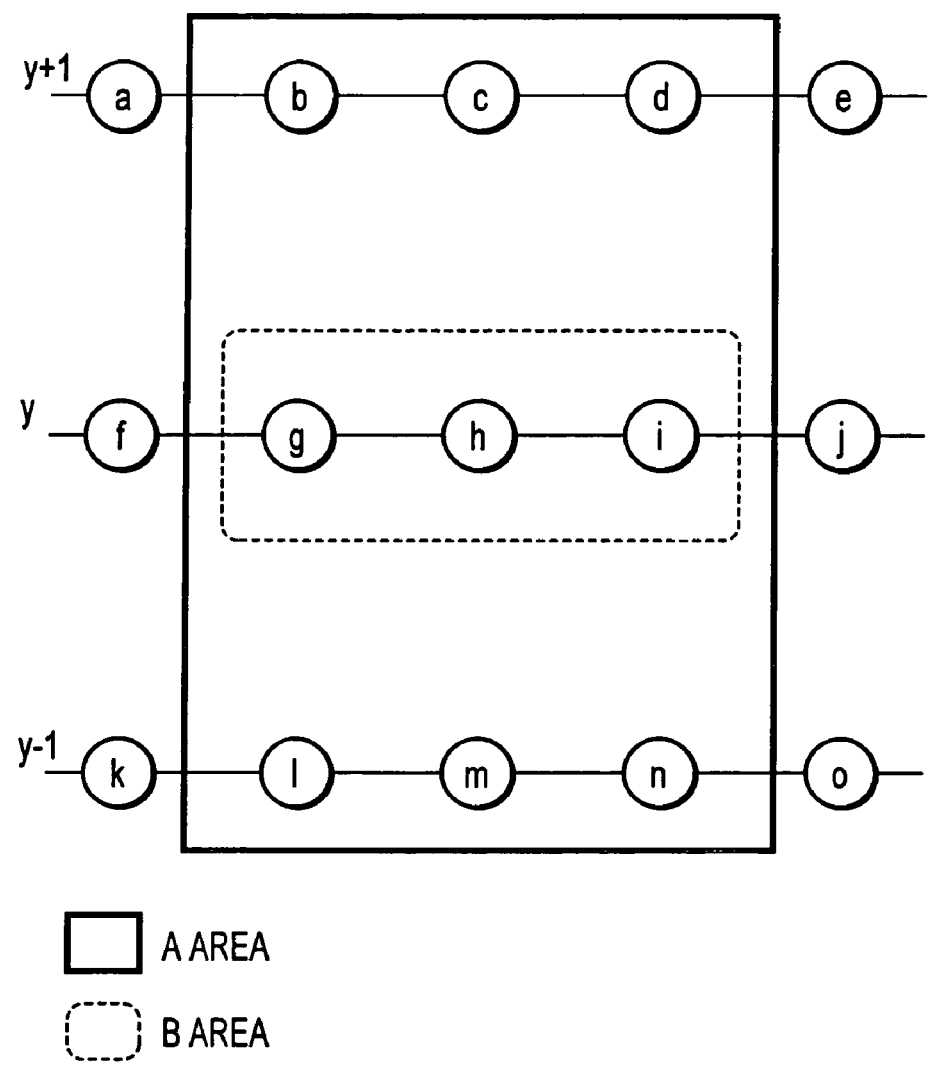
FIG. 17 is a diagram of assistance in explaining the one-dimensional horizontal image refresh processing at the step 23 of FIG. 11.
Figure 18:
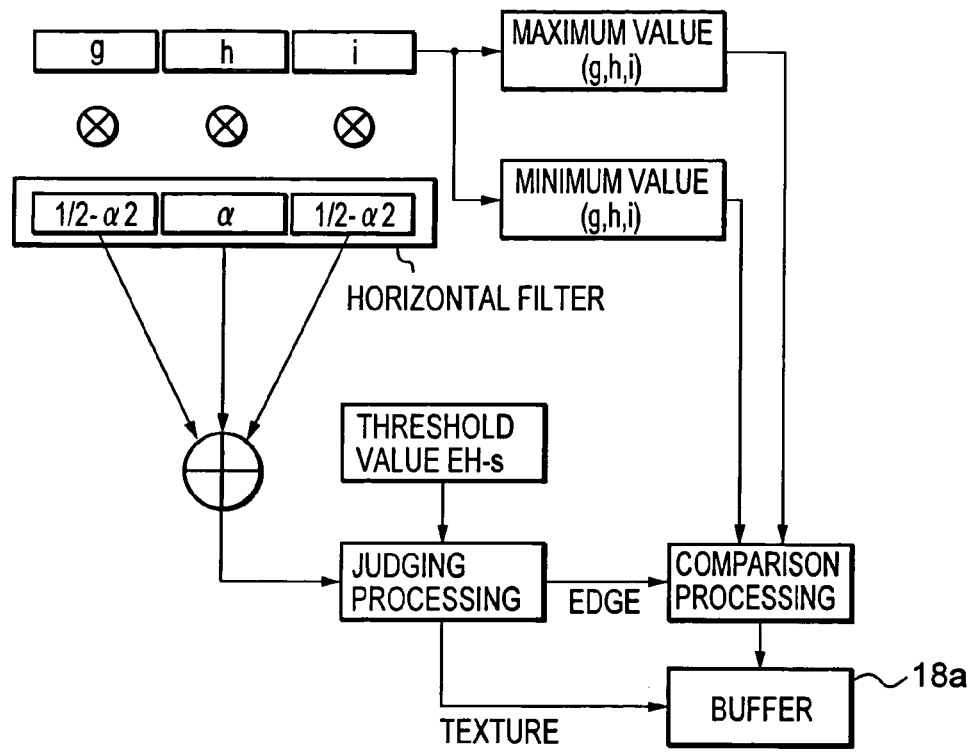
FIG. 18 is a diagram of assistance in explaining the one-dimensional horizontal image refresh processing at the step 23 of FIG. 11.

At step S33, the vertical maximum/minimum detecting unit 172 obtains a maximum value and a minimum value by comparing the pixel values of three pixels above and under the unprocessed pixel and the unprocessed pixel itself. Namely, for example, as shown in FIG. 13, if the unprocessed pixel is a pixel h, each pixel value of the pixels thereabove and thereunder and the unprocessed pixel itself c, h, and m (B area enclosed by a broken line in FIG. 17) is read, and, as shown in FIG. 18, the maximum value (c, h, and m) and the minimum value (c, h, and m) therein are obtained.

At step S34, the judging and comparing unit 174 determines whether or not the obtained vertical-direction central pixel energy EV-h is greater than the minimum value (c, h, and m) and smaller than the maximum value (c, h, and m); if it is determined to be greater than the minimum value (c, h, and m) and smaller than the maximum value (c, h, and m), that is, if its pixel is determined to be either an edge or texture, the process goes to step S35.

At the step S35, the vertical filter processing unit 173 calculates a coefficient a constituting a vertical one-dimensional filter. The coefficient α is given by calculation shown in an equation (2).

$$\alpha = \alpha0 - (EV\text{-}h/EV\text{-}h\text{-}max) \quad (2)$$

where α0 (1<α0≦2) is a value that may be arbitrary set by the user, and EV-h-max is the maximum value of the vertical-direction central pixel energy EV-h. It should be noted that the maximum value EV-h-max of the vertical-direction pixel energy is different from the maximum value (c, h, and m) and represents the maximum value that can be calculated.

Figure 14:
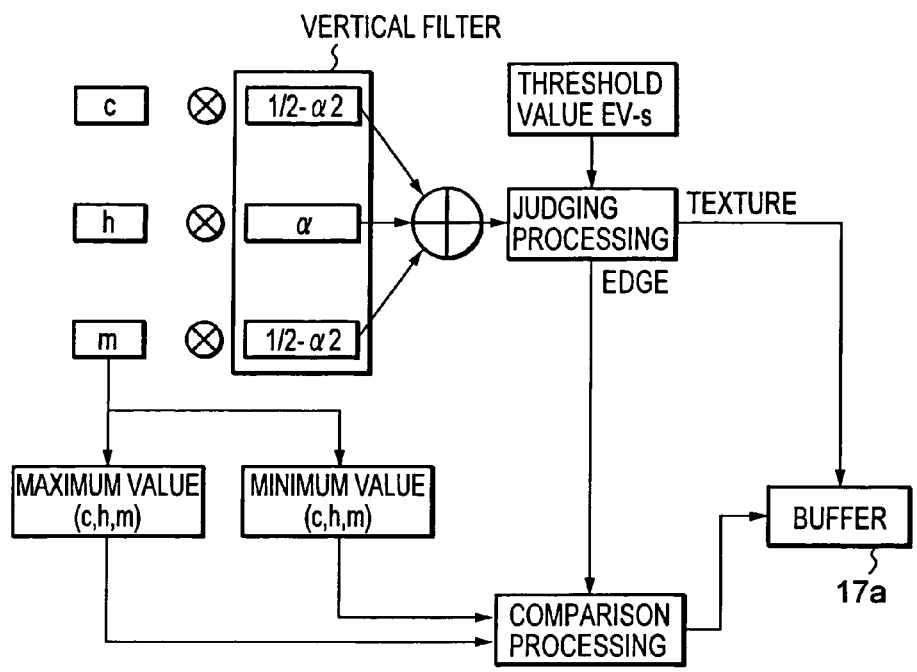
FIG. 14 is a diagram of assistance in explaining the one-dimensional vertical image refresh processing at the step 22 of FIG. 11.

At step S36, the vertical filter processing unit 173 performs the one-dimensional vertical filter processing as shown in FIG. 14 of pixels c, h, and m of B area as shown in FIG. 13. Namely, the one-dimensional vertical filter may be what is shown as (1/2−α/2, α, 1/2−α/2)(1<α≦2). For example, if the filter is type A mentioned above, by means of calculation shown in an equation (3) below, a pixel value hV-filter subjected to the filter processing may be given.

$$hV\text{-filter} = c \times (1/2 - \alpha/2) + h \times \alpha + m \times (1/2 - \alpha/2) \quad (3)$$

where the coefficient α is a value obtained by the above-mentioned processing at the step S35, and enables to adjust the degree of enhancement of the edge or texture by the filter. Namely, the coefficient α dynamically changes in accordance with the value of the vertical-direction central pixel energy EV-h. If the vertical-direction central pixel energy EV-h is small, the coefficient α becomes large, causing the one-dimensional vertical filter shown in FIG. 14 to act strongly on the pixel h. Conversely, if the vertical-direction central pixel energy EV-h is large, the coefficient α becomes small, causing the one-dimensional vertical filter shown in FIG. 14 to act weakly on the pixel h.

At step S37, the judging and comparing unit 174 carries out judging processing, as shown in FIG. 14, to determine whether a pixel being processed is an edge or texture. Namely, the vertical-direction central pixel energy EV-h has a value close to the minimum value (c, h, and m) if it is at the texture, and has a value close to the maximum value (c, h, and m) if it is at the edge. In the present embodiment, a threshold EV-s is set up in the middle between the maximum value (c, h, and m) and the minimum value (c, h, and m). If the vertical-direction central pixel energy EV-h is greater than the threshold EV-s, it is determined as an edge. Conversely, if the vertical-direction central pixel energy EV-h is smaller than the threshold EV-s, it is determined as texture. For example, if the vertical-central pixel energy EV-h is greater than the threshold EV-s, the judging and comparing unit 174 determines that a remarked pixel being processed is an edge (determining that it is a pixel present on a edge-indicated area), and the process goes to step S38.

At the step S38, the judging and comparing unit 174, as shown in FIG. 14, compares the pixel value hV-filter subjected to the filer processing with the maximum value (c, h, and m) so as to determine whether or not the pixel value hV-filter subjected to the filer processing is greater than the maximum value (c, h, and m). If it is determined to be greater than the maximum value (c, h, and m), at step S39, the judging and comparing unit 174 substitutes the maximum value (c, h, and m) for the pixel value hV-filter.

At step S40, the judging and comparing unit 174 permits the buffer 17a to store the pixel value substituted with the maximum value (c, h, and m) as the pixel value of the pixel h, and the process returns to the step S31, so that similar processing is repeated until it is determined that the one-dimensional vertical edge enhancing processing is carried out for all pixels.

At the step S34, if the vertical-direction central pixel energy EV is determined not to be greater than the minimum value (c, h, and m) and smaller than the maximum value (c, h, and m), that is, if the pixel is determined to be neither edge nor texture, the process goes to the step S40, so that the judging and comparing unit 174 permits the pixel value of the pixel h to be stored as it is without the filter processing in the buffer 17a and the process returns to the step S31 to repeat the processing thereafter. Additionally, at the step S37, if the vertical-direction central pixel energy EV is determined to be smaller than the threshold EV-s, the judging and comparing unit 174 determines that the remarked pixel being processed is texture, so that the process goes to the step S40, that is, the judging and comparing unit 174 permits the pixel value hV-filter subjected to the filter processing to be stored in the buffer 17a as the value of the pixel h.

At the step S38, if it is determined that the pixel value hV-filter subjected to the filter processing is not greater than the maximum value (c, h, and m), the judging and comparing unit 174 compares, at step S41, the pixel value hV-filter subjected to the filer processing with the minimum value (c, h, and m) to determine whether or not the pixel value hV-filter subjected to filer processing is equal to or smaller than the minimum value (c, h, and m). If it is determined to be equal to or smaller than the minimum value (c, h, and m), the process goes to step S42.

At the step 42, the judging and comparing unit 174 substitutes the minimum value (c, h, and m) for the pixel value hV-filter, and the pixel value substituted with the minimum value (c, h, and m) is stored at the step S40 in the buffer 17a as the pixel value of the pixel h.

At the step S41, if it is determined that the pixel value hV-filter subjected to the filter processing is neither equal to nor smaller than the minimum value (c, h, and m), the process goes to the step S40 where the judging and comparing unit 174 permits the pixel value hV-filter subjected to the filter processing to be stored in the buffer 17a as the pixel value of the pixel h and the process returns to the step S31.

Namely, if, in the processing of the step S34, the vertical-direction central pixel energy EV-h is determined to be greater than the minimum value (c, h, and m) and smaller than the maximum value (c, h, and m), the maximum value (c, h, and m) and the minimum value (c, h, and m) obtained in the processing of the step S33 are recognized as the maximum value (c, h, and m) and the minimum value(c, h, and m) within a local range as shown in FIG. 14. If the pixel value obtained by the filter processing in the processing of the step S36 is included in the range of such minimum value and maximum value, further processing at the step S37 is performed to determine whether it is an edge or texture. If it is determined as texture, the pixel value after the filter processing is stored as it is in the buffer 17a. If it is determined as an edge and equal to or smaller than the minimum value (c, h, and m), the pixel value is considered as the minimum value, while if it is equal to or greater than the maximum value (c, h, and m), the pixel value is considered as the maximum value (subjected to clipping) and stored in the buffer 17a. If, in the processing of the step S34, the vertical-direction central pixel energy EV-h is not greater than the minimum value (c, h, and m) nor smaller than the maximum value (c, h, and m) and if it is determined as neither edge nor texture, the original pixel value without the filter processing is stored as it is in the buffer 17a.

Figure 15:
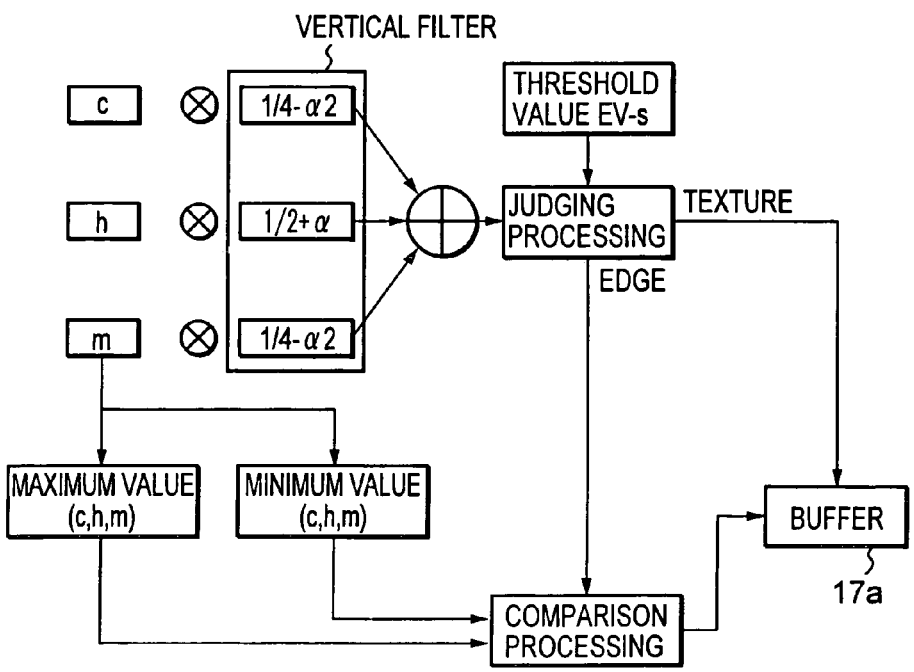
FIG. 15 is a diagram of assistance in explaining one-dimensional vertical image refresh processing at the step 22 of FIG. 11.

It should be noted that the one-dimensional vertical filter is available in two kinds as mentioned above, type A shown in FIG. 14 and type B shown in FIG. 15. Namely, in type A, the filter processing is carried out by calculation according to the equation (3), whereas, in type B, the following equation (4) is used for calculation.

$$hV\text{-filter}(TypeB) = c \times (1/4 - \alpha/2) + h \times 1/2 + \alpha + m \times (1/4 - \alpha/2) \quad (4)$$

It should be pointed out that the coefficient a can be set by the equation (2) as in the case of type A. Since other processing is carried out in a similar manner, description of the processing will be omitted.

Figure 11:
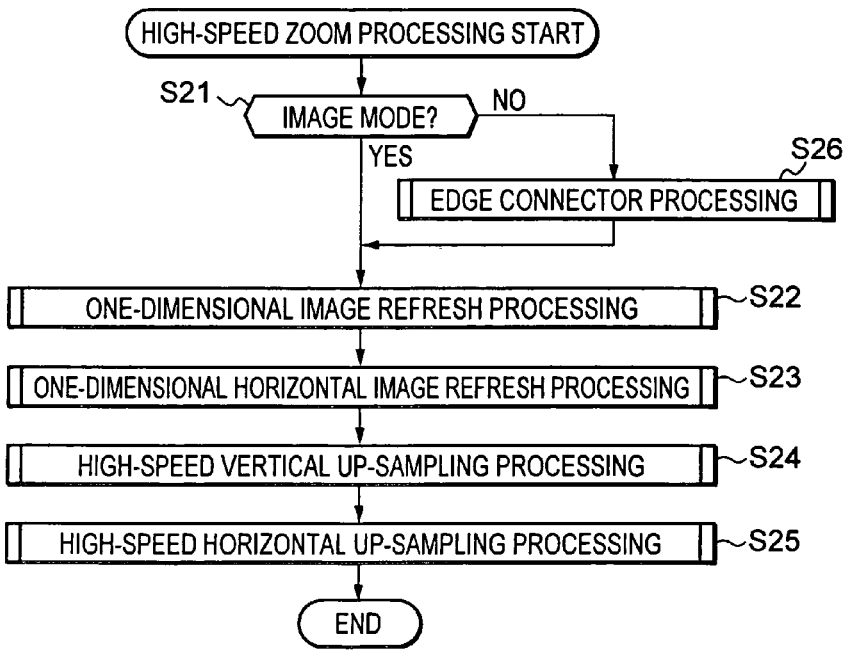
FIG. 11 is a flowchart of assistance in explaining high-speed zoom processing at step S4 of FIG. 10.

At this point, we return to description of the processing in FIG. 11.

If the one-dimensional vertical image refresh processing in the processing of the step S22 is carried out, the step S23 follows for execution of one-dimensional horizontal image refresh processing.

Now, the one-dimensional horizontal image refresh processing by the one-dimensional horizontal image refresh processing unit 18 will be described with reference to a flowchart in FIG. 16.

At step S51, the one-dimensional horizontal image refresh processing unit 18 determines whether or not there is an unprocessed pixel from image data subjected to the one-dimensional vertical image refresh processing by the one-dimensional vertical image refresh processing unit 17, and if it is determined that there is an unprocessed pixel, the process moves to step S52.

At the step S52, the central pixel energy calculating unit 181 retrieves the unprocessed pixel and calculates vertical-direction central image energy of the retrieved unprocessed pixel. For example, suppose image data shown in FIG. 17 is inputted with pixels from a to e, pixels from f to j, and pixels from k to o are disposed on each line of y+1 and y−1 in the vertical direction. Then, horizontal-direction central pixel energy EH-h of A area in the proximity of a pixel h is given by the following equation.

$$EH\text{-}h = |(d+i+n) - (b+g+l)| \quad (5)$$

where d, i, n, b, g, and l are pixel values of pixels d, i, n, b, g, and l. Namely, the horizontal-direction central pixel energy EH of the equation (5) is a sum of absolute values of difference between pixel values present on a right line and pixel values present on a left line relative to the center that is positioned at the unprocessed pixel. Consequently, if correlated pixels are present at the left and the right thereof, there is no appreciable discrepancy in the differences of their pixel values, so that the horizontal-direction central pixel energy becomes small, while on the other hand, if pixels having no correlation are present at the left and the right thereof, there is often appreciable discrepancy in the differences of their pixel values, resulting in increasing the horizontal-direction central pixel energy.

The central pixel energy calculating unit 181 obtains the horizontal-direction central pixel energy EH-h of the unprocessed pixel by calculating the above equation (5).

At step S53, the horizontal maximum value/minimum value detecting unit 182 obtains a maximum value and a minimum value by comparing the pixel values of three pixels at the left and the right including the unprocessed pixel. Namely, for example, as shown in FIG. 17, if the unprocessed pixel is the pixel h, each pixel value of the unprocessed pixel itself and its right and left pixels g, h, and i (B area enclosed by a broken line in FIG. 13) is read, and, as shown in FIG. 18, the maximum value (g, h, and i) and the minimum value (g, h, and i) thereof are obtained.

At step S54, the judging and comparing unit 184 determines whether or not the obtained horizontal direction central pixel energy EH is greater than the minimum value (g, h, and i) and smaller than the maximum value (g, h, and i). If it is determined to be greater than the minimum value (g, h, and i) and smaller than the maximum value (g, h, and i), that is, if the pixel is determined to be either edge or texture, the process goes to step S55.

At the step S55, the horizontal filter processing unit 183 calculates a coefficient ox constituting a horizontal one-dimensional filter. As in the above-mentioned equation (2), the coefficient a is given by calculation shown in an equation (6).

$$\alpha = \alpha 0 - (EH\text{-}h/EH\text{-}h\text{-}max) \qquad (6)$$

where $\alpha 0$ ($1 < \alpha 0 \leq 2$) is a value that may be arbitrary set by the user, and EH-h-max is the maximum value of the horizontal direction central pixel energy EH-h. It should be noted that the maximum value EH-h-max of the horizontal-direction pixel energy is different from the maximum value (g, h, and i) and represents the maximum value that can be calculated.

At step S56, the horizontal filter processing unit 183 performs the one-dimensional horizontal filter processing as shown in FIG. 18 for pixels g, h, and i of B area shown in FIG. 17. Namely, the one-dimensional horizontal filter may be what is shown as $(1/2-\alpha/2, \alpha, 1/2-\alpha/2)(1<\alpha \leq 2)$. For example, if the filter is type A mentioned above, by means of a calculation shown in an equation (7) below, a pixel value hH-filter subjected to the filter processing may be given.

$$hH\text{-filter} = g \times (1/2-\alpha/2) + h \times \alpha + i \times (1/2-\alpha/2) \qquad (7)$$

where the coefficient $\alpha$ is a value obtained by the above-mentioned processing at the step S55, enables to adjust the degree of enhancement of the edge or texture by filter. Namely, the coefficient $\alpha$ dynamically changes in accordance with the value of the horizontal-direction central pixel energy EH-h. If the horizontal-direction central pixel energy EH-h is small, the coefficient $\alpha$ becomes large, causing the one-dimensional horizontal filter shown in FIG. 18 to act strongly on the pixel h. Conversely, if the horizontal direction central pixel energy EH-h is large, the coefficient $\alpha$ becomes small, causing the one-dimensional horizontal filter shown in FIG. 18 to act weakly on the pixel h.

At step S57, the judging and comparing unit 184 determines, as shown in FIG. 18, whether a pixel being processed is an edge or texture. Namely, if the horizontal-direction central pixel energy EH-h has a value close to the minimum value (g, h, and i) if it is texture, and has a value close to the maximum value (g, h, and i) if it is edge. Hence, a threshold EH-s is set up in the middle between the maximum value (g, h, and i) and the minimum value (g, h, and i). If the horizontal-direction central pixel energy EH-h is greater than the threshold EH-s, it is determined as edge; conversely, if the horizontal direction central pixel energy EH-h is smaller than the threshold EH-s, it is determined as texture. For example, if the horizontal central pixel energy EH-h is greater than the threshold EH-s, the judging and comparing unit 184 determines that the remarked pixel being processed is an edge (determining that it is a pixel positioned in an edge-indicated area), and the process goes to step S58.

At the step S58, the judging and comparing unit 184, as shown in FIG. 18, compares the pixel value hH-filter subjected to the filer processing with the maximum value (g, h, and i) to determine whether or not the pixel value hH-filter subjected to filer processing is equal to or greater than the maximum value (g, h, and i). If it is determined to be equal to or greater than the maximum value (g, h, and i), at step S59, the judging and comparing unit 184 substitutes the maximum value (g, h, and i) for the pixel value hH-filter.

At step S60, the judging and comparing unit 184 permits the buffer 18a to store the pixel value substituted with the maximum value (g, h, and i) as the pixel value of the pixel h, and the process returns to the step S31, where the similar processing is repeated until it is determined that the one-dimensional vertical image refresh processing is carried out for all pixels.

At the step S54, if the horizontal-direction central pixel energy EH is determined not to be greater than the minimum value (g, h, and i) and not smaller than the maximum value (g, h, and i), that is, if the pixel is determined to be neither edge nor texture, the process goes to step S40 where the judging and comparing unit 184 permits the pixel value of the pixel h to be stored as it is without filter processing in the buffer 18a, and the process returns to the step S51 to repeat processing thereafter. Additionally, at step S57, if the horizontal-direction central pixel energy EH-h is determined to be smaller than the threshold EH-s, the one-dimensional image refresh processing unit 18 determines that the remarked pixel being processed is texture, and the process goes to the step S60. That is, the judging and comparing unit 184 permits the pixel value hH-filter subjected to the filter processing to be stored in the buffer 18a as the value of the pixel h.

At step S58, if it is determined that the pixel value hH-filter subjected to the filter processing is not equal to nor greater than the maximum value (g, h, and i), the judging and comparing unit 184 compares, at step S61, the pixel value hH-filter subjected to the filer processing with the minimum value (g, h, and i) to determine whether or not the pixel value hH-filter subjected to the filer processing is equal to or smaller than the minimum value (g, h, and i). If the pixel value hH-filter subjected to filer processing is determined to be equal to or smaller than the minimum value (g, h, and i), the process goes to step S62.

At the step 62, the judging and comparing unit 184 substitutes the minimum value (g, h, and i) for the pixel value hH-filter, and at the step S60, the pixel value substituted with the minimum value (g, h, and i) is stored in the buffer 18a at the pixel value of the pixel h.

At the step S61, if it is determined that the pixel value hH-filter subjected to the filter processing is not equal to nor smaller than the minimum value (g, h, and i), the process goes to the step S60 where the judging and comparing unit 184 permits the pixel value hH-filter subjected to the filter processing to be stored in the buffer 18a as the pixel value of the pixel h, and the process returns to the step S51.

Figure 16:
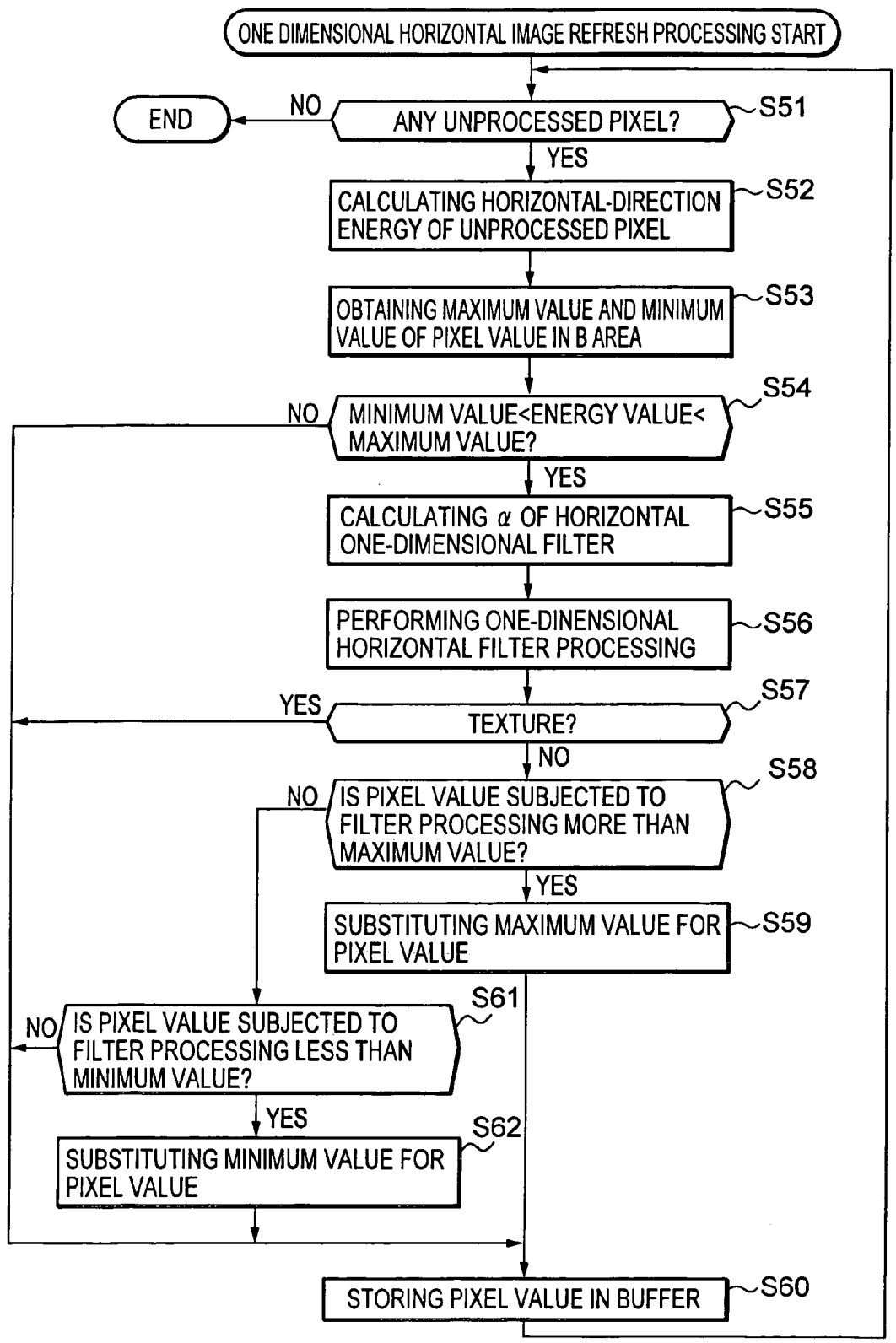
FIG. 16 is a flowchart of assistance in explaining one-dimensional horizontal image refresh processing at a step 23 of FIG. 11.

Namely, if, in the processing of the step S54, the horizontal-direction central pixel energy EH is greater than the minimum value (g, h, and i) and smaller than the maximum value (g, h, and i), as shown in FIG. 16, the maximum value (g, h, and i) and the minimum value (g, h, and i) obtained in the processing of the step S53 are considered as the maximum value and the minimum value of the pixels g, h, and i within a local range. If the pixel value obtained by the filter processing in the processing of step S56 is included in the range of such minimum value and maximum value, further processing at the step S57 is performed to determine whether it is an edge or texture. If it is determined as texture, the pixel value subjected to the filter processing is stored as it is in the buffer 18a. If it is determined as an edge and equal to or smaller than the minimum value (g, h, and i), the pixel value is considered as the minimum value while if it is equal to or greater than the maximum value (g, h, and i), the pixel value is considered as the maximum value (subjected to clipping), and the pixel value is stored in the buffer 18a. If, in the processing of the step S54, the horizontal-direction central pixel energy EH is determined not to be greater than the minimum value (g, h, and i) and not smaller than the maximum value (g, h, and i), or if it is determined as neither edge nor texture, the original pixel value without the filter processing is stored in the buffer 18a.

Figure 19:
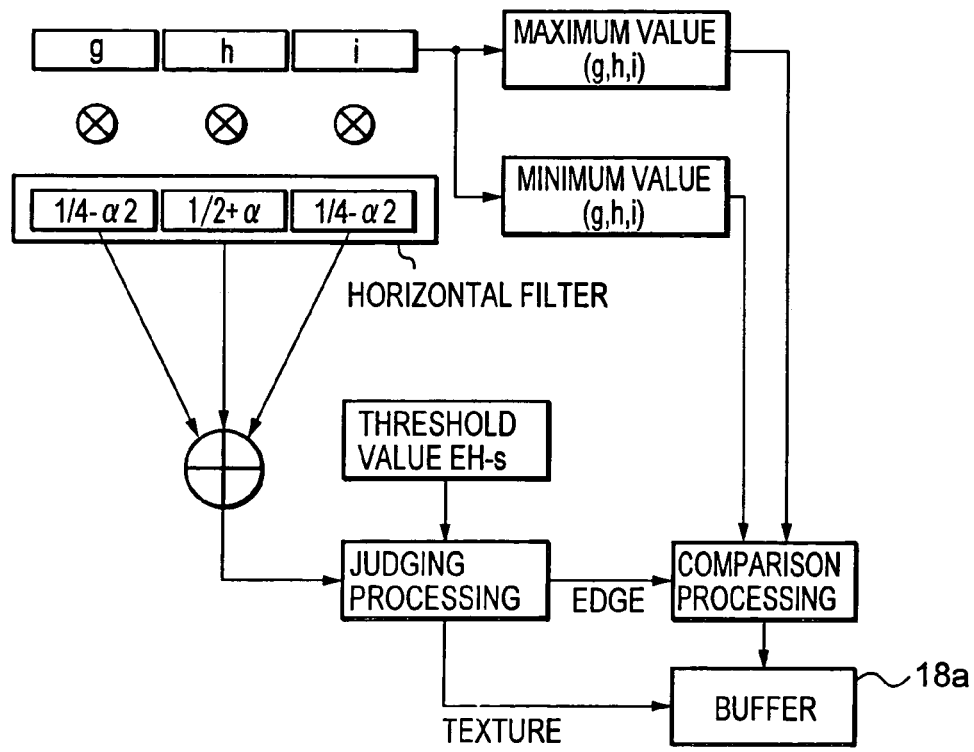
FIG. 19 is a diagram of assistance in explaining one-dimensional horizontal image refresh processing at the step 23 of FIG. 11.

It should be noted that the one-dimensional horizontal filter is available in two types as mentioned above, type A shown in FIG. 18 and type B shown in FIG. 19. Namely, in type A, the filter processing is carried out by calculation according to the equation (7), whereas, in type B, the following equation (8) is used for calculation.

$$hH\text{-filter (Type}B) = g \times (1/4 - \alpha/2) + h \times 1/2 + \alpha + i \times (1/4 - \alpha/2) \quad (8)$$

It should be pointed out that the coefficient α can be set by the equation (2) as in the case of type A. Since other processing is carried out in a similar manner, description of the processing will be omitted.

At this point, we return to description of the processing of FIG. 11.

Figure 20:
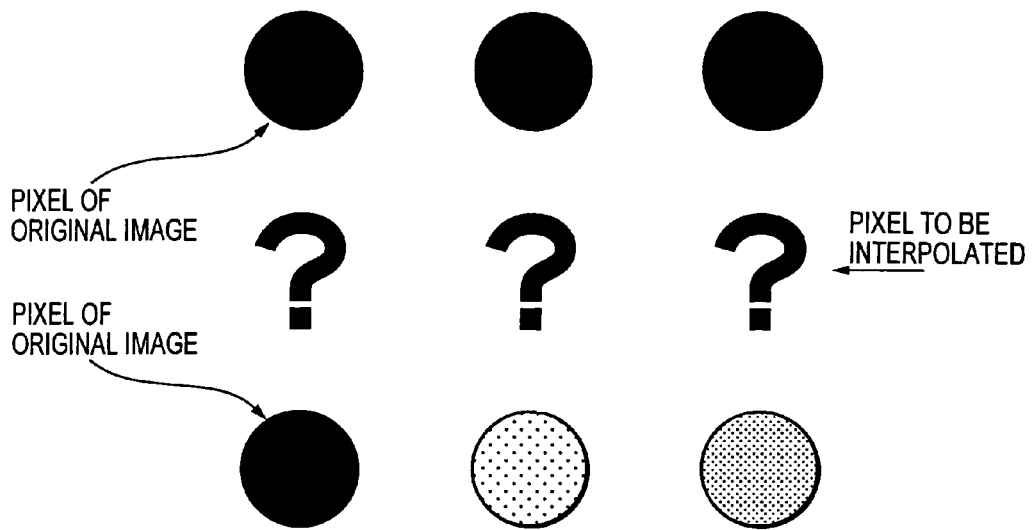
FIG. 20 is a diagram of assistance in explaining high-speed vertical up-sampling processing.

If the one-dimensional horizontal image refresh processing at the step S23 is carried out, the step S24 follows for execution of the high-speed vertical up-sampling processing. The high-speed vertical up-sampling processing, for example, as shown in FIG. 20, is a process to increase the number of pixels of the original image inputted from the image input section 1 in the vertical direction. The high-speed vertical up-sampling processing is carried out by the high-speed vertical up-sampling processing unit 12.

Figure 21:
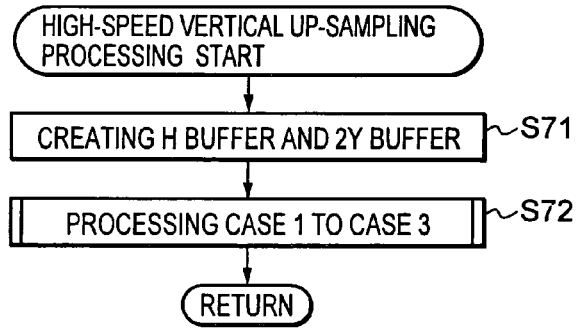
FIG. 21 is a flowchart of assistance in explaining details of high-speed vertical up-sampling processing at a step 24 of FIG. 11.

Now, the high-speed vertical up-sampling processing will be described with reference to a flowchart in FIG. 21. A high-speed vertical up-sampler 111 first creates an H buffer 31 (to be explained later with FIG. 23) and a 2Y buffer 41 (to be explained later with FIG. 33) at step S71. If the size of the original image (I_image) inputted from the image input section 1 is In_width×In_height, the size of the H buffer 31 becomes In_width×(alpha_Z×In_height), where alpha_Z indicates a magnification for enlarging the original image in the vertical direction. In the present case, because of the high-speed vertical up-sampling, the value is greater than 1 and smaller than 2 (the steps S3 and S4).

The 2Y buffer 41 has the size of In_width×1. In the 2Y buffer 41, an pixel which is interpolated is temporarily stored.

Next, at step S72, the high-speed vertical up-sampling processing unit 12 executes processing corresponding to a case 1 to a case 3.

The processing of the case 1 to the case 3 are process for generating interpolated data of a Y line of the H buffer 31. Which processing of the case 1 to the case 3 may be used to generate the interpolated data of the Y line is determined as follows.

Namely, in the present embodiment, a virtual vertical twofold enlarged image 2Y_image is assumed as an enlarged image of the original I_image enlarged twofold in the vertical direction. Since an image to be stored in the H buffer 31 is an enlarge image of the original I_image enlarged by a factor of Z in the vertical direction. Assuming that a line in the virtual vertical twofold enlarged image 2Y_image is 2Y_line and a line in the image to be stored in the H buffer 31 is Y, then, the following proportional expression holds:

$$Y : 2Y\_line = alpha\_Z : 2 \quad (9)$$

From this expression, the following equation is obtained.

$$2Y\_line = Y \times 2 / alpha\_Z \quad (10)$$

If a value 2Y_line calculated from the above equation (10) is an integer and an even number (2Y_line=2n, n being an integer), the interpolated data of the Y line is generated by the processing of the case 1. If the value 2Y_line is an integer and an odd number (2Y_line=2n+1, n being an integer), the interpolated data of the Y line is generated by the processing of the case 2. For other cases, that is, if the value 2Y_line is a real number, the interpolated data of the Y line is generated by the processing of the case 3.

Figure 22:
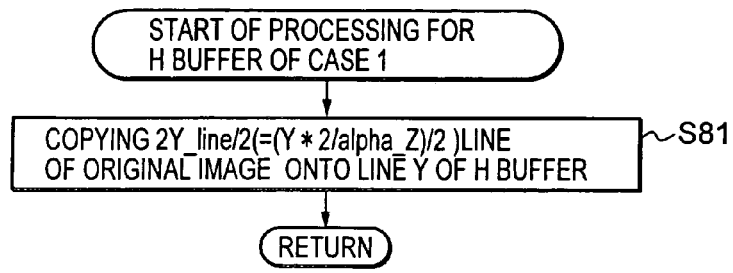
FIG. 22 is a flowchart of assistance in explaining processing of a case 1 at a step 72 of FIG. 21.

In the case 1, the process shown in a flowchart of FIG. 22 is carried out. Namely, in the case 1, the value of the line Y of the H buffer 31 may be set so as to correspond to a predetermined line value (2Y_line/2=n) in the original I_image. Accordingly, at the step S81, the high-speed vertical up-sampler 111 copies a 2Y_line/2 line of the original I_image, as it is, onto the Y line of the H buffer 31.

Figure 23:
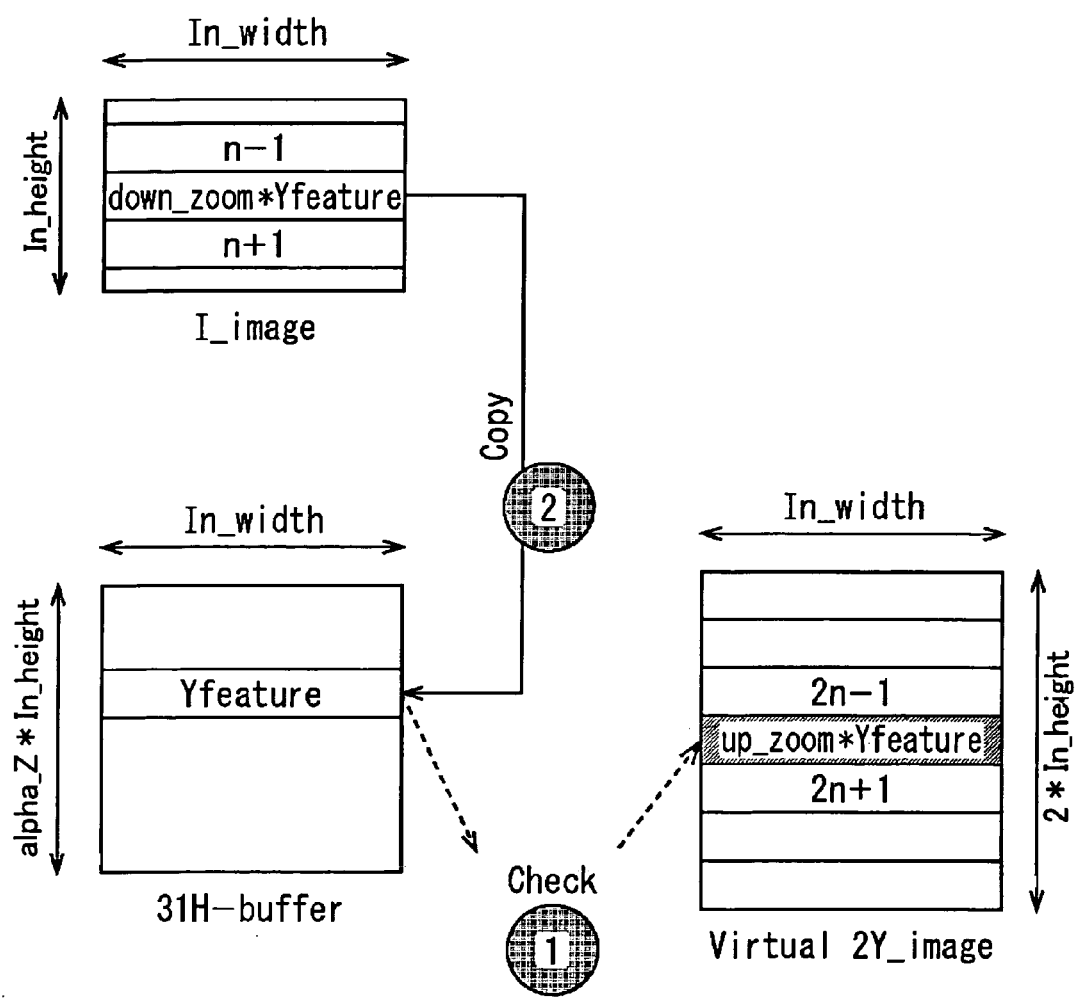
FIG. 23 is a diagram of assistance in explaining the processing of the case 1 in FIG. 22.

Processing in this case is schematically shown in FIG. 23. Namely, in the case 1, since the value of the line Y of the H buffer 31 is equal to the value of a line n of the original I_image. Accordingly, the n(=2Y_line/2) line of the original image may be copied, as it is, onto the Y line of the H buffer 31.

Next, the processing in the case 2 will be described with reference to a flowchart of FIG. 24. In the case 2, since the value of (2n+2)/2 is not an integer, the value of the line Y of the H buffer 31 cannot be set so as to correspond to a predetermined line value in the original I_image. However, it may be set so as to correspond to a predetermined line value (2n+1) in the virtual vertical twofold enlarged image 2Y_image.

Accordingly, in this case, at step S91, the high-speed vertical up-sampler 11 extracts pixels on an upper line "up_line" and a lower line "down_line" in the predetermined range (N pixel) of the original I_image. The value of N is considered to be variable, therefore, the central coordinates of the up line becomes (X+N/2,n) and the central coordinates of the down_line becomes (X+N/2,n+1)

Next, at step S92, the edge detecting unit 122 of the vertical direction interpolating unit 112 calculates local energy E(N) based on a signal subjected to band limiting by the band limiting unit 121 from the following equation.

$$E(N)=\Sigma(I=0, N-1)ABS(\text{up\_line}(I)-\text{down\_line}(N-I-1)) \quad (11)$$

The calculation of the above-mentioned equation (11) shows that subtraction of pixels of the down_line disposed on diagonal lines from respective pixels of the up_line is performed and summation of its absolute value from I=0 to N−1.

Figure 25:
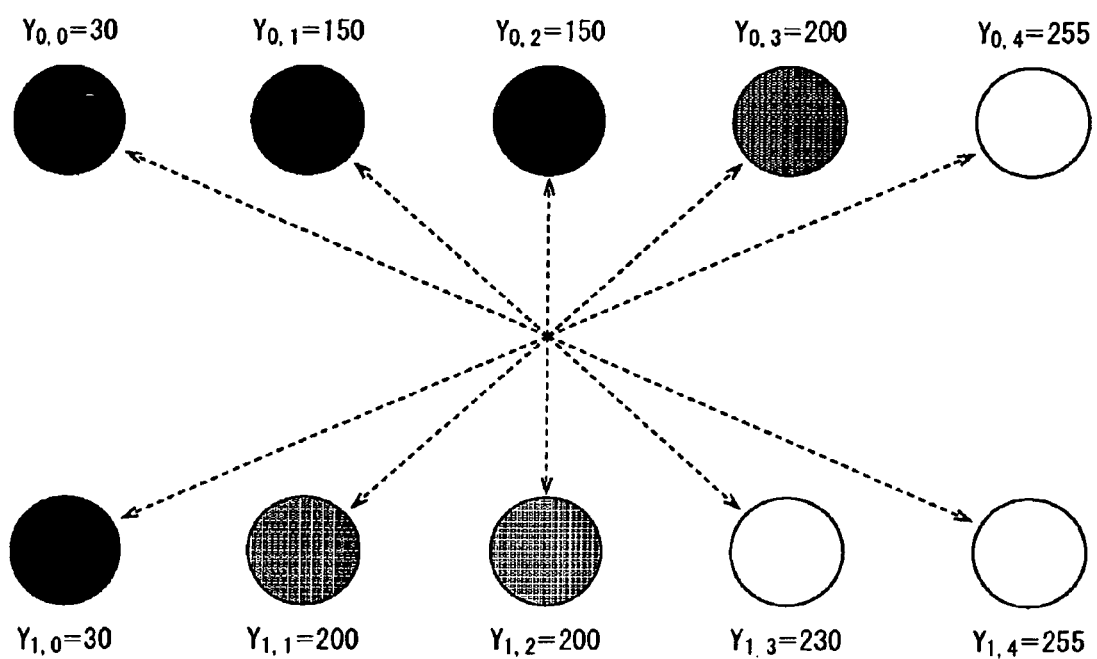
FIG. 25 is a diagram of assistance in explaining calculation of local energy at a step 92 of FIG. 24.

FIG. 25 shows an example of calculation of local energy E(N). As shown therein, from the pixels of the up_line, and down_line, the pixel values of the pixels on the lower line are subtracted from the pixels disposed on the diagonal lines, and a sum of absolute values of differences is E(N). In the example of FIG. 25, a value (255) of a pixel Y1,4 is subtracted from a value (30) of a pixel Y0,0. Also, a pixel value (230) of a pixel Y1,3 is subtracted from a pixel value (150) of a pixel Y0,1. In a similar manner, a value (200) of a pixel Y1,2 is subtracted from a value (150) of a pixel Y0,2, a pixel value (200) of a pixel Y1, 1 is subtracted from a pixel value (200) of a pixel Y0,3, and a pixel value (30) of a pixel Y1,0 is subtracted from a pixel value (255) of a pixel Y0,4. The sum of absolute values of respective differences becomes the local energy.

At step S93, the edge detecting unit 122 determines whether or not the local energy E(N) is greater than a predetermined threshold T. If the local energy E(N) is equal to or smaller than the threshold T, such area is considered as a flat, low energy area including no edges. In this case, it is not necessary to calculate the direction of potential edges. Accordingly, the process proceeds to step S94, and the direction judging unit 123, based on the result of determination by the edge detecting unit 122, calculates an average value of an adjacent upper line central pixel "up line (N/2)" and an adjacent lower line central pixel "down_line (N/2)" and stores it as the pixel data for the coordinate (X+N/2,Y) of the H buffer 31, while, outputting directional information indicating the vertical direction (direction L2 in FIG. 31 to be explained later) to the reliability ranking unit 124 and the directional distribution generating unit 125. Further, the reliability ranking unit 124 outputs 0, which indicates low reliability concerning this particular interpolated pixel, to the directional distribution generating unit 125. Namely, at the step S94, a typical linear interpolation processing is carried out based on the following equation.

$$H\_\text{buffer}(X+N/2,Y)=0.5\times(\text{up\_line}(N/2)+\text{down\_line}(N/2)) \quad (12)$$

On the other hand, at the step S93, if the value of the local energy E(N) is determined to be greater than the threshold T, such area is considered as a high energy area including potential edges. In this case, at step S95, the direction judging unit 123 of the vertical-direction interpolating unit 112, based on an image signal subjected to band limiting by the band limiting unit 121, carries out calculation processing to test an edge direction and outputs information on the detected direction to the reliability ranking unit 124 and the directional distribution generating unit 125, while, outputting information on the detected pixels to the direction interpolating unit 131. Specifically, the following calculation is repeated as long as x remains to be greater than −1 while x is being decremented from x=N−1.

$$\text{Energy}=ABS(\text{up\_line}(N-x-1)-\text{down\_line}(x)) \quad (13)$$

Of the energy values calculated by the above equation (13), the smallest value is selected, and the direction of diagonal lines to which the two pixels correspond is considered as the direction of a local edge.

Figure 26:
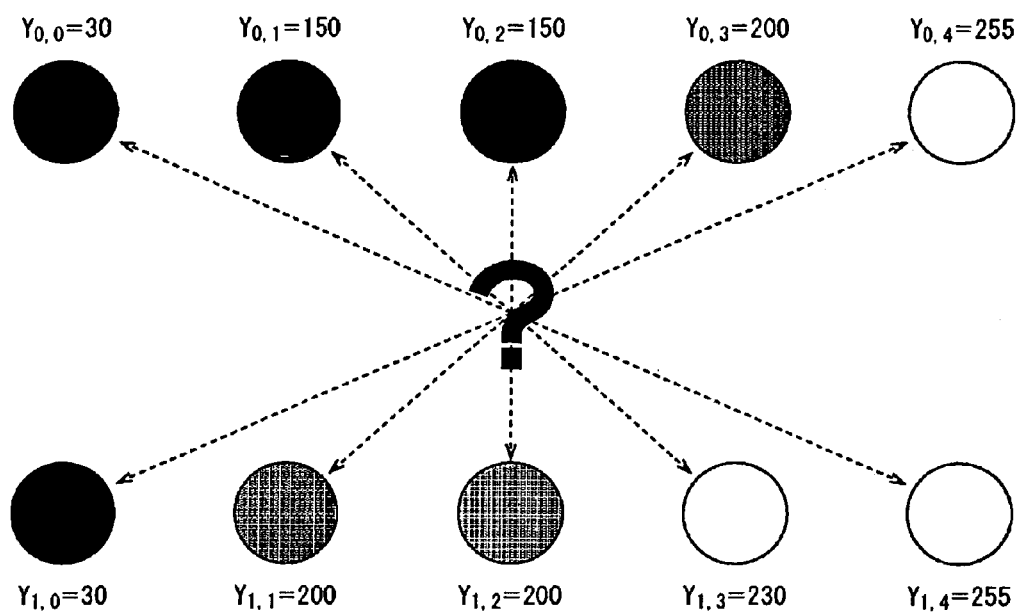
FIG. 26 is a diagram of assistance in explaining the processing of calculating an edge direction at a step 94 of FIG. 24.

FIG. 26 shows a specific example of this case. In this example, a difference between the pixel value (30) of the pixel Y0,1 and the pixel value (255) of the pixel 1,4, a difference between the pixel value (200) of the pixel Y0,3 and the pixel value (200) of the pixel 1,1, and a difference between the pixel value (255) of the pixel Y0,4 and the pixel value (30) of the pixel 1,0 are respectively calculated. And of the absolute values of such values, the smallest value (in this example, a direction connecting the pixel Y0,3 to the pixel Y1,1) is considered as a local edge direction.

Figure 27:
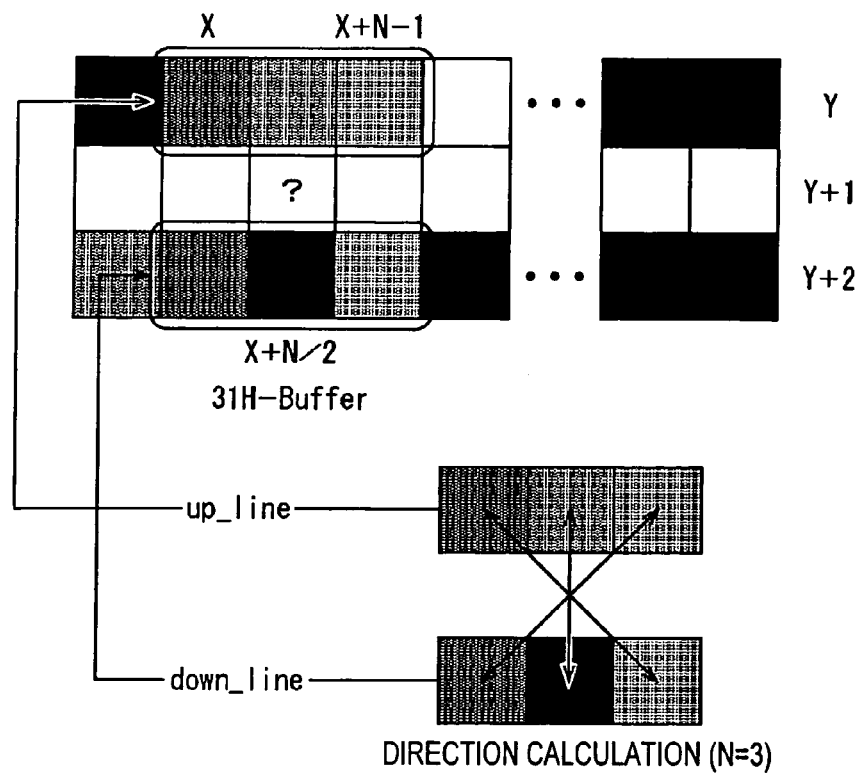
FIG. 27 is a diagram of assistance in explaining the processing of calculating an edge direction at the step 94 of FIG. 24.

FIG. 27 shows an example in which, from a difference between the three pixels on the up_line and the three pixels on the down_line held by the H buffer 31, a local edge direction is presumed. In an example of FIG. 27, the value of N is set to be 3, whereas by setting a large value for the N, more accurate detection of edges in more directions may be made.

If an edge direction is detected in the processing of step S95, further at step S96, the direction interpolating unit 131 carries out interpolation processing (direction interpolation processing to be carried out) by using pixels of the detected edge direction. It means that this direction interpolation processing, based on the pixel values of two pixels corresponding to the edge direction, interpolates a pixel value of a pixel disposed in between. Take an example of FIG. 26 where an average value (200) of the pixel values of the pixel Y0,3 and the pixel Y1,1 is considered as the pixel value of a pixel between the two pixels.

Next, the process goes to step S97 where the reliability ranking unit 124 carries out structural collector processing. The structural collector processing is processing to check consistency of a renewed local structure (a pixel generated by direction interpolation processing of the step S96 and the pixels thereon and thereunder) by analyzing a relationship between a pixel interpolated at the coordinates (X+N/2,Y) and its vertical proximity pixel, that is, between the coordinates up_line(N/2) and the coordinates down_line(N/2).

Namely, in the structural collector processing, processing to subtract the renewed pixel from the central pixel at the upper line is carried out, and further processing to subtract the central pixel at the lower line from the renewed pixel. Moreover, these two subtraction results thus obtained are multiplied to produce a value V(N/2) that indicates a change in the vertical direction. That is, calculation shown in the following equation is performed at the step S96.

$$V(N/2)=(\text{up\_line}(N/2)-H\text{-buffer}(X+N/2,Y))\times(H\text{-buffer}(X+N/2,Y)-\text{down\_line}(N/2)) \quad (14)$$

Next, at step S98, the reliability ranking unit 124 determines, based on the result of calculation at the step S97, whether or not there is consistency of the renewed local structure. This determination is carried out based on whether or not a value V(N/2) calculated by the above equation (14) is positive. If the value V(N/2) is positive, consistency is considered to be present, and, at step S99, the reliability ranking unit 124 sets the reliability of the interpolated pixel to 1 and outputs it to the directional distribution generating unit 125.

On the other hand, at the step S98, if the value V(N/2) is determined to be negative, consistency is considered to be not present. Namely, judging of the local direction is incorrect, and the pixel value generated at the step S96 is determined to be not proper. In this case, the reliability ranking unit 124 sets the reliability of the interpolated pixel to 0, and outputs it to the directional distribution generating unit 125.

At step S101, it is determined whether or not all the pixels due to be interpolated in the remarked area associated with the remarked pixel are interpolated. If it is determined that all the pixels due to be interpolated are not interpolated, the process returns to the step S91 where the processing from the steps S91 to S101 is repeated until all pixels due to be interpolated are interpolated. If it is determined that all the pixels due to be interpolated are interpolated, the process goes to step S102. The remarked area associated with the remarked pixel corresponds to, for example, the interpolated pixels in the range of P (number of pixels)×M(lines) shown in FIG. 28. It should be noted that in FIG. 28, white circles stand for the remarked pixels (interpolated pixels), black circles stand for pixels due to be interpolated, and circles filled with grids stand for pixels of original images (originally present pixels). That all pixels due to be interpolated are interpolated at the step S101 indicates all the pixels shown in black circles therein being fully interpolated, and the process moves to step S102.

At the step S102, the direction selection processing is performed.

Figure 29:
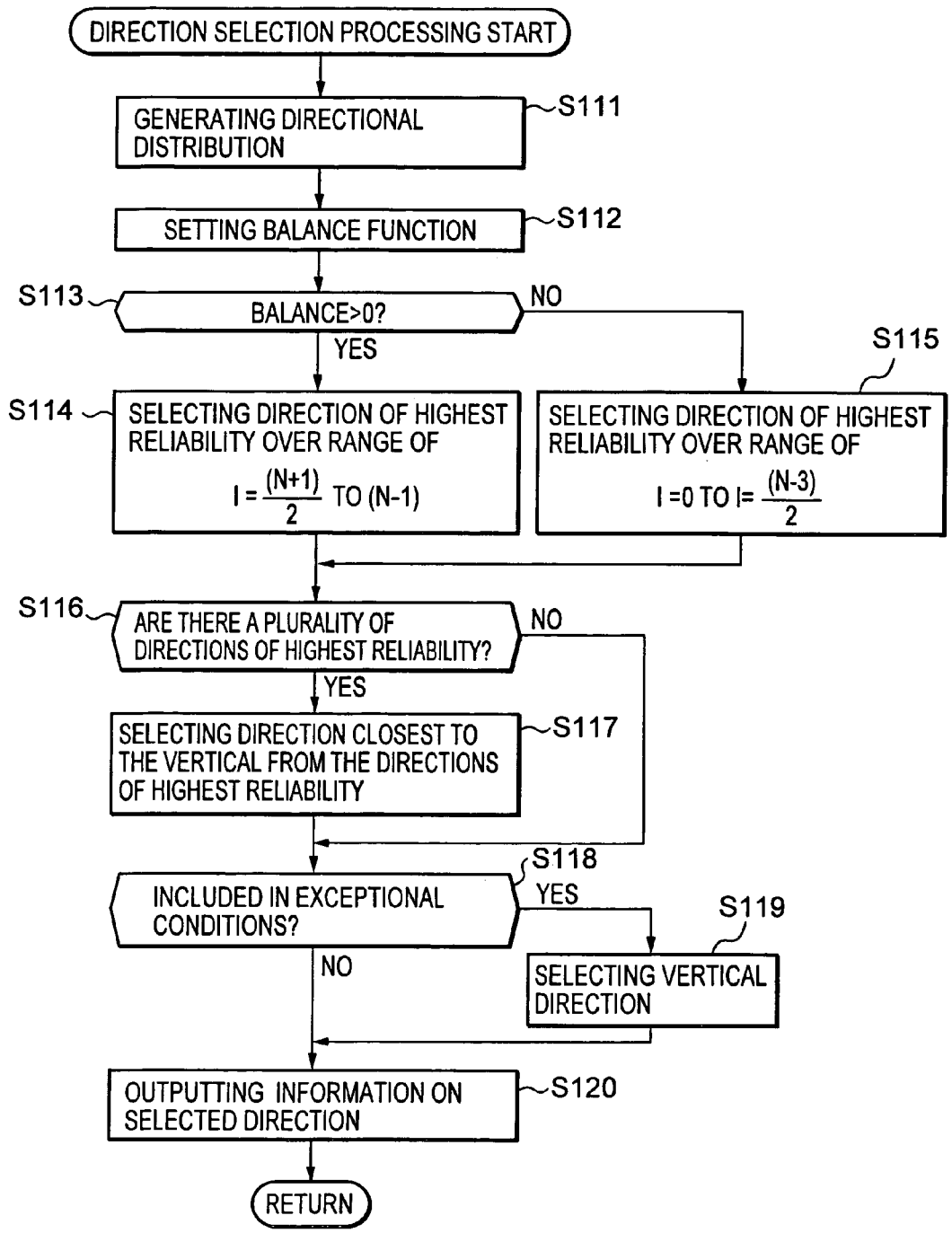
FIG. 29 is a flowchart of assistance in explaining direction selection processing at step S102 of FIG. 24.

The direction selection processing will be described with reference to a flowchart in FIG. 29.

At step S111, the directional distribution generating unit 125 generates a directional distribution. Namely, the directional distribution generating unit 125 generates the directional distribution from the edge directions thus far inputted and information on reliability thereof. That is, as shown in FIG. 30, the directional distribution generating unit 125 is inputted with the interpolating directions of respective interpolated pixels corresponding to the arrangement of the interpolated pixels and information on corresponding reliability.

Figure 28:
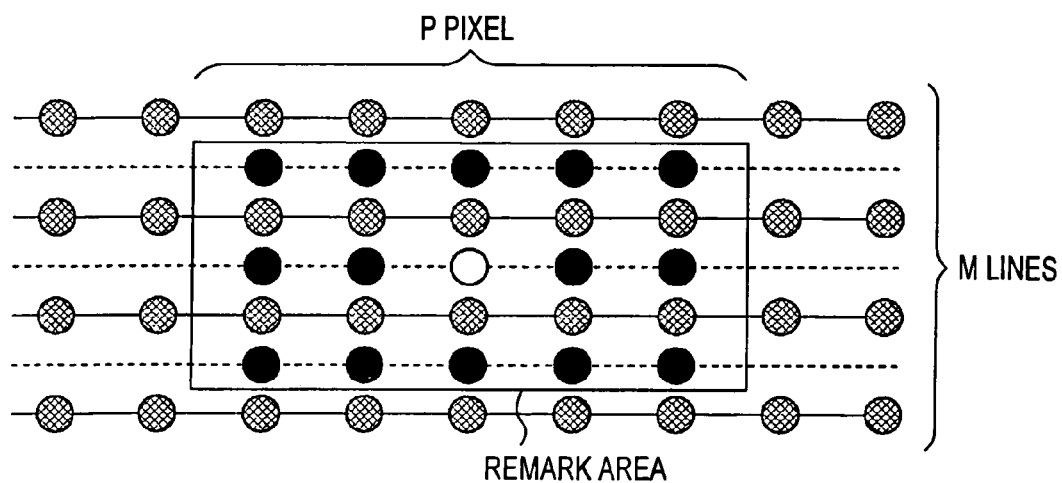
FIG. 28 is a diagram of assistance in explaining a remarked area.
Figure 30:
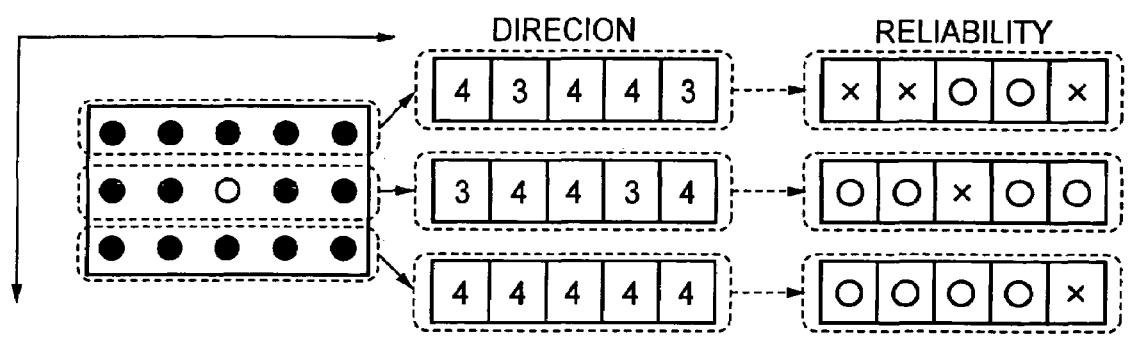
FIG. 30 is a diagram of assistance in explaining examples of direction and reliability.
Figure 31:
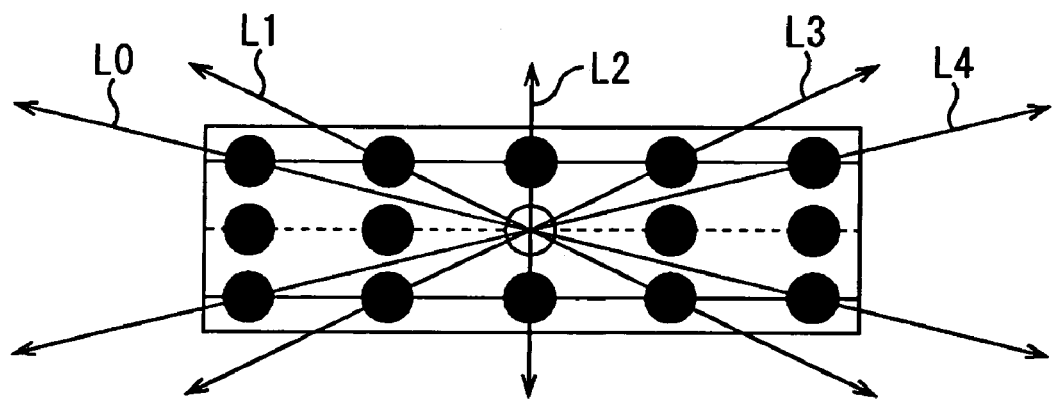
FIG. 31 is a diagram of assistance in explaining a defined edge direction.

It should be noted that in FIG. 28, there are shown interpolated pixels of 5 pixels×3 lines with an arrangement of 15 corresponding interpolated pixels at the left part of FIG. 30. Further, in the center of FIG. 30 is shown the interpolating direction of each interpolated pixel. These directions of the interpolated pixels are, as shown in FIG. 31, numbers corresponding to the directions set so as to form a point symmetry around the remarked pixel: a direction L0 is a direction on a straight line connecting an interpolated pixel at the upper left end to an interpolated pixel at the lower right end; a direction L1 is a direction on a straight line connecting a second interpolated pixel from the upper left end to a second interpolated pixel from the lower right end; a direction L2 is a direction on a straight line connecting an interpolated pixel directly above to an interpolated pixel directly below; a direction L3 is a direction on a straight line connecting a second interpolated pixel from the upper right end to a second interpolated pixel from the lower left end; and a direction L4 is a direction on a straight line connecting an interpolated pixel at the upper right end to an interpolated pixel at the lower left end. Furthermore, at the right part of FIG. 30 there is shown distribution of reliability. A pixel whose reliability is reported as 1 is indicated by O, while a pixel whose reliability is reported as 0 is indicated by X.

Namely, according to FIG. 30, it is shown that the interpolating directions of interpolated pixels are 4, 3, 4, 4, and 3 from the upper left; 3, 4, 4, 3, and 4 from the middle left; and 4, 4, 4, and 4 from the lower left. Also, reliability is shown as X, X, O, O, and X from the upper left; O, O, X, O, and O, from the middle left; and O, O, O, O, and X from the lower left.

Figure 32:
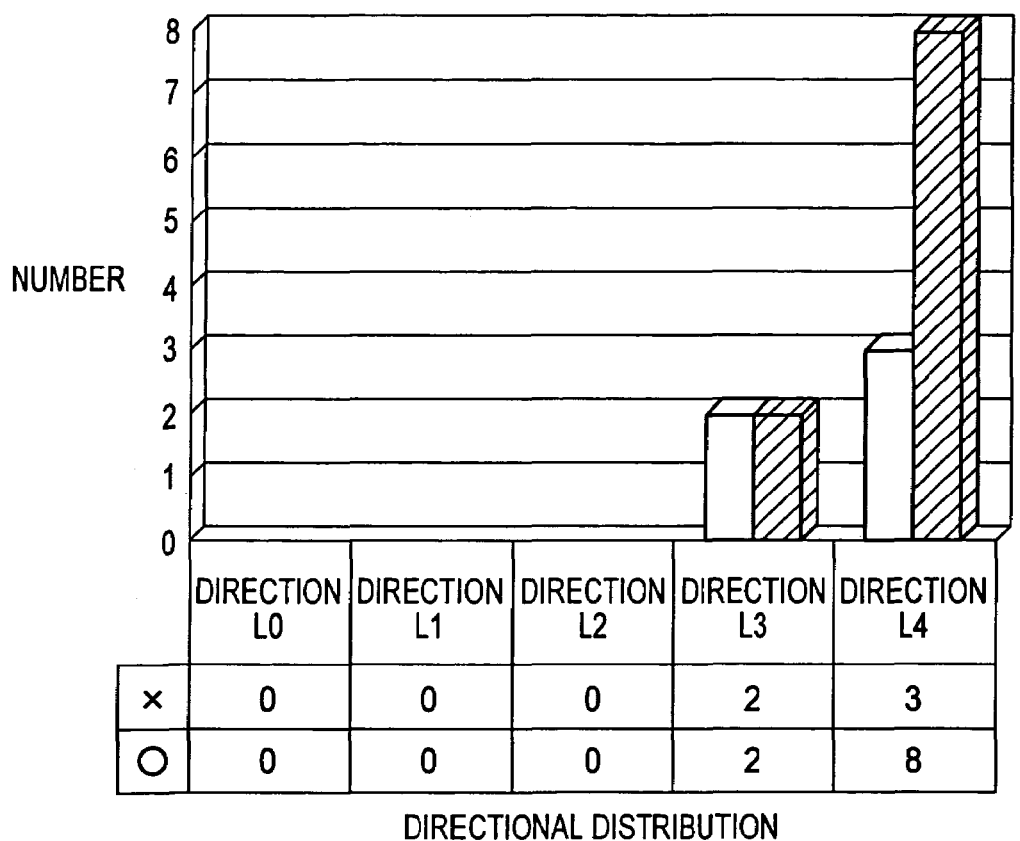
FIG. 32 is a diagram of assistance in explaining directional distribution.

As a result, the directional distribution generating unit 125 may indicate, as shown in FIG. 32, the distribution by direction through generating directional distribution in terms of a histogram indicating the number of O given to each direction. That is, in FIG. 32, the direction L0 has zero O and zero X, the direction L1 has zero O and zero X, the direction L2 has zero O and zero X, the direction L3 has two O and two X, and the direction L4 has eight O and three X.

At step S112, the direction selecting unit 126 sets the following Balance function from these directional distributions (interpolating direction and corresponding reliability distribution).

Namely, first, the direction selecting unit 126 sets the Balance function corresponding to the remarked pixel (X, Y) shown in the following equation (15):

$$\text{Balance}(X,Y)=\Sigma(I=(N+1)/2,\ N-1)(\text{Population}(LI))-\Sigma(I=0,(N-3)/2)(\text{Population}(LI)) \quad (15)$$

Population (LI) is a function which shows the number of pixels expressing that there is reliability per direction LI, $\Sigma$ indicating obtaining a total sum, and (I=N+1)/2, N−1)or (I=0,(N−3)/2) indicating a range of I in which the total sum is calculated. N shows the number of directions set. Accordingly, in FIG. 31, there are directions from L0 to L4, hence, N=5.

At step S113, the direction selecting unit 126 determines whether or not the Balance (X, Y) has a positive value. For example, if it is determined to have the positive value, from the direction LI defined in FIG. 31, a direction having the highest reliability over a range in which I is from I=0 to (N−3)/2 is selected at the step S113.

Namely, the function defined in the equation (15) indicates on which of the left side and the right side lies a reliability tendency when positions of the upper tips of arrows indicating the direction are checked if they are positioned to the left and right side of the direction L2 while assuming the vertical direction L2 is set at the center. For example, a difference of respective sums of the reliability of the directions of a whole group of L0 and L1 as defined in FIG. 31 and the reliability of a whole group of directions L3 and L4 is obtained by the processing of step S114, and by comparing its magnitude, then, it is obtained toward which side of the left and the right it is slanted with respect to the vertical direction, and the direction having the highest reliability is selected from the group indicating the reliability tendency.

At step S116, the direction selecting unit 126 determines whether or not there are a plurality of directions showing the highest reliability. For example, if there are a plurality of such directions, from a plurality of the directions selected having the highest reliability, the direction closest to the vertical direction is selected at step S117. On the other hand, if there are no plurality of directions having the highest reliability at the step S116, the processing of the step S117 is skipped, whereby a direction selected by the processing of the step S114 or the step S115 is selected as it is. That is, if there are directions having a similar degree of reliability, the direction closest to the vertical direction is selected.

At step S118, the direction selecting unit 126 determines whether or not exceptional conditions are applied. Namely, if any of the following equations from (16) to (18) is satisfied, the direction selecting unit 126 determines that it is an exceptional case, and selects the vertical direction (direction L2 in FIG. 31) at step S119.

$$\text{Population\_}LI(I=(N-1)/2)-\text{Population}\ (\text{Best\_Dir}) \leq -1 \quad (16)$$

$$\text{Tendency}(X,Y)<(PM)/3 \quad (17)$$

$$\text{Total\_Population}(X,Y)<(PM)/3 \quad (18)$$

where Population_LI(I=(N−1)/2) is reliability in the vertical direction and Population(Best_Dir) is the reliability of the direction selected in the processing of the steps from S111 to S 117. Tendency (X,Y) (hereinafter may be referred to as "Tendency function"), if the Balance function is positive, shows Σ(I=(N+1)/2, N−1) (Population (LI)), whereas if it is negative, it shows Σ(I=0,(N−3)/2) (Population (LI)). Namely, that is the sum of reliability of the higher reliability groups if the direction is divided into the left and right side groups of the vertical direction. Total_Population(X,Y) is the sum of reliability if the remarked pixel is (X,Y).

Namely, if the equation (16) is satisfied, it means that the reliability in the vertical direction is higher than the reliability of the direction selected in the processing from the steps S111 to S117, therefore, selection of the reliability in the vertical direction becomes the selection of the higher reliability direction. Further, if the equation (17) and the equation (18) are satisfied, the sum of the reliability of the groups having higher reliability becomes smaller than a predetermined threshold of (PM)/3, so that the vertical direction is selected deciding that no pixels of comparable accuracy are available as a whole. Alternatively, a different value than the threshold of (PM)/3 may also be set.

At step S120, the direction selecting unit 126 outputs information on the selected direction to the slant interpolating unit 128.

Namely, in the case of FIG. 32, since the Balance function becomes positive (processing of the step S113), the direction L4 is selected from the group of directions L3 and L4 as the direction having the highest reliability. Further, there is no other direction having the same reliability as the direction L4 and, furthermore, there are no exceptional conditions. Therefore, the direction L4 is hereby selected.

Figure 24:
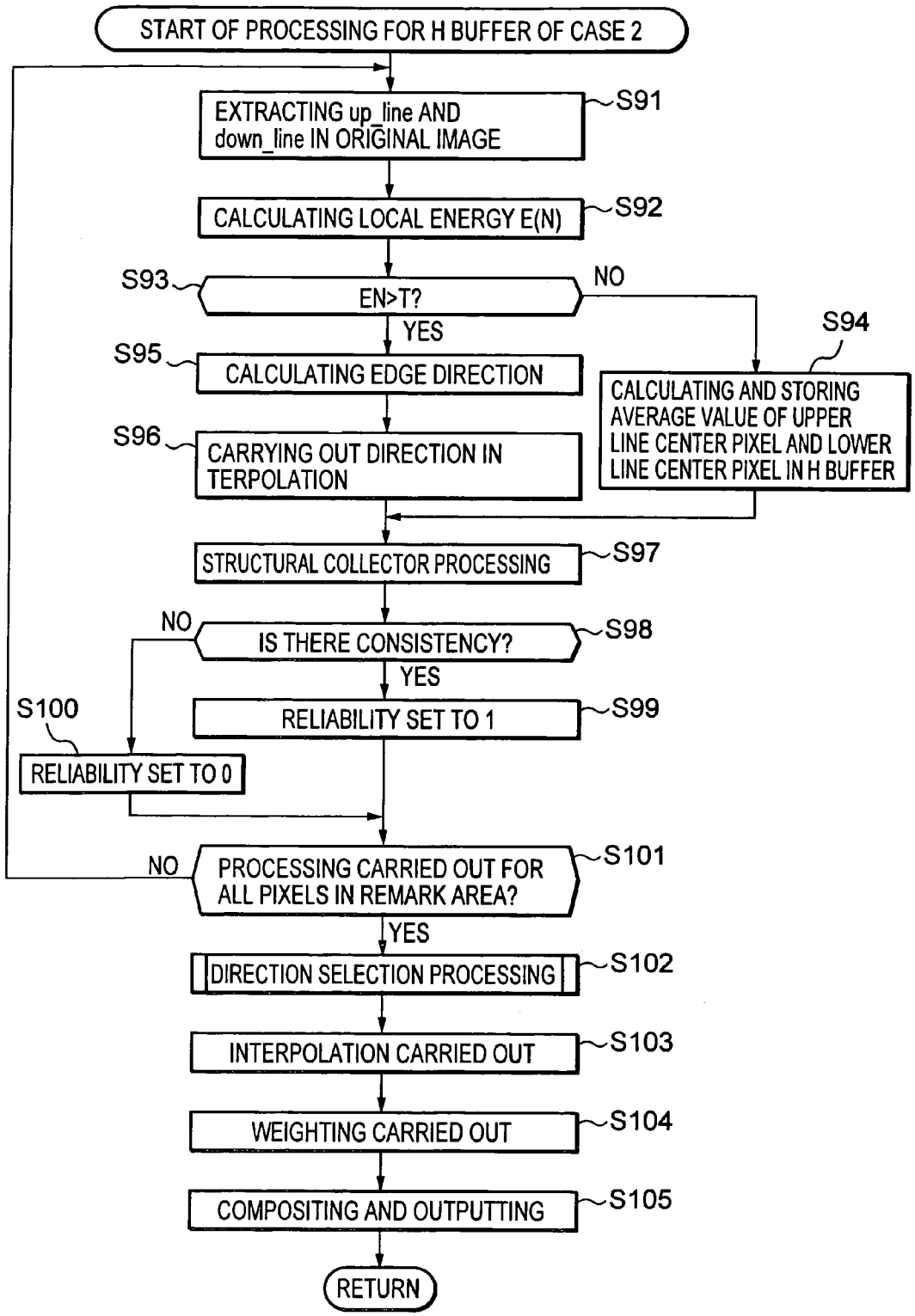
FIG. 24 is a flowchart of assistance in explaining the processing of a case 2 at the step 72 of FIG. 21.

Now, we return to description of a flowchart in FIG. 24.

At step S103, the linear interpolating unit 127 obtains an average pixel value between the pixels present above and below in the vertical direction relative to the remarked pixel as the linear interpolated pixel, and outputs the average value to the compositing unit 130, while, at the same time, the slant interpolating unit 128 outputs to the compositing unit the average pixel value between the pixels present in the selected direction inputted by the direction selecting unit 126 as the slant interpolated pixel value.

Namely, in the case of FIG. 32, since the direction L4 is selected, if the remarked pixel is present as in FIG. 31, the slant interpolating unit 128 outputs the average pixel value between the pixel of the right end on the upper line and the pixel on the left end of the lower line in FIG. 31 as the slant interpolated pixel value.

At step S104, the slant weighting unit 129 sets a weight, weight_slant(X, Y), in the slant direction of the remarked pixel (X,Y) as shown in the following equation (19), and outputs it to the compositing unit 130.

weight_slant($X,Y$)=$ABS$(Balance($X,Y$)/Total_population($X,Y$)(or, weight_slant($X,Y$)=$ABS$(Tendency($X,Y$)/Total_population($X,Y$)) (19)

Namely, the weight in the slant direction is set as a ratio of the absolute value of the Balance function (or the Tendency function) to the total reliability.

At step S105, the compositing unit 130 calculates the following equation (20), weights the linear interpolated pixel inputted by the linear interpolating unit 127 and the slant interpolated pixel for compositing, and outputs the results as the interpolated pixel.

$$H\_buffer(X, Y) = (1 - weight\_slant(X, Y)) \times \quad (20)$$
$$(h\text{-}buffer(X, Y-1) +$$
$$h\text{-}buffer(X, Y+1)) +$$
$$weight\_slant(X, Y) \times$$
$$(h\text{-}buffer(X + Best\_Dir -$$
$$(N-1)/2, Y-1) +$$
$$h\text{-}buffer(X - Best\_Dir -$$
$$(N-1)/2, Y+1)$$

where h-buffer(X,Y−1) and h-buffer(X,Y+1) are pixel values present above and under the remarked pixel, and h-buffer (X+Best_Dir−(N−1)/2,Y−1) and h-buffer (X−Best_Dir−(N−1)/2,Y+1) are pixels present on a diagonal line in the selected direction as viewed from the remarked pixel and present on the upper line and the lower line.

In other words, because the weight on the linear interpolated pixel may be expressed by (1-weight_slant(X,Y), the pixel value obtained by the linear interpolation is multiplied by a weight relating to linear interpolation (1-weight_slant (X,Y), and further multiplied by a weight relating to the slant interpolated pixel weight_slant(X,Y), so that the composition interpolated pixel produced by the linear sum is set as the final interpolated pixel, thus making it possible to generate an accurate interpolated pixel since the interpolation in the vertical and slant directions is composed in good balance with these weights.

Similar processing is repeatedly executed to obtain each pixel of the individual unknown lines of the H buffer 31.

Figure 33:
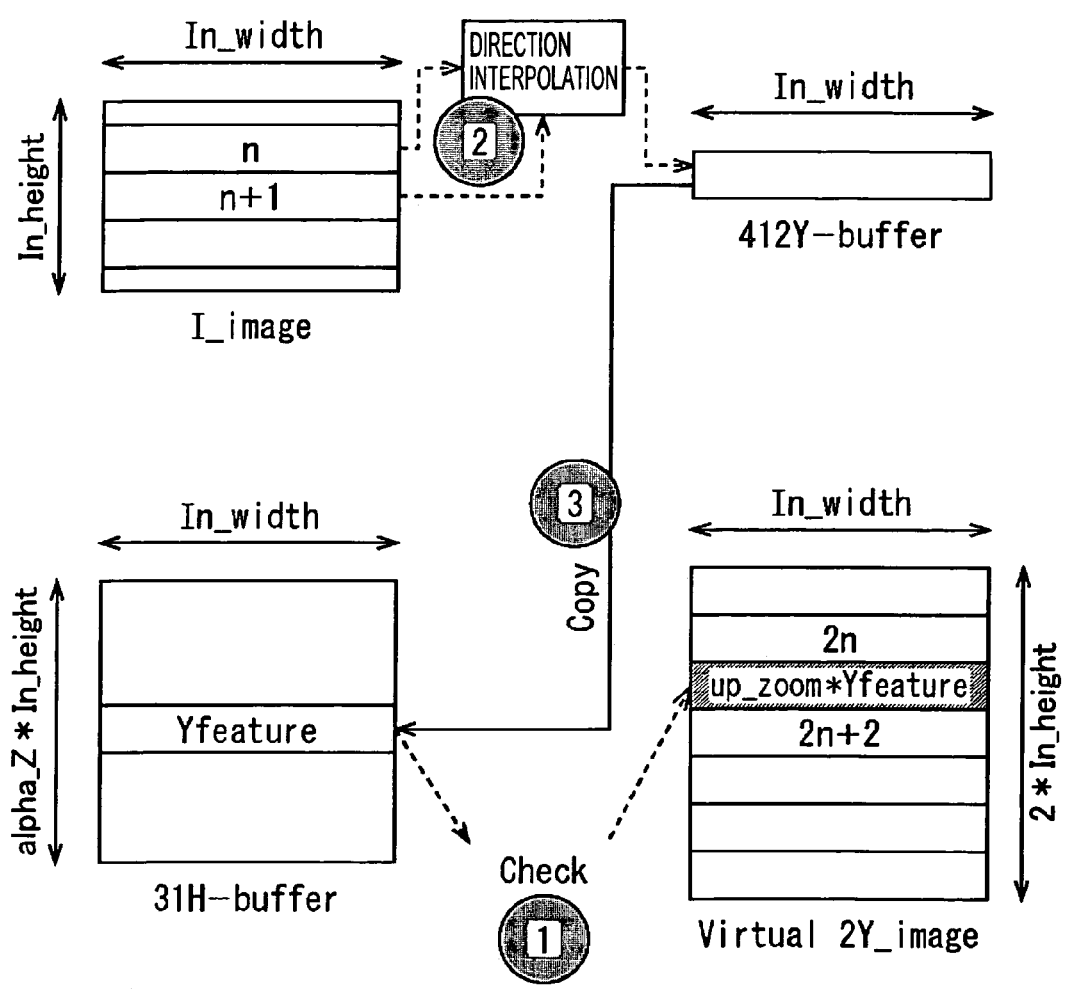
FIG. 33 is a diagram of assistance in explaining the case 2 processing of FIG. 21.

FIG. 33 shows the processing of the case 2 as shown by the flowchart in FIG. 24 in terms of relationship among the original I_image, the H buffer 31, the 2Y buffer 41, and the virtual vertical twofold enlarged image 2Y_image. If the Y line of the H buffer 31 is in a predetermined relationship with the predetermined line "2Y_line" of the virtual vertical twofold enlarged image 2Y_image, the direction interpolation processing is carried out based on the n line and n+1 line of the original I_image, and data obtained is stored in the 2Y buffer 41. The data stored therein is copied (stored) in the Y line of the H buffer 31.

Next, the processing of the case 3 will be described with reference to a flowchart of FIG. 34. This refers to a case of 2n<2Y_line<2n+1 or 2n−1<2Y_line<2n, that is, if the value of line Y in the H buffer 31 does not correspond to any of the line "2Y_line" of the virtual vertical twofold enlarged image 2Y_image, nor correspond to any of the lines of the original I_image.

In this case, the high-speed vertical up-sampler 111 determines, at step S131, whether or not the value of the 2Y_line is greater than 2n and smaller than 2n+1. If the value of the 2Y line is greater than 2n and smaller than 2n+1, the high-speed vertical up-sampler 111 generates the Y line of the H buffer 31 from the 2n+1 line and the 2n line of the virtual vertical twofold enlarged image 2Y image.

Now, in this case, the high-speed vertical up-sampler 111 calculates, at step S132, the 2n+1 line of the virtual vertical twofold enlarged image 2Y image by using an adjacent upper 2n line and a lower 2n+2 line (the n line and the n+1 line in the original I image) through processing from the steps S91 to S105 as shown in a case 2 flowchart in FIG. 24. Since the result of calculation at the step S132 may be used for calculating the next n+1 line calculation in the H buffer 31, it is stored in the 2Y buffer 41 at step S133.

Further, at step S134, the high-speed vertical up-sampler 111 makes use of the 2n+1 line (the value stored in the 2Y buffer 41) calculated at the step S132 and the 2n line of the virtual vertical twofold enlarged image 2Y_image (n line of the original I image) to calculate the Y line of the H buffer 31 using the following equation, and stores it in the Y line of the H buffer 31.

$$H\_buffer(X, Y) = (2Y\_line - 2n) \times 2Y - buffer(X) + \\ (2n + 1 - 2Y\_line) \times I\_image(X, n) \quad (21)$$

In this way, in the processing from the steps S132 to S134, there is generated an image which is the original I_image enlarged twofold in the vertical direction, and from the image thus created and the original I_image, there is generated an image enlarged by alpha_Z times.

On the other hand, if it is not determined at the step S131 that the 2Y line is greater than the 2n and smaller than the 2n+1 (that is, if it is determined that the 2Y line is greater than the 2n−1 and smaller than the 2n), the high-speed vertical up-sampler 111 generates the Y line of the H buffer 31 from the 2n−1 line and the 2n line of the virtual vertical twofold enlarged image 2Y_image. The 2n−1 line is calculated when a preceding line in the H buffer 31 is obtained, and it may be already stored in the 2Y buffer 41. Therefore, at step S135, the high-speed vertical up-sampler 111 determines whether or not the 2n−1 line is already stored in the 2Y buffer 41, and if it is stored, the 2n−1 line data is fetched from the 2Y buffer 41 at step S138.

If it is determined at the step S135 that the 2n−1 line data is not stored in the 2Y buffer 41 yet, the process goes to step S136 where the high-speed vertical up-sampler 111 calculates the 2n−1 line of the virtual vertical twofold enlarged image 2Y_image, by using an upper 2n−2 line and a lower 2n line (the n−1 line and the n line in the original I image) through processing from the steps S91 to S105 as shown in a case 2 flowchart in FIG. 24. Since the value of the 2n−1 line calculated at the step S136 may be used at a step 137 for performing the next Y+1 line calculation in the H buffer 31, the high-speed vertical up-sampler stores it in the 2Y buffer 41.

After processing at the step S137 or at step S138, the process moves to step S139, and the high-speed vertical up-sampler 11I makes use of the 2n−1 line and the 2n line of the virtual vertical twofold enlarged image 2Y_image, (the n line of the original I image)and interpolates the Y line of the H buffer 31 from the following equation and stores it in the Y line of the H buffer 31.

$$H\text{-}buffer(X,Y)=(2n-2Y\_line)\times 2Y\text{-}buffer(X)+(2Y\_line- \\ (2n-1))\times I\_image(X,n) \quad (22)$$

This processing is carried out while performing an increment of the X value from X=0 as long as the value remains to be smaller than In_width.

To obtain each pixel of the individual unknown lines of the H buffer 31, the similar processing is repeatedly carried out at coordinates (X+N/2, Y) that satisfies the conditions of (−1<X<In_width-N+1) and (−1<Y<alpha_Z×In_height−1).

In this way, in the processing of the case 3, the weighting interpolation is carried out by using the 2n line and the 2n+1 line or the 2n−1 line and the 2n line in the virtual vertical twofold enlarged image 2Y image.

Figure 34:
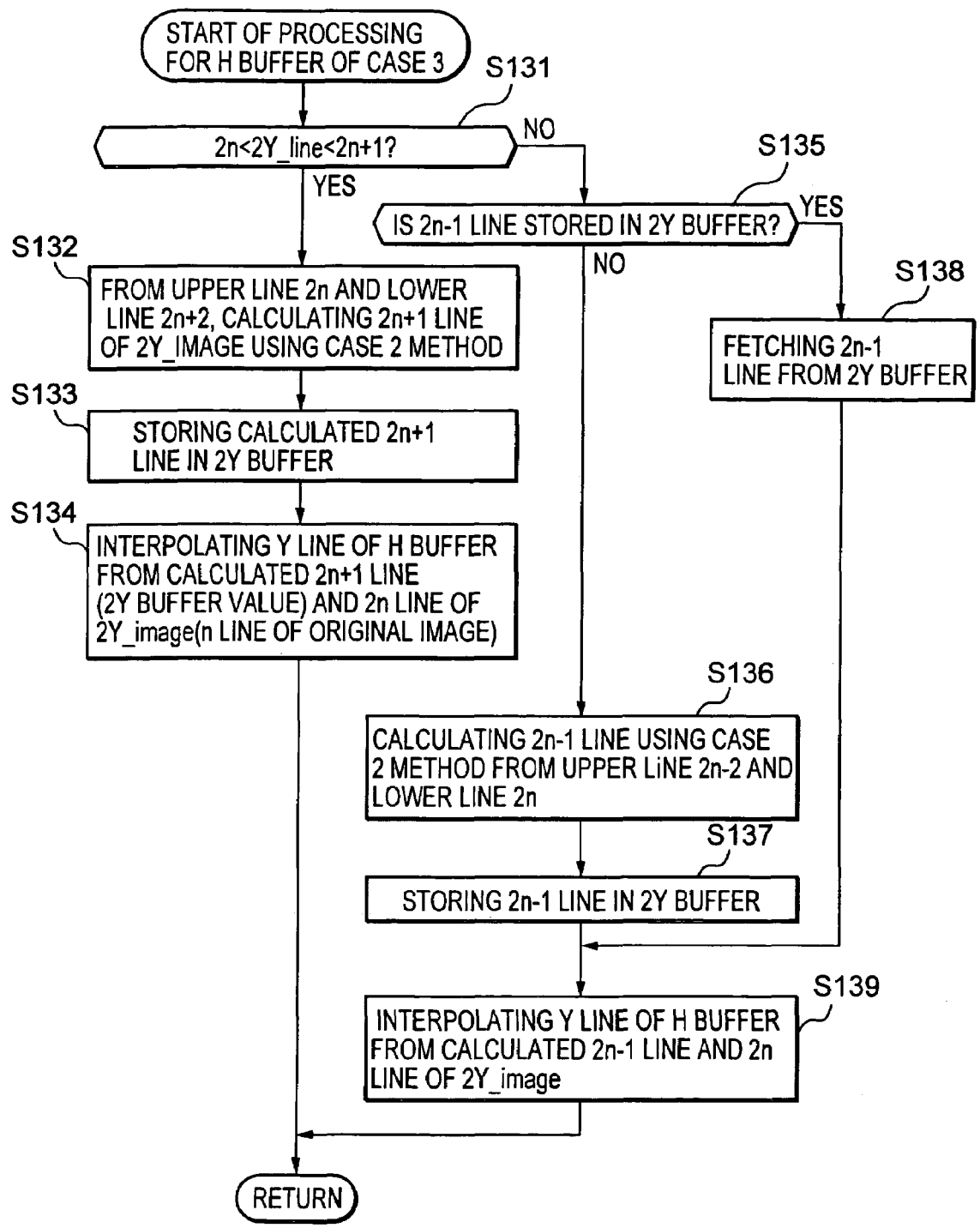
FIG. 34 is a flowchart of assistance in explaining the processing of a case 3 at the step 72 of FIG. 21.
Figure 35:
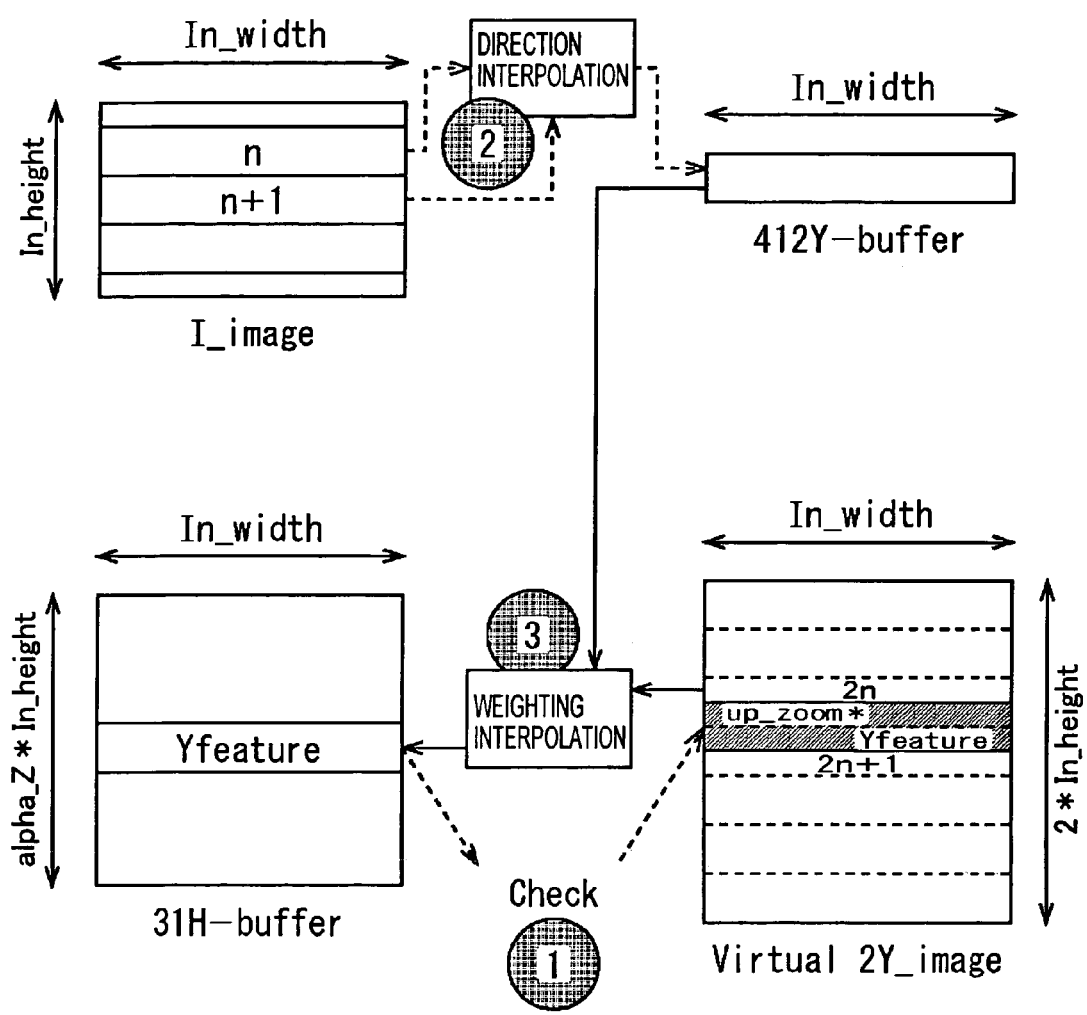
FIG. 35 is a diagram of assistance in explaining the case 3 processing of FIG. 34.

A schematic representation of the processing to show the case 3 in FIG. 34 as mentioned above is shown in FIG. 35. If the value of the 2Y_line of the virtual vertical twofold enlarged image 2Y_image, which corresponds to the Y line of the H buffer 31, is greater than 2n and less than 2n+1, the 2n+1 line or 2n−1 line data is generated by direction interpolation processing from the n line and n+1 line of the predetermined original I_image, and stored in the 2Y buffer 41. Then, from the value stored in the 2Y buffer 41 and data on the 2n line of the virtual vertical twofold enlarged image 2Y image, data in the Y line of the H buffer 31 is interpolated with the weighting.

Figure 36:
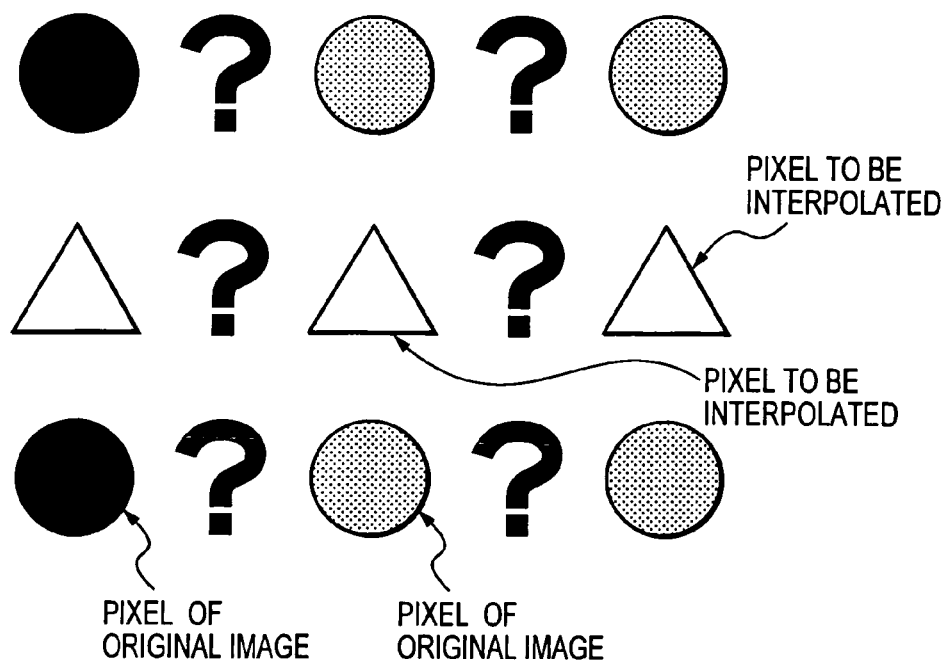
FIG. 36 is a diagram of assistance in explaining high-speed horizontal up-sampling at the step 24 of FIG. 11.

Now, we return to the flowchart in FIG. 11. After the high-speed vertical up-sampling processing is carried out as mentioned above, the process proceeds to step S25 where the high-speed horizontal up-sampling processing is carried out. The high-speed horizontal up-sampling processing is processing to interpolate pixels in the horizontal direction as FIG. 36 shows.

Figure 37:
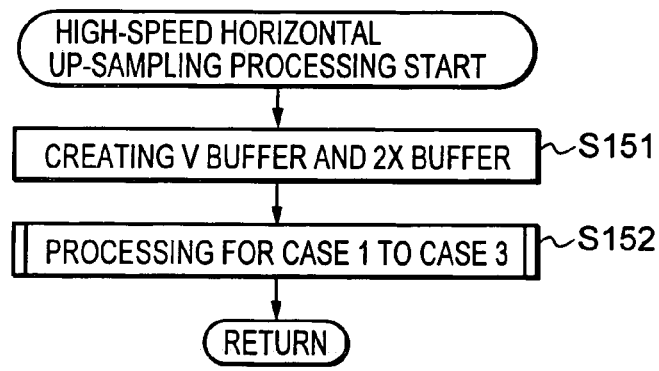
FIG. 37 is a flowchart of assistance in explaining details of high-speed horizontal up-sampling processing at the step 24 of FIG. 11.

FIG. 37 shows details of the high-speed horizontal up-sampling processing. At step S151, the high-speed horizontal up-sampler 151 creates a V buffer 51 (to be explained later with FIG. 39) and a 2X buffer 61 (to be explained later with FIG. 45). The V buffer 51 has a size of (alpha_Z×In_width)×(alpha_Z×In_height), and the 2X buffer 61 has a size of 1×(alpha_Z×In_height). In the 2X buffer 61 is stored a line of data on the X coordinate (odd number coordinate) of a virtual horizontal twofold enlarged image 2X_image.

At step S152, the processing corresponding to the cases from 1 to 3 is carried out. Calculation of the following equation determines which case of processing among the cases 1 to 3 is to be carried out.

$$2X\_column=X\times 2/alpha\_Z \quad (23)$$

If the value of the 2X column obtained by the above calculation is an integer and an even number (2X_column=2n and n is an integer), it is set as the case 1. If the value of 2X_column obtained by the above calculation is an integer and an odd number (2X_column=2n+1 and n is an integer), it is set as the case 2. If the value of the 2X column is a real number (other cases), it is set as the case 3.

Figure 38:
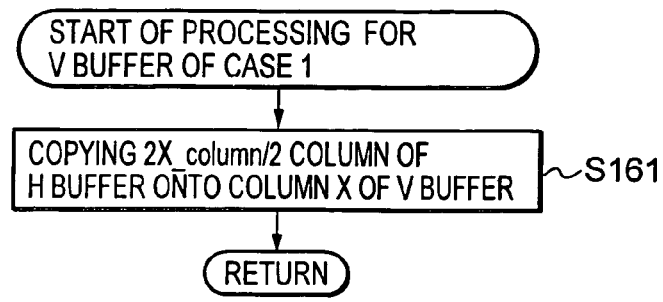
FIG. 38 is a flowchart of assistance in explaining the processing of the case 1 at a step 152 of FIG. 37.

In the case 1, processing shown in a flowchart in FIG. 38 is carried out. This is a case where the 2X_column=2n column in the virtual horizontal twofold enlarged image 2X_image corresponds to the 2X_column/2=n column of the H buffer 31 that is already calculated. In this case, the high-speed horizontal up-sampling processing unit 14 copies the 2X_column/2 column of the H buffer 31 onto a column X of the V buffer at step S161.

Figure 39:
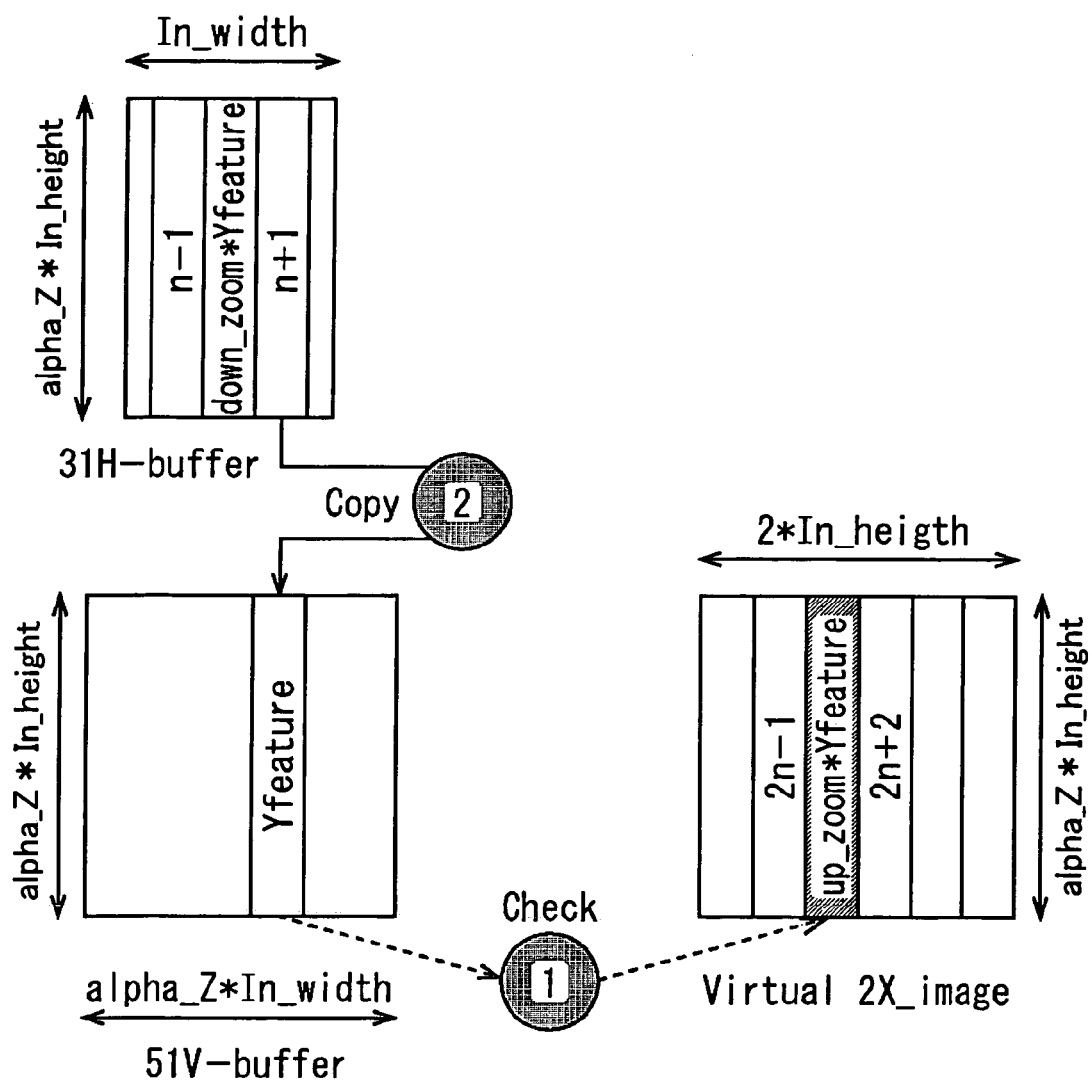
FIG. 39 is a diagram of assistance in explaining the case 1 processing of FIG. 37.

FIG. 39 is a schematic representation of the case 1 processing. If the 2n column in the virtual horizontal twofold enlarged image 2X_image corresponds to n column of the V buffer 51, the n column of the H buffer 31 is copied onto the column X of the V buffer 51.

Figure 40:
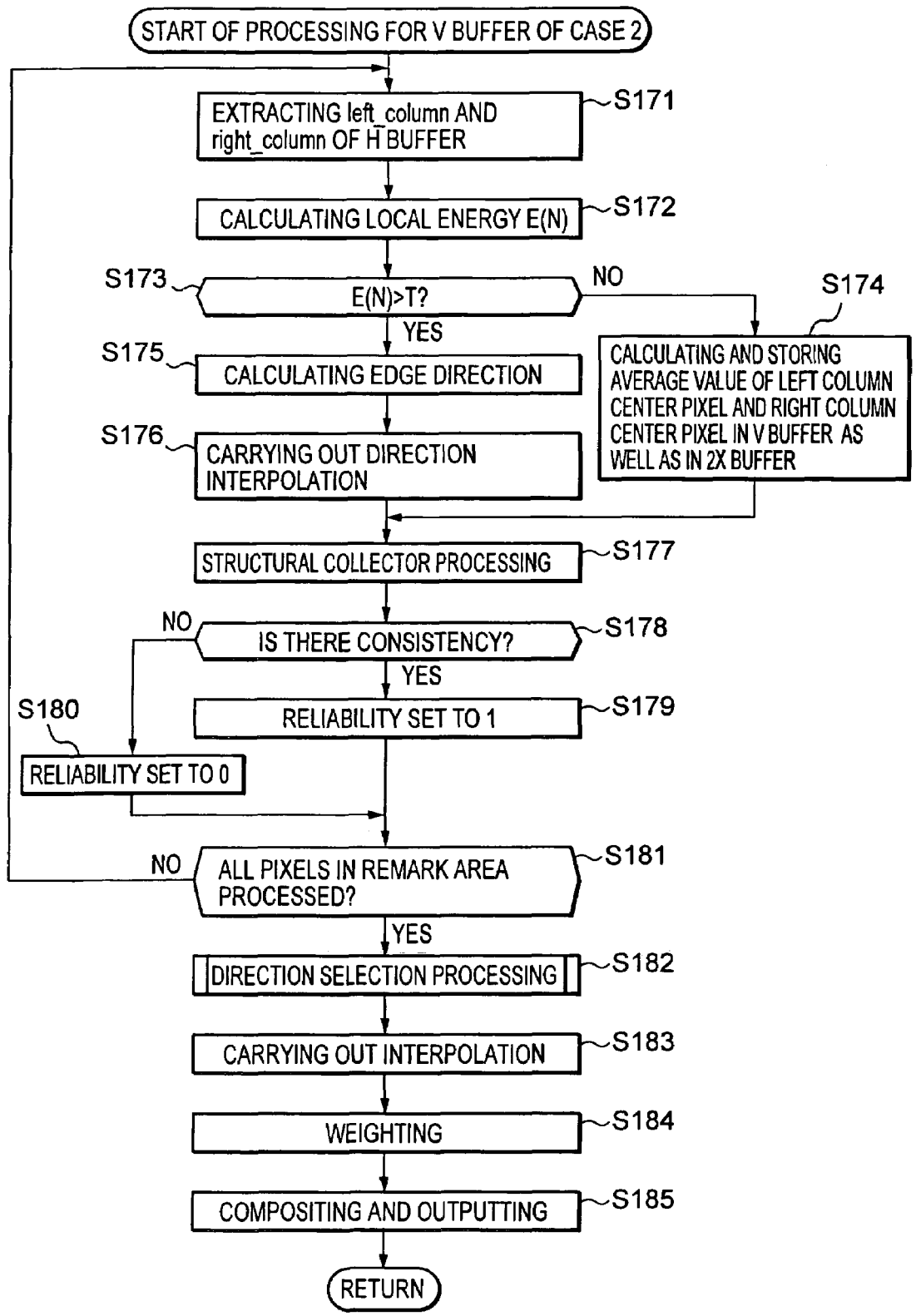
FIG. 40 is a flowchart of assistance in explaining the case 2 processing at the step 152 of FIG. 37.

FIG. 40 shows a flowchart of processing with respect to the V buffer 51 of the case 2 at the step S152 of FIG. 37. This case is a case that can permit the column X of the V buffer 51 to correspond to a predetermined column (2n+1) of the virtual horizontal twofold enlarged image 2X_image, but can not permit it to correspond to the value of a predetermined column of the H buffer 31.

In this case, at step S171, the high-speed horizontal up-sampler 151 extracts a left_column as well as a right column within a predetermined range (N pixels) in the H buffer 31. The central coordinate of the left_column is (n, Y+N/2) and the central coordinate of the rectangular right column is (n+1, Y+N/2).

Next, at step S172, the edge detecting unit 122 of the horizontal direction interpolating unit 152, based on a signal subjected to band limiting by the band limiting unit 121, obtains local energy E(N) by subtracting pixels of the right_column disposed on the diagonal line from individual pixels of the left_column, and calculating a sum of their absolute values. Namely, the following equation is used for calculation in this processing.

$$E(N)=\Sigma(I=0,N-1)ABS(\text{left\_column}(I)\text{right\_column}(N-I-1)) \qquad (24)$$

Next, at step S173, the edge detecting unit 122 determines whether or not the energy E(N) is greater than a predetermined threshold T. If the energy E(N) is equal to or smaller than the threshold T, such area is considered as a flat and low-energy area including no edges. In this case, it is not necessary to calculate the direction of potential edges. Consequently, the process proceeds to step S174 where the direction judging unit 123, based on the result of determination by the edge detecting unit 122, permits the linear interpolating unit 127 to calculate, as pixel data of coordinates (X+N/2, Y) in the V buffer 51, an average value of a central pixel of an adjacent left column "left_column(N/2)" and a central pixel of an adjacent right column "right_column(N/2)" for storage thereof in the coordinates (X+N/2, Y) of the V buffer 41, while, outputting directional information of the horizontal direction (indicated by the L2 direction and to be explained later with FIG. 44) to the reliability ranking unit 124 and the directional distribution generating unit 125. Further, the reliability ranking unit 124 outputs to the directional distribution generating unit 125 a number 0 indicating low reliability regarding this interpolated pixel.

Namely, as shown in the following equation, from the average value of the central pixel of the adjacent left_column(N/2) and the central pixel of the adjacent right_column (N/2), a pixel value of a new pixel (X+N/2, Y) is calculated (a standard linear interpolation processing is performed).

$$V\text{-buffer}(X+N/2, Y)=0.5\times(\text{left\_column}(N/2)+\text{right\_column}(N/2)) \qquad (25)$$

At the step S173, if it is determined that the energy E(N) is greater than the threshold T, such area is considered as a high energy area potentially including an edge. Hence, in this case, the process goes to step S175 where the direction judging unit 123 of the horizontal direction interpolating unit 152, based on the result of an image signal subjected to band limiting by the band limiting unit 121, carries out calculation processing to test the edge direction, and outputs detected directional information to the reliability ranking unit 124 and the directional distribution generating unit 125, while, outputting detected pixel information to the direction interpolating unit 131. Specifically, the following equation is used to carry out the edge direction calculation processing.

$$\text{Energy}=ABS(\text{left\_column}(N-x-1)-\text{right\_column}(x)) \qquad (26)$$

Figure 41:
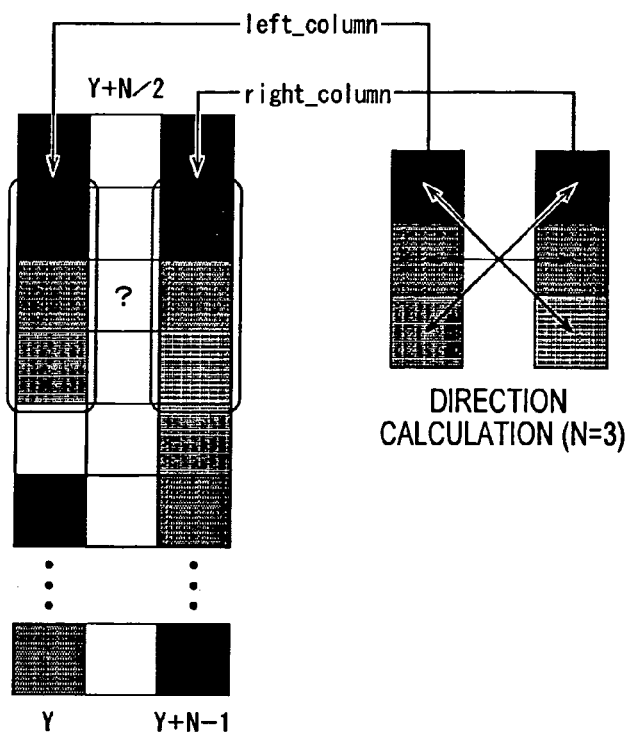
FIG. 41 is a diagram of assistance in explaining the case 2 processing of FIG. 37.

The above calculation performs a sequential decrement of x from x=N−1 and continues such process as long as x is greater than −1. As shown in FIG. 41, specifically, the processing for subtracting pixels of the right column on the diagonal line from pixels of the left column is executed starting from the upper side of the right column.

A direction of a diagonal line of a pixel corresponding to the smallest value of the energy calculated is determined to be a local edge direction. In FIG. 41, N=3 is used whereas determination of more directions is possible by making the N value even greater. 2

In the processing of step S175, if the edge direction is determined, further at step S176, the direction interpolating unit 131 carries out interpolation processing (direction interpolation processing is carried out) by using pixels in the detected edge direction.

Next, at step S177, the reliability ranking unit 124 carries out structural collector processing. Namely, by analyzing a relationship among a pixel interpolated at the coordinates (X, Y+N/2) in the V buffer 51, a pixel at the coordinates left column(N/2) which is a proximity pixel in the vertical direction thereof, and a pixel at the right_column(N/2), processing to check the consistency of the local structure is carried out. Consequently, according to the following equation, the interpolated pixel is subtracted from the central pixel of the left column and the central pixel of the right column is subtracted from the interpolated pixel to obtain two results of subtraction, whereas by multiplying the two results of subtraction, a value H(N/2) indicating a change in the horizontal direction is calculated.

$$H(N/2)=(\text{left\_column}(N/2)-V\text{-buffer}(X+N/2, Y))\times(V\text{-buffer}(X+N/2, Y)-\text{right}_{column}(N/2)) \qquad (27)$$

At step S178, it is determined, based on the value (H(N/2) calculated at the step S177, whether or not there is consistency in the interpolated local structure. Specifically, it is determined whether or not the value H(N/2) is positive. If the value H(N/2) is positive, the pixel obtained in the direction interpolation processing of the step S176 is considered correct (consistent), and at step S179, the reliability of the interpolated pixel is set to 1 and outputted to the directional distribution generating unit 125.

On the other hand, if the value H(N/2) is determined to be negative (inconsistent) at the step S178, that is, if it is determined that the pixel value generated by directional interpolation processing of the step S176 is not proper, the process goes to step S180, and the reliability ranking unit 124 sets the reliability of the interpolated pixel to 0 and outputs to the directional distribution generating unit 125.

At step S181, it is determined whether or not all the pixels due to be interpolated in the remarked area associated with the remarked pixel are interpolated. If it is determined that all the pixels due to be interpolated in the remarked area are not interpolated, the processing returns to the step S171 where processing from the steps S171 to S181 is repeated until all the pixels due to be interpolated are interpolated. If it is determined that all the pixels due to be interpolated in the remarked area are interpolated at the step S181, the process goes to step S182. In this context, the remarked area associated with the remarked pixel means, for example, pixels due to be interpolated in a range of M(pixels)×P(lines) as shown in FIG. 4. It should be noted that in FIG. 42, a white circle stands for a remarked pixel (interpolated pixel), a black circle stands for an interpolated pixel, and a circle filled with grids stands for a pixel of an original image (originally present pixel). That all pixels due to be interpolated are interpolated at the step S181 indicates all the pixels shown in black circles therein being all interpolated.

The direction selection processing will be executed at step S182.

Figure 43:
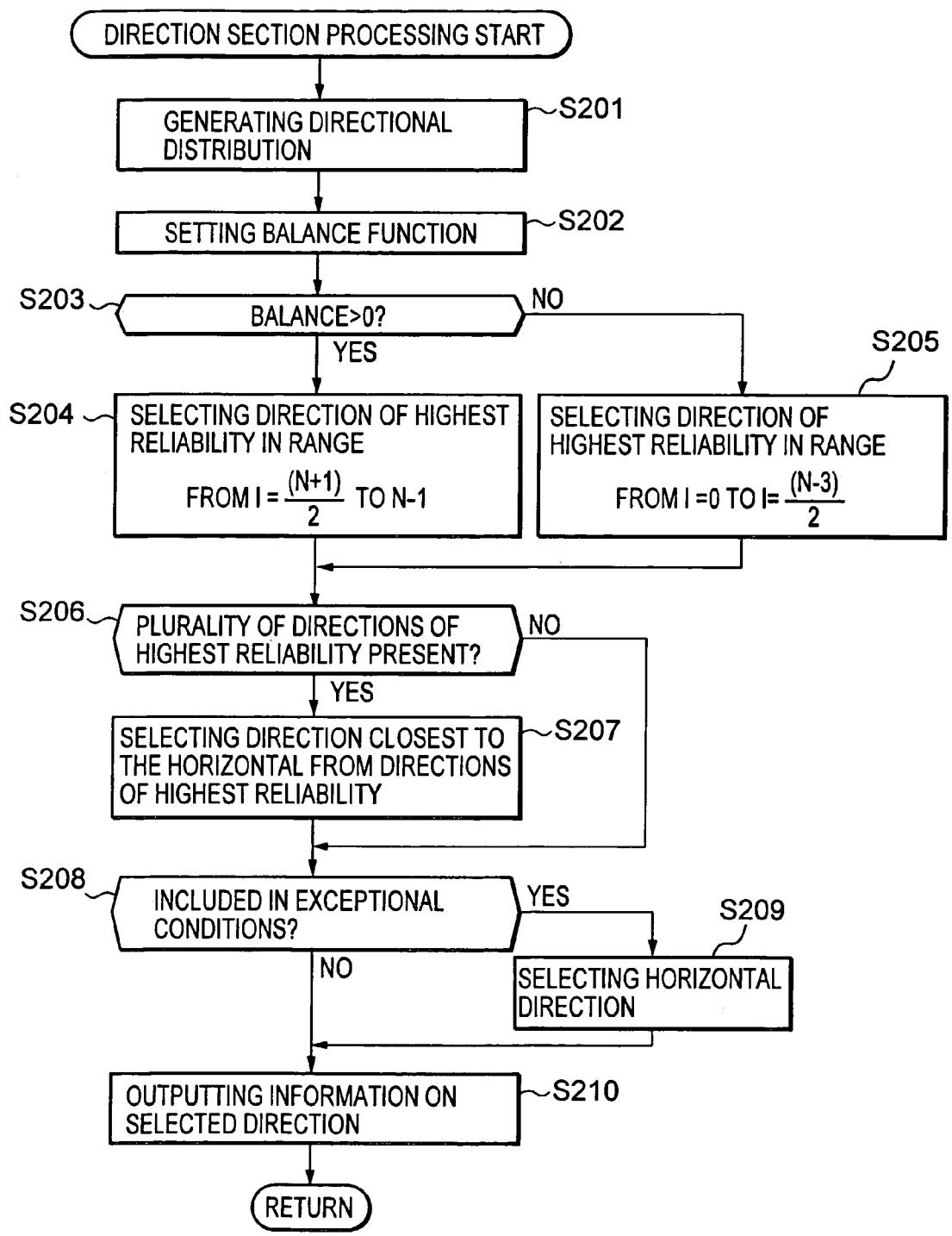
FIG. 43 is a flowchart of assistance in explaining direction selection processing at step S182 of FIG. 40.

Now, the direction selection processing will be described with reference to a flowchart in FIG. 43.

At step S201, the directional distribution generating unit 125 generates directional distribution. Namely, the directional distribution generating unit 125 generates directional distribution from the edge directiona thus far selected and information on reliability thereof.

It should be noted that the directional distribution is basically similar to what is described with reference to FIG. 28, FIG. 30 to FIG. 32, except for inversion of a relationship between the horizontal direction and the vertical direction.

At step S202, the direction selecting unit 126 sets the following Balance function from these directional distributions (distribution of reliability corresponding to the interpolating directions)

Namely, first, the direction selecting unit 126 sets the Balance function corresponding to a remarked pixel (X, Y) shown in the following equation (28).

$$\text{Balance}(X,Y)=\Sigma(I=(N+1)/2, N-1)(\text{Population}(LI))-\Sigma(I=0,(N-3)/2)(\text{Population}(LI)) \qquad (28)$$

Population (LI) is a function which indicates the number of pixels having reliability per a direction LI, Σ indicates obtaining of a total sum, and (I=N+1)/2, N-1) or (I=0,(N-3)/2) indicates a range of I for obtaining the total sum. N shows the number of directions set.

At step S203, the direction selecting unit 126 determines whether or not the Balance (X, Y) has a positive value. For example, if it is determined to have the positive value, a direction having the highest reliability over a range in which I is ranging from I=(N+1)/2 to N-1 is selected at step S204 from the direction LI defined in FIG. 44. It should be noted that this relationship is an inversion of the definition of directions shown in FIG. 31 with respect to the relationship between the horizontal direction and the vertical direction, and they are basically similar.

Figure 44:
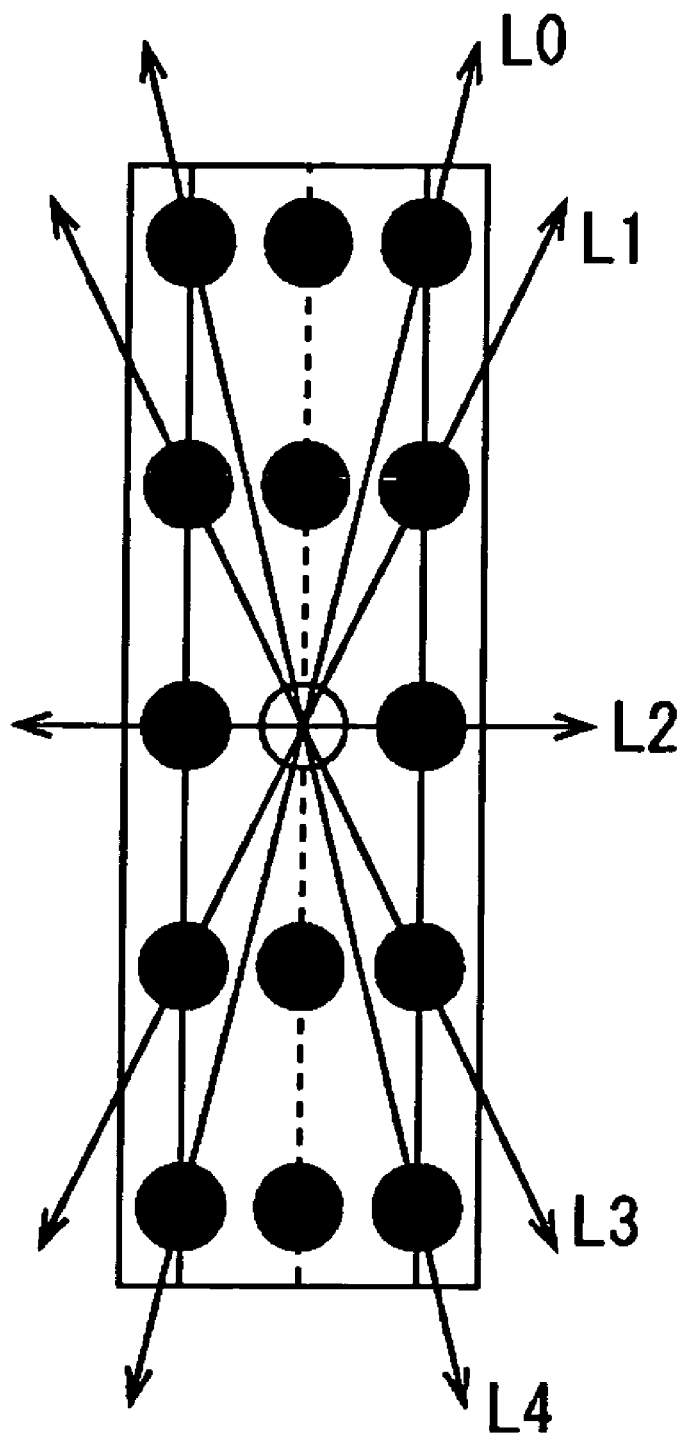
FIG. 44 is a diagram of assistance in explaining a defined edge direction.

On the other hand, if it is determined to have no positive value at the step S203, from the direction LI defined in FIG. 44, a direction having the highest reliability over a range in which I is ranging from I=0 to (N-3)/2 is selected.

Namely, the function defined in the equation (28) indicates on which of the upside and the downside lies a reliability tendency if the horizontal direction is set as its center and positions of the right ends of arrows indicating the directions in the drawing are divided to a upper side and a lower side of the direction L2, For example, a difference of respective sums of the reliability of a whole group of the directions L0 and L1 as defined in FIG. 44 and the reliability of a whole group of the directions L3 and L4 is obtained by the processing of step S204, and by comparing its magnitude, it is obtained toward which of the upside and the downside it is slanted with respect to the horizontal direction, and the direction having the highest reliability is selected from the group indicating the reliability tendency.

At step S206, the direction selecting unit 126 determines whether or not there are a plurality of directions showing the highest reliability. For example, if there are a plurality of such directions, at step S207, from a plurality of the directions selected having the highest reliability, the direction closest to the horizontal direction is selected. On the other hand, if there are no plurality of directions having the highest reliability, the processing of the step S207 is skipped, whereby a direction selected by the processing of the step S204 or step S205 is selected as it is. That is, in the event that a plurality of directions shares a similar degree of reliability, the direction closest to the horizontal direction is selected.

At step S208, the direction selecting unit 126 determines whether or not exceptional conditions are applied. Namely, if any of the following equations from (29) to (31) is satisfied, the direction selecting unit 126 determines that it is an exceptional case and selects the horizontal direction (direction L2 in FIG. 44) at the step S119.

$$\text{Population\_LI}(I=(N-1)/2)-\text{Population}(\text{Best\_Dir}) \geq -1 \qquad (29)$$

$$\text{Tendency}(X,Y)<(PM)/3 \qquad (30)$$

$$\text{Total\_Population}(X,Y)<(PM)/3 \qquad (31)$$

where Population_LI(I=(N-1)/2) is reliability in the horizontal direction and Population(Best_Dir) is the reliability of the direction selected in the processing of the steps from S201 to S207. If the Balance function is positive, Tendency (X,Y) shows Σ(I=(N+1)/2, N-1) (Population (LI)), whereas if it is negative, it shows Σ(I=0, (N-3)/2) (Population (LI)). Namely, that is the sum of reliability of the high reliability groups when the positions of the right ends of arrows indicating directions are divided into the upside and downside groups in the horizontal direction. Total_Population(X, Y) is the sum of reliability if the remarked pixel is (X,Y).

Namely, if the equation (29) is satisfied, it means that the reliability in the horizontal direction is higher than the reliability of the direction selected in the processing from the steps S201 to S207, therefore, selection of the reliability in the horizontal direction becomes the selection of the higher reliability direction. Further, if the equation (30) and the equation (31) are satisfied, the sum of the reliability of the groups having high reliability becomes smaller than a predetermined threshold of (PM)/3, so that the horizontal direction is selected upon deciding that no pixels of comparable accuracy are available as a whole. Alternatively, a different value from the threshold of (PM)/3 may also be set.

At step S210, the direction selecting unit 126 outputs information on the selected direction to the slant interpolating unit 128.

Now, we return to description of a flowchart in FIG. 40.

At step S183, the linear interpolating unit 127 obtains the average pixel value between the pixels present at the left and at the right on the horizontal direction relative to the remarked pixel as the linear interpolated pixel and outputs the average pixel value to the compositing unit 130, while, at the same time, the slant interpolating unit 128 outputs the average pixel value between the pixels present on the selected direction inputted by the direction selecting unit 126 as the value of the slant interpolated pixel, and outputs to the compositing unit.

At step S184, the slant weighting unit 129 sets a weight "weight_slant(X, Y)" in the slant direction of the remarked pixel (X, Y) as shown in the following equation (32) and outputs it to the compositing unit 130.

$$\text{weight\_slant}(X,Y)=ABS(\text{Balance}(X,Y))/\text{Total\_population}(X,Y)(\text{or,weight\_slant}(X, Y)=ABS(\text{Tendency}(X,Y))/\text{Total\_population}(X,Y)) \qquad (32)$$

Namely, a weight in the slant direction is set as a ratio of the absolute value of the Balance function (or the Tendency function) to the total reliability.

At step S185, the compositing unit 130 calculates the following equation (33), weights the linear interpolated pixel inputted by the linear interpolating unit 127 and the slant interpolated pixel for composition, and outputs the results as the interpolated pixel.

$$V\_buffer(X, Y) = (1 - \text{weight\_slant}(X, Y)) \times \qquad (33)$$
$$(v\text{-buffer}(X - 1, Y) +$$
$$v\text{-buffer}(X + 1, Y)) +$$

-continued $$\text{weight\_slant}(X, Y) \times$$
$$(\text{v-buffer}(X-1, Y+\text{Best\_Dir}-$$
$$(N-1)/2) +$$
$$\text{v-buffer}(X+1, Y-\text{Best\_Dir}-$$
$$(N-1)/2)$$

where v-buffer(X−1, Y) and v-buffer(X+1,Y) are pixels present at the left and the right of the remarked pixel, and h-buffer(X−1, Y+Best_Dir−(N−1)/2)+h-buffer(X−1, Y−Best_Dir−(N−1)/2) are pixels present on a diagonal line in the selected direction as viewed from the remarked pixel and present on the left column and the right column.

In other words, because the weight on the linear interpolated pixel may be expressed as (1-weight_slant(X,Y)), the pixel value obtained by the linear interpolation is multiplied by a weight relating to the linear interpolation (1-weight_slant(X,Y)), and further multiplied by a weight relating to the slant interpolated pixel weight_slant(X,Y), and the linear sum is obtained to produce the final interpolated pixel, thus making it possible to generate an accurate interpolated pixel since the interpolation in the horizontal and slant directions is composed in good balance with their weights.

Similar processing is repeated to obtain each pixel of the individual unknown lines of the V buffer 51.

Figure 45:
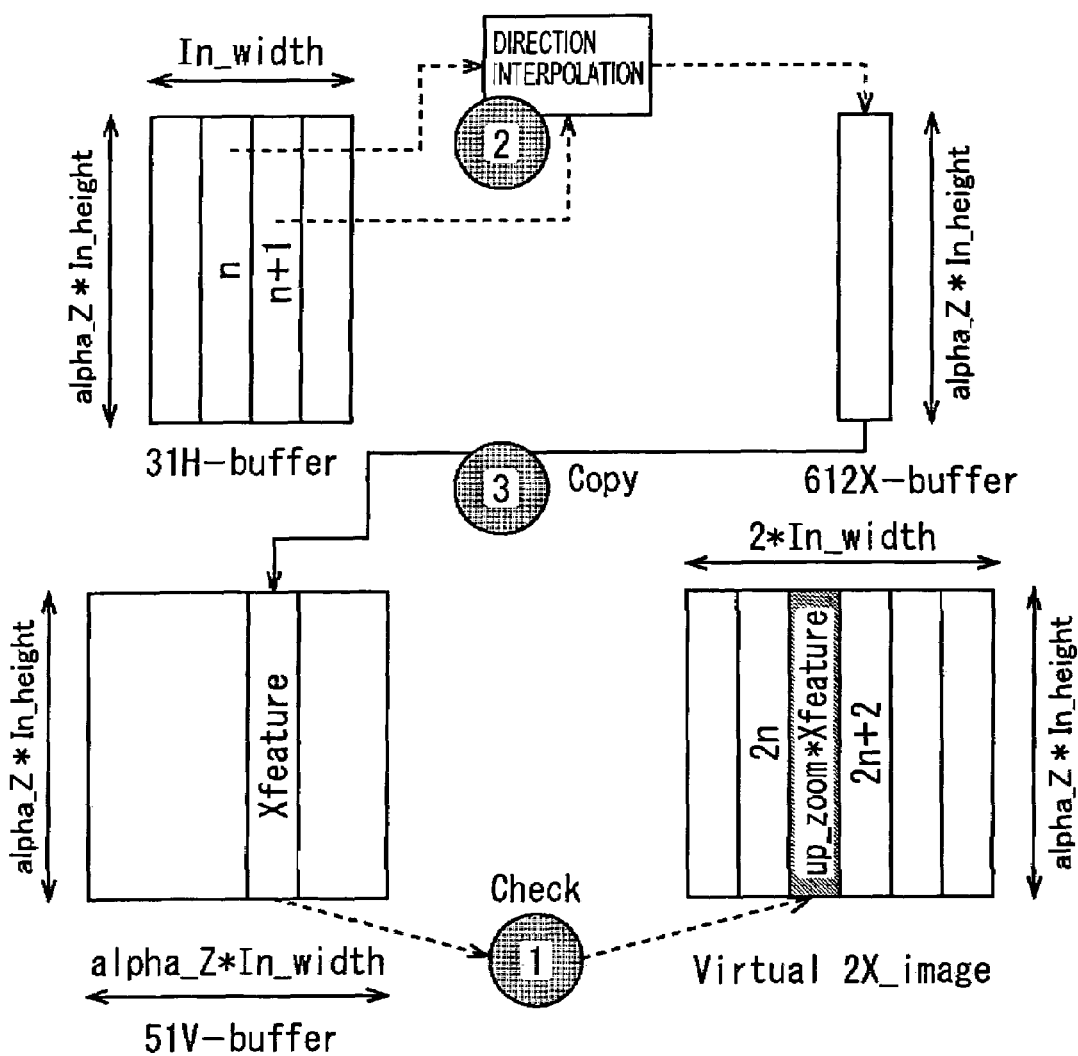
FIG. 45 is a diagram of assistance in explaining the case 2 processing of FIG. 37.

FIG. 45 is a conceptual representation of the above processing of the case 2. As shown above thereby, if the X column of the V buffer 51 is in a predetermined relationship with a predetermined column of the virtual horizontal two-fold enlarged image 2X_image, data generated by direction interpolation processing of the n column and n+1 column of the H buffer 31 is stored in the 2X buffer 61. And the data stored therein is copied (stored) onto the X column of the V buffer 51.

Next, the case 3 processing to the V buffer at the step S152 of FIG. 37 will be described with reference to a flowchart of FIG. 46.

This refers to a case of 2n<2X_column<2n+1 or 2n−1<2X_column<2n, that is, if the value of the column X in the V buffer 51 does not correspond to neither of the column 2X_column of the virtual horizontal twofold enlarged image 2X_image and also does not correspond to any of the columns of the H buffer 31.

In this case, at step S221, it is determined whether or not the value of 2X_column is greater than 2n and smaller than 2n+1. If the value of 2X_column is greater than 2n and smaller than 2n+1, the X_column of the V buffer 51 is generated from the 2n+1 column and 2n column of the virtual horizontal twofold enlarged image 2X_image.

Now, in this case, at step S222, the high-speed horizontal up-sampling processing unit 15 calculates the 2n+1 column of the virtual horizontal twofold enlarged image 2X_image by using its adjacent upper 2n column and lower 2n+2 column (the n column and the n+1 column in the H buffer 31) through processing from the steps S171 to S185 as shown in the case 2 flowchart in FIG. 40. Since the result of calculation at the step S222 may be used for performing the next n+1 column calculation in the V buffer 51, it is stored in the 2X buffer 61 at step S223.

Further, at step S224, from the 2n+1 column (the value stored in the 2X buffer 61) calculated at the step S222 and the 2n column of the virtual horizontal twofold enlarged image 2X_image (n column of the H buffer 31), the X column of the V buffer 51 is calculated using the following equation, the result being stored in the X column of the V buffer 51.

$$V\_\text{buffer}(X,Y)=(2X\_\text{column}-2n)\times 2X\text{-buffer}(X)+ (2n+1-2X\_\text{column})\times I\_\text{image} \qquad (34)$$

On the other hand, at the step S221, if it is not determined that the 2X column is greater than the 2n and smaller than the 2n+1 (that is, if it is determined that the 2X column is greater than the 2n−1 and smaller than the 2n), the X column of the V buffer 51 is generated from the 2n−1 column and the 2n column of the virtual horizontal twofold enlarged image 2X_image. The 2n−1 column is calculated if a preceding column in the V buffer 51 is obtained, and it may be already stored in the 2X buffer 61. Therefore, at step S225, it is determined whether or not the 2n−1 column is already stored in the 2X buffer 61, and if it is stored, at step S228, the 2n−1 column data is fetched from the X buffer 61.

Now, at the step S225, if it is determined that the 2n−1 column data is not stored in the 2X buffer 61 yet, the process goes to step S226 where there is performed the processing to calculate the 2n−1 column of the virtual horizontal twofold enlarged image 2X_image by using the upper 2n−2 column and the lower 2n column (the n−1 column and the n column in the H buffer 31) through processing from the steps S171 to S185 as shown in a case 2 flowchart in FIG. 40. Since the value of the 2n−1 column calculated at the step S226 may be used for calculating the next X+1 column in the V buffer 51 at a step 227, it is stored in the 2X buffer 61.

After the processing at the step S227 or step S228, the process moves to step S229 where, from the 2n−1 column and the 2n column of the virtual horizontal twofold enlarged image 2X_image (the n column of the H buffer 31)), the X column of the V buffer 51 is interpolated according to the following equation.

$$V\text{-buffer}(X,Y)=(2n-2X\_\text{column})\times 2X\text{-buffer}(Y)+ (2X\_\text{column}-(2n-1))\times I\_\text{image}(n,Y) \qquad (35)$$

This processing is carried out while performing an increment of the Y value as long as the value remains to be smaller than In_height x alpha_Z from Y=0.

To obtain each pixel of the individual unknown columns of the V buffer 51, the similar processing is repeatedly executed at coordinates (X,Y+N/2) meeting the conditions of (−1<Y<alpha_Z×In_height×N+1) and (−1<Y<alpha_Z ×In_width−1).

In this way, in the case 3 processing, the weighting interpolation is carried out by using the 2n column and the 2n+1 column or the 2n−1 column and the 2n column of the virtual horizontal twofold enlarged image 2X_image.

Figure 46:
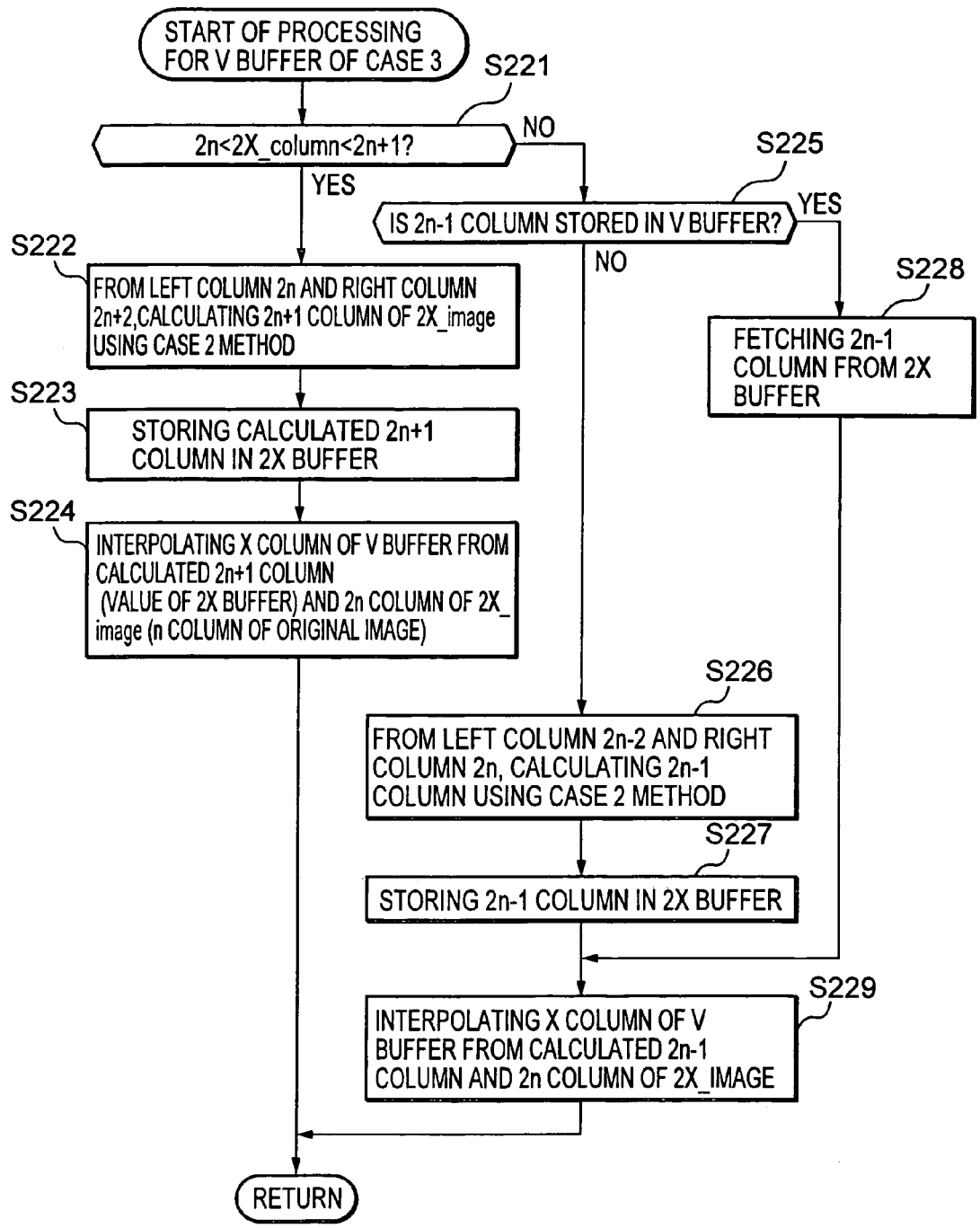
FIG. 46 is a flowchart of assistance in explaining the case 2 processing at the step 152 of FIG. 37.
Figure 47:
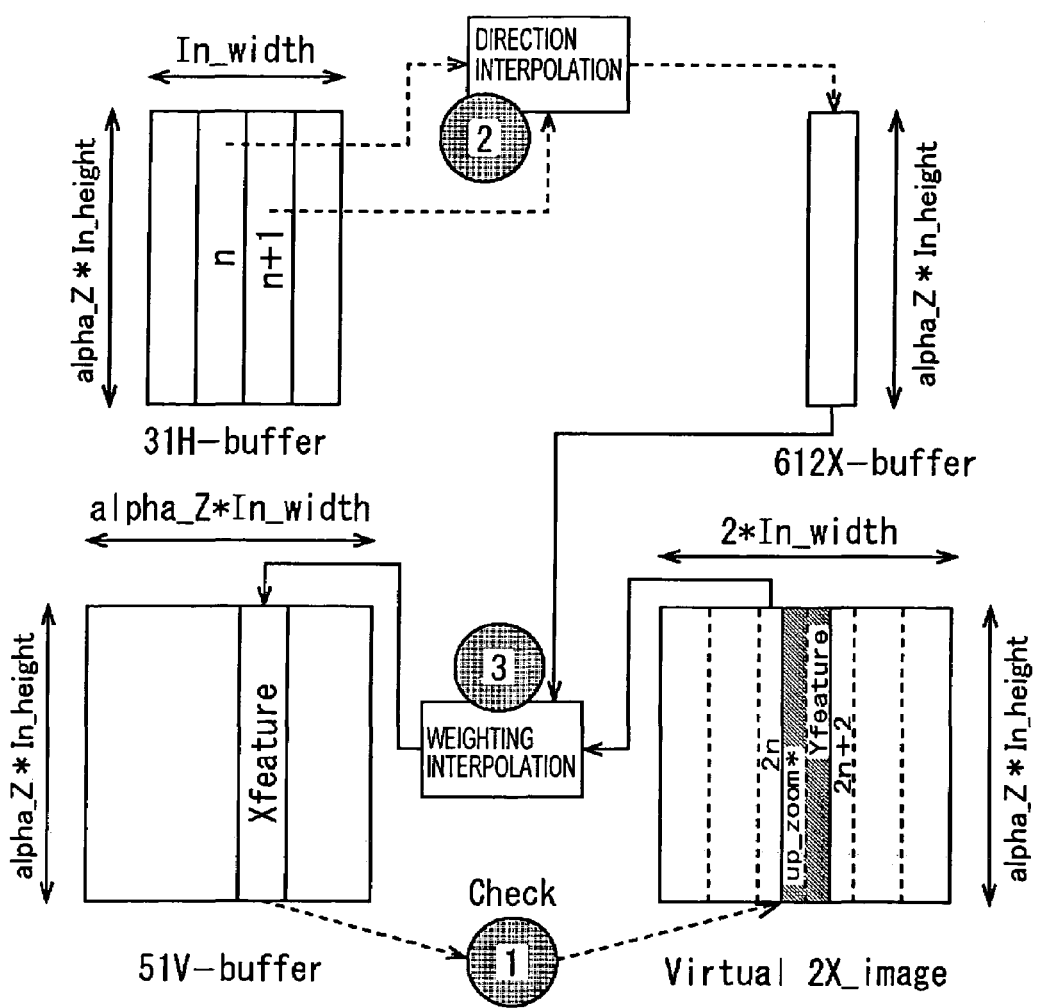
FIG. 47 is a diagram of assistance in explaining the case 3 processing of FIG. 46.

A schematic representation of the processing to show the case 3 in FIG. 46 as mentioned above is shown in FIG. 47. If the value of column X in the V buffer 51 is in a predetermined relationship with the column of the virtual horizontal twofold enlarged image 2X_image, data of the 2n+1 column or 2n−1 column is generated by direction interpolation processing from the n column of the original I_image and the n+1 column and stored in the 2X buffer 61. Then from the value stored in the 2X buffer 61 and data on the 2n column of the virtual horizontal twofold enlarged image 2X_image, data of the X column of the V buffer 51 is subjected to weighting interpolation.

Figure 48:
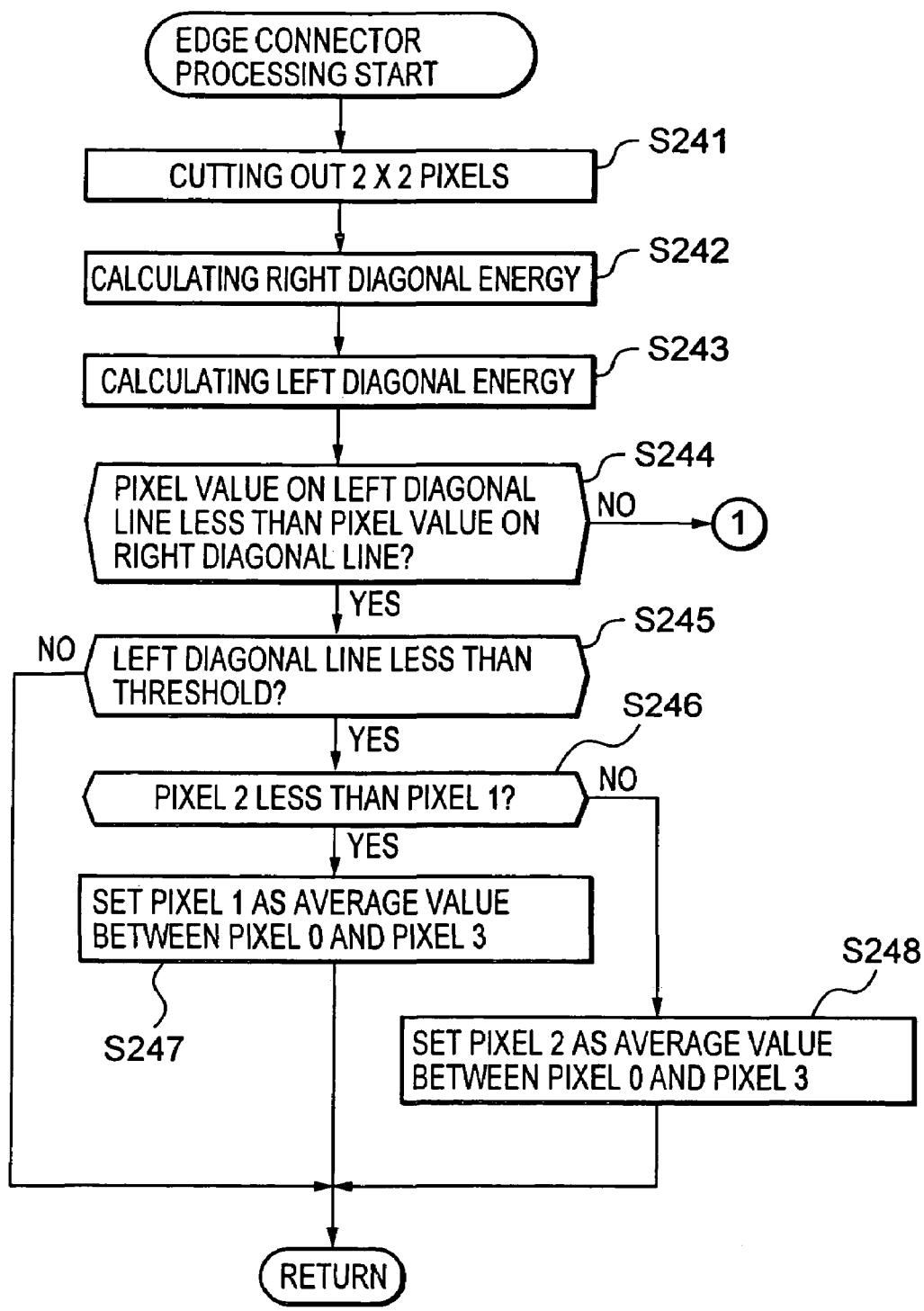
FIG. 48 is a flowchart of assistance in explaining details of edge connector processing at a step 26 of FIG. 11.
Figure 49:
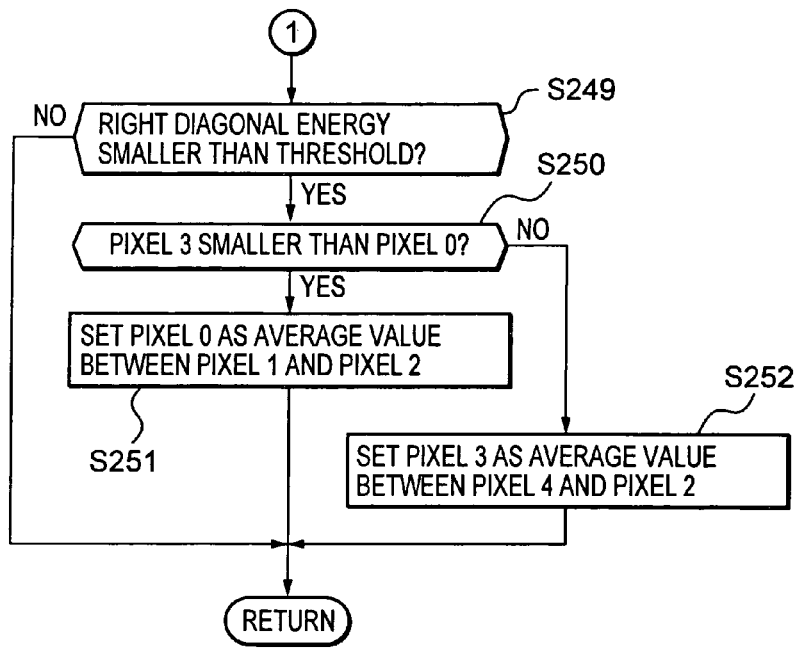
FIG. 49 is a diagram of assistance in explaining details of edge connector processing at the step 26 of FIG. 11.

As mentioned above, if it is determined at the step S21 that the set mode is an image mode, processing from the step S22 to the step S25 is carried out, whereas if it is determined at the step S21 that the set mode is not the image mode (if a loose connection image such as a computer icon and a word processor's font is processed), prior to the execution of processing from the step S22 to the step S25, edge connector processing is carried out at the step S26. Details of the edge connector processing are shown in FIG. 48 and FIG. 49. The edge connector processing is carried out by the edge connector processing unit 11.

First, at step S241, corresponding to a predetermined pixel (X, Y), 2×2 pieces of pixels are cut out. And at step S242 and step S243, respective right diagonal energy and left diagonal energy are calculated. The right diagonal energy is obtained by subtracting the lower left pixel from the upper right pixel from the 2×2 pieces of pixels, while the left diagonal energy is obtained by subtracting the lower left pixel from the upper right pixel.

For example, if a pixel (X, Y) is assumed to be a pixel 0 in FIG. 50A, the right diagonal energy may be obtained, as shown in FIG. 50A, by subtracting the value of a pixel 2 from a pixel 1, while the left diagonal energy may be obtained, as shown in FIG. 50B, by subtracting the value of a pixel 3 from the pixel 0.

Figure 50:
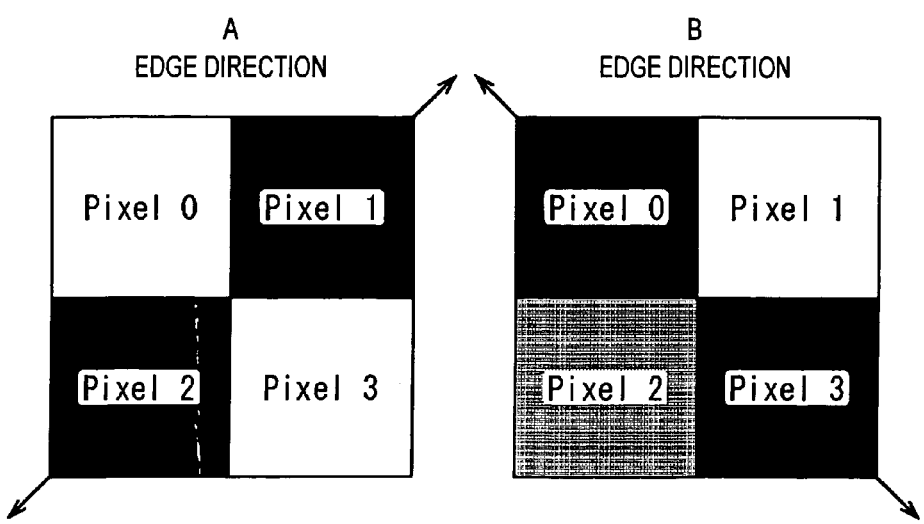
FIG. 50 is a diagram of assistance in explaining right diagonal energy and left diagonal energy at a step 242 and at a step 243 of FIG. 48.

Next, it is determined at step S244 whether or not the pixel value on the left diagonal line is smaller than the pixel value on the right diagonal line. In the case of FIG. 50 A and B, it is determined whether or not the pixel values of the pixel 0 and the pixel 3 are smaller than the pixel values of the pixel 1 and the pixel 2.

If it is determined at the step S244 that the pixel value on the left diagonal line is smaller than the pixel value on the right diagonal line, the process goes to step S245 where it is determined whether or not the left diagonal energy calculated at the step S143 is smaller than the predetermined threshold. If the left diagonal energy is smaller than the threshold, the process moves to step S246 where it is determined whether or not the pixel 2 is smaller than the pixel 1. If the pixel 2 is smaller than the pixel 1, the processing is carried out at step S247 to make the pixel 1 as the average value of the pixel 0 and the pixel 3. If the pixel 2 is not smaller than the pixel 1 (equal to or greater) at the step S246, the process goes to step S248 where processing is carried out to make the pixel 2 as an average value of the pixel 0 and the pixel 3.

FIG. 51A shows a case where as a result of processing at the step S247, the value of pixel 1 is made to be an average value of the pixel 0 and the pixel 3.

If it is determined at the step S245 that the left diagonal energy is equal to or greater than the threshold, the processing from the step S246 to the step 248 will be skipped.

If it is determined at the step S244 that the pixel value on the left diagonal line is not smaller than (if it is determined to equal to or greater) than the pixel value on the right diagonal line, the process moves to step S249 where it is determined whether or not the right diagonal energy calculated at the step S242 is smaller than the predetermined threshold. If the right diagonal energy is smaller than the threshold. The processing goes to step S250 where it is determined whether or not the pixel 3 is smaller than the pixel 0. If the pixel 3 is smaller than the pixel 0, processing is carried out at step S251 to make the pixel 0 as the average value of the pixel 1 and the pixel 3. If the pixel 3 is not smaller than the pixel 0 (equal to or greater) at step S250, the process goes to step S252 where processing is carried out to make the pixel 3 as the average value of the pixel 1 and the pixel 2.

FIG. 51B shows an example if the pixel 3 is made an average value between the pixel 1 and the pixel 2 through the processing at step S252.

If it is determined at the step S249 that the right diagonal energy is not smaller than the threshold, the processing from the step S250 to the step S252 is skipped.

It is possible to strengthen an edge structure by making an edge having a loose connection such as icon and font thicker through the above-mentioned edge connector processing, thereby making it possible to prevent the following thing, which may destroy the edge connectivity, being happen. As shown in FIG. 50A and B, if there is a loose connection having an edge locally only on two diagonal lines, there may cause obvious error in recognizing the edge direction through edge direction calculation processing at the step S95 of FIG. 24 or the edge direction calculation processing at the step S175 of FIG. 40 or the like.

Next, the zoom processing at the step S8 of FIG. 2 will be described. The zoom processing is described in detail in a flowchart of FIG. 52. Processing from step S271 to step S275 is basically similar to that of the high-speed zoom processing from the step 21 to the step S25 in FIG. 11.

Figure 52:
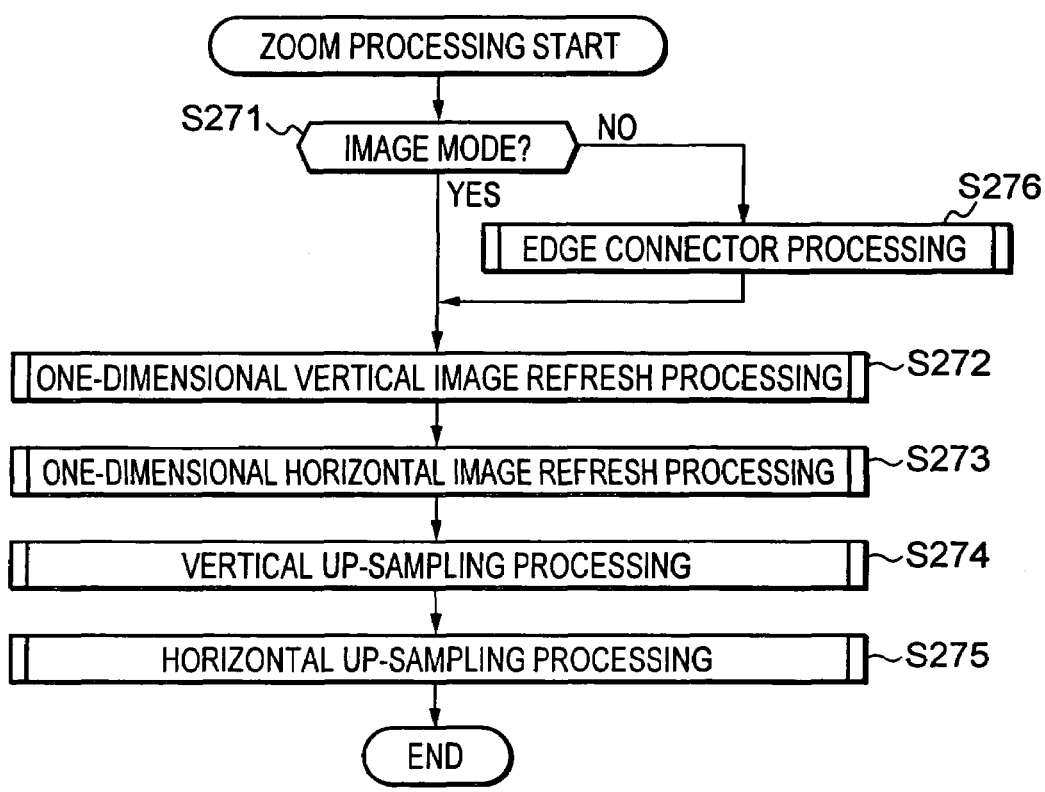
FIG. 52 is a flowchart of assistance in explaining zoom processing at step S8 of FIG. 2.

Since the edge connector processing at step S276 of FIG. 52, the one-dimensional vertical image refresh processing at step S272, and the one-dimensional horizontal image refresh processing at step S273 in FIG. 52 are respectively similar processing to the one-dimensional vertical image refresh processing at the step S22 and the one-dimensional horizontal image refresh processing at the step S23 in FIG. 11, description thereof will be omitted. Only the vertical up-sampling at step S274 and the horizontal up-sampling processing at step S275 will be described as follows.

Figure 53:
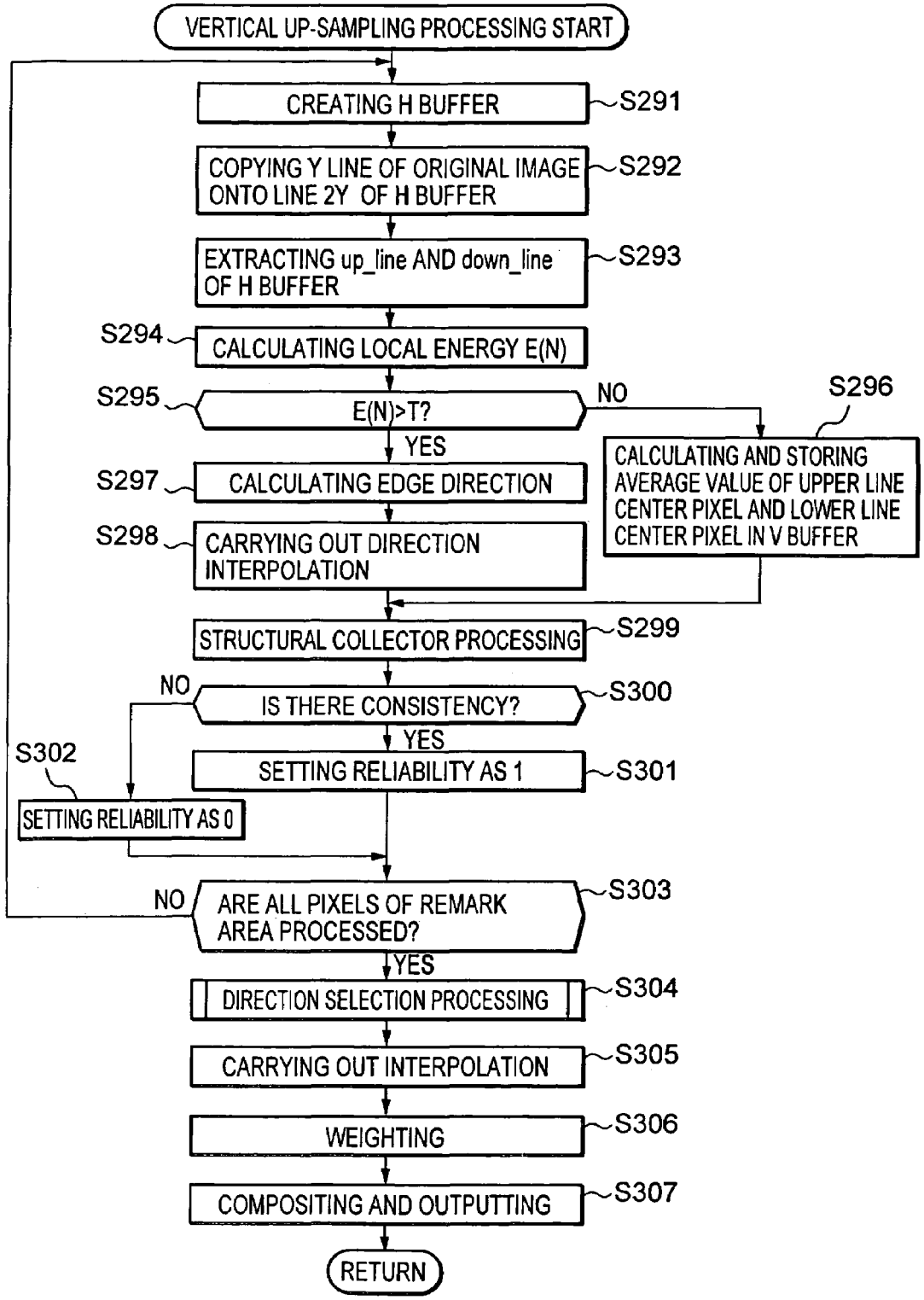
FIG. 53 is a flowchart of assistance in explaining details of vertical up-sampling processing at a step 274 of FIG. 52.

First, the vertical up-sampling processing at the step S274 will be described in detail with reference to a flowchart in FIG. 53. This processing is carried out by the vertical up-sampling processing unit 13.

Figure 54:
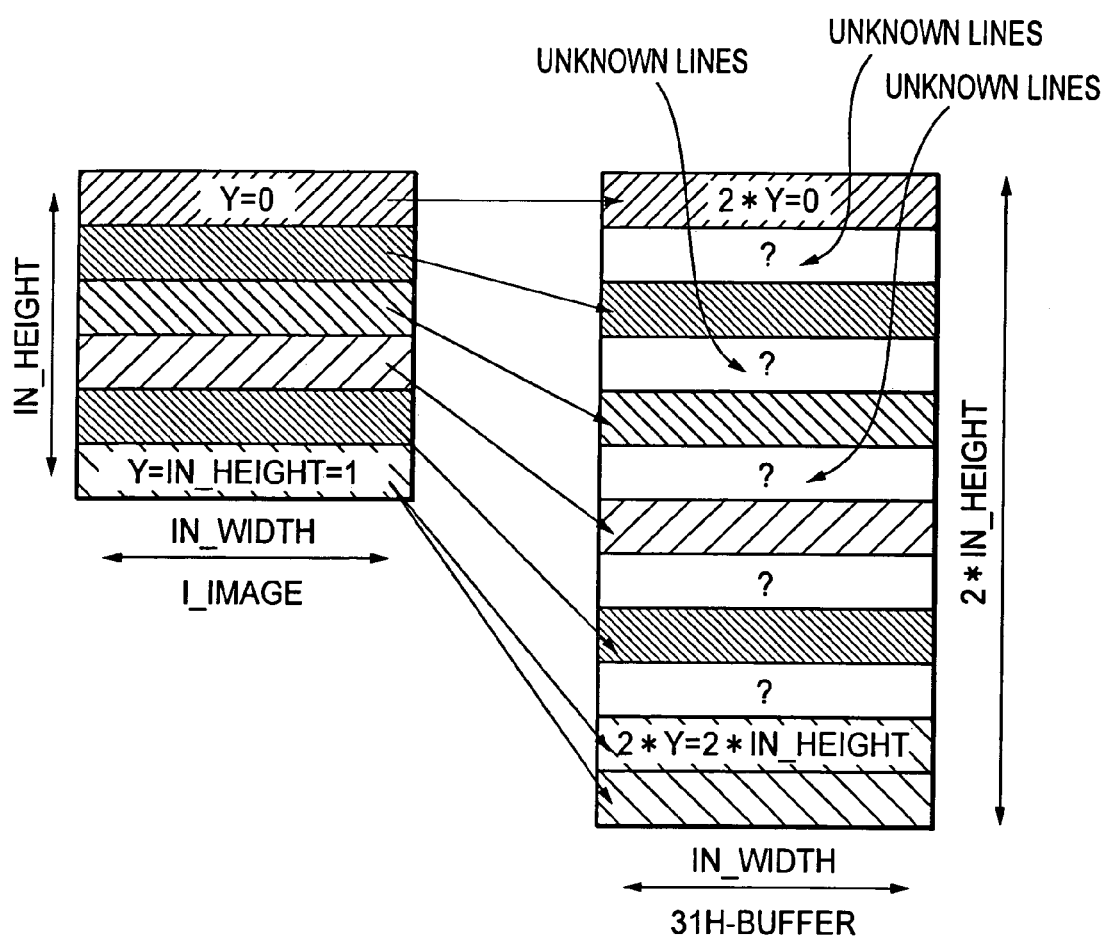
FIG. 54 is a diagram of assistance in explaining vertical up-sampling processing in FIG. 53.

First at step S291, the vertical up-sampler 141 creates an H buffer 31, its size being In_width×(2×In_height). Next, at step S292, the vertical up-sampler 141, as shown in FIG. 54, copies the Y line of the original I_image onto the line 2Y of the H buffer 31. The last line of the original I_image is copied onto the last line of the H buffer 31.

Next, at step S293, the edge detecting unit 122 of the horizontal direction interpolating unit 142 extracts N pixels of an upper line "up_line" and a lower line "down line" in the original I_image. The central coordinate of the upper line "u_line" is (X+N/2, n) while the central coordinates of the lower line "down_line" is (X+N/2, n+1).

Next, at step S294, the edge detecting unit 122 calculates local energy E(N) from the above-mentioned equation (11).

Next, at step S295, the edge detecting unit 122 determines whether or not the local energy E(N) is greater than a predetermined threshold T. If the local energy E(N) is equal to or smaller than the threshold T, such area is considered as a flat, low energy area including no edges. In this case, it is not necessary to calculate the direction of a potential edge. Consequently, the process proceeds to step S296, and the direction interpolating unit 131 calculates an average value of an adjacent up line central pixel "ab-line (N/2)" and an adjacent down line central pixel "down_line (N/2)" as pixel data of coordinate (X+N/2, Y) in the H buffer 31 and stores it in the coordinate (X+N/2, Y) of the H buffer 31, while, outputting directional information indicating the horizontal direction to the reliability ranking unit 124 and the directional distribution generating unit 125. Further, the reliability ranking unit 124 outputs 0, which indicates low reliability concerning this particular interpolated pixel, to the directional distribution generating unit 125. Namely, at step S296, a standard linear interpolation processing is carried out based on the above-mentioned equation (12).

If the value of the local energy E(N) is determined to be greater than the threshold T at the step S295, such area is considered as a high energy area including potential edges. In this case, processing to calculate an edge direction experimentally is carried out at step S297. Specifically, the following calculation is continued from x=N−1 until x becomes greater than −1.

$$\text{Energy}=ABS(\text{up\_line }(N-x-1)-\text{down\_line}(x)) \quad (36)$$

Of the energy values calculated by the above equation (36), the smallest value is selected, and the direction of diagonal lines to which the two pixels correspond is considered as the direction of a local edge.

If an edge direction is detected by the processing of the step S297, further at step S298, the direction interpolating unit 131 carries out interpolation processing (direction interpolation processing to be carried out) by using pixels of the detected edge direction. It means that this direction interpolation processing, based on the pixel values of two pixels corresponding to the edge direction, interpolates pixel values of pixels disposed therebetween.

Next, the process goes to step S299 where the reliability ranking unit 124 carries out structural collector processing. The structural collector processing is processing to check consistency of a renewed local structure (a pixel generated by direction interpolation processing of the step S298 and the pixels thereon and thereunder) by analyzing a relationship between a pixel interpolated on the coordinate (X+N/2, Y) and its adjacent horizontal pixel, that is, between the coordinate up_line(N/2) and the coordinate down_line(N/2).

Namely, in the structural collector processing, processing to subtract pixels that are renewed from the central pixel on the upper line is carried out, and further processing to subtract the central pixel on the lower line from the renewed pixels is carried out. Moreover, two subtraction results thus obtained are multiplied to produce a value V(N/2) expressing a change in the horizontal direction. That is, at the step S299, calculation shown in the following equation is performed.

$$V(N/2)=(\text{up\_line}(N/2)-H\text{-buffer}(X+N/2, Y))\times(H\text{-buffer}(X+N/2, Y)-\text{down\_line}(N/2)) \quad (37)$$

Next, at step S300, the reliability ranking unit 124 determines, based on the result of calculation at the step S299, whether or not there is consistency of the renewed local structure. This determination is made based on whether or not the value V(N/2) calculated by the above equation (37) is positive. If the value V(N/2) is positive, consistency is considered to be present, and at step S301, the reliability ranking unit 124 sets the reliability of the interpolated pixel to 1 and outputs it to the directional distribution generating unit 125.

On the other hand, if the value V(N/2) is determined to be negative at the step S300, consistency is considered to be not present. Namely, judging of the local direction is incorrect, and the pixel value generated at the step S237 is determined to be improper. In this case, the local edge direction is considered beyond judging, and the reliability ranking unit 124 sets the reliability of the interpolated pixel to 0 and outputs it to the directional distribution generating unit 125.

At step S303, it is determined whether or not all the pixels due to be interpolated in the remarked area associated with the remarked pixel are interpolated. If it is determined that all the pixels due to be interpolated in the remarked A area are not interpolated, the processing returns to the step S291 where the processing from the steps S291 to S303 is repeated until all pixels due to be interpolated are interpolated; and if it is determined in step S303 that all the pixels due to be interpolated are interpolated, the process goes to step S304. The remarked area associated with the remarked pixel means, for example, the interpolated pixels in the range of P(number of pixels)×M(lines) shown in FIG. 28, and direction selection processing is carried out at the step S304. It should be noted that direction selection processing at the step S304 is similar to the processing described at the step S102 with reference to the flowchart of FIG. 24, hence, its description will be omitted.

At step S305, the linear interpolating unit 127 obtains the average pixel value between the pixels present above and below the horizontal direction relative to the remarked pixel as the linear interpolated pixel and outputs the average value to the compositing unit 130, while, at the same time, the slant interpolating unit 128 outputs to the compositing unit an average pixel value between the pixels present on the selected direction inputted by the direction selecting unit 126 as the slant interpolated pixel value.

At step S306, the slant weighting unit 129 sets a slant weight "weigh_slant(X,Y)" in the slant direction of the remarked pixel (X, Y) according to the above-mentioned equation (19) and outputs it to the compositing unit 130.

At step S307, the compositing unit 105 calculates the above-mentioned equation (20), weights the linear interpolated pixel inputted by the linear interpolating unit 127 and the slant interpolated pixel for composition, and outputs the result as the interpolated pixel.

Figure 55:
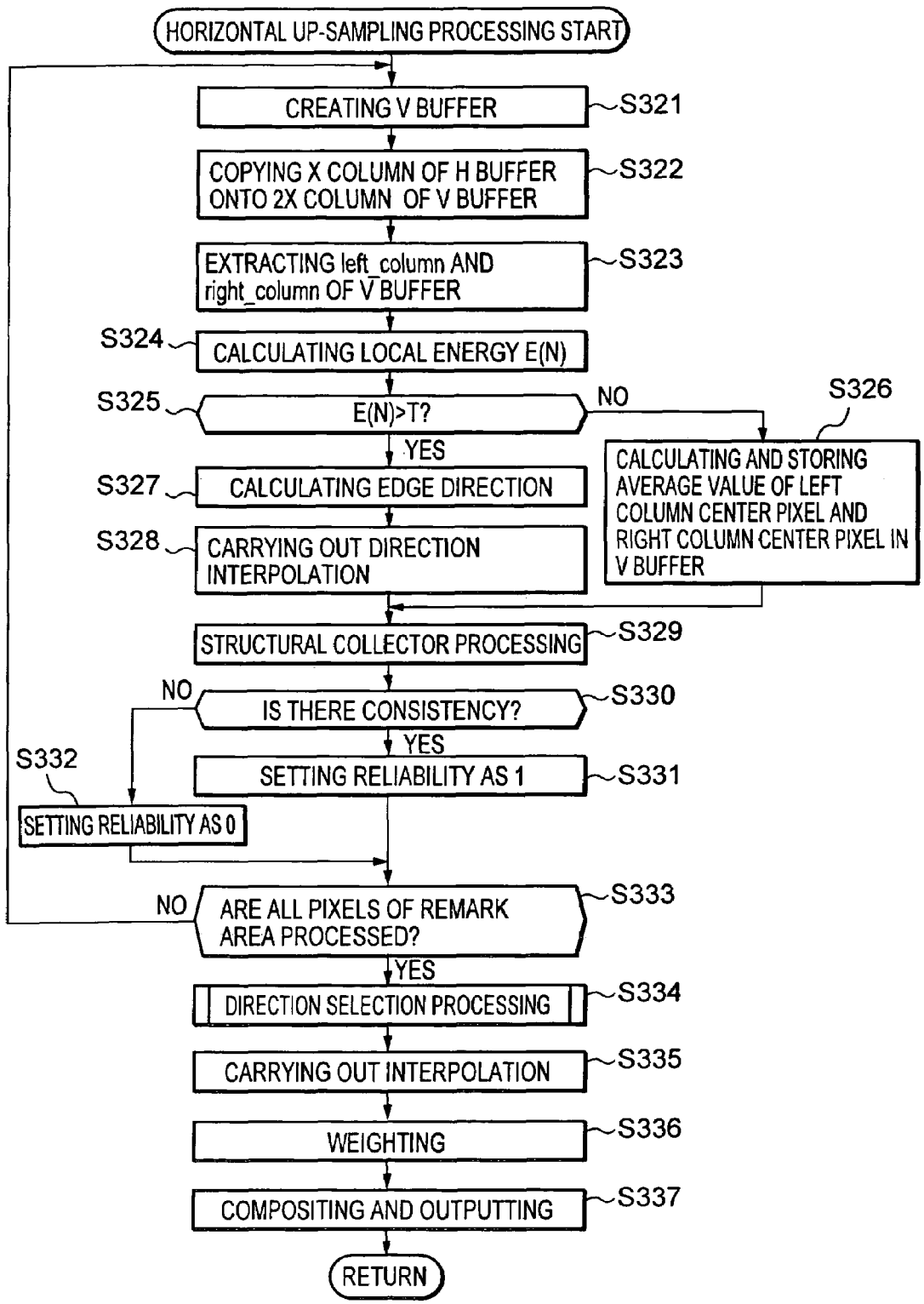
FIG. 55 is a flowchart of assistance in explaining horizontal up-sampling processing at a step 275 of FIG. 52.

FIG. 55 describes in detail horizontal up-sampling processing at the step S275 of FIG. 52. This processing is carried out by the horizontal up-sampling processing unit 15.

First at step S321, the horizontal up-sampler 141 creates a V buffer 51, its size being 2×In_width×2×In_height. At step S322, the horizontal up-sampler 141 copies an X column of the H buffer 31 onto a column 2X of the V buffer 51. The X value is greater than −1 and smaller than In_width.

Next, at step S323, the edge detecting unit 122 of the vertical direction interpolating unit 162 extracts a left column "left_column" and a right column "right_column" of the H buffer 31. The central coordinate of the left column "left_column" is (n, X+N/2) while the central coordinate of the right column "right column" is (n+1, X+N/2).

Next, at step S324, the edge detecting unit 122 obtains local energy E(N) by subtracting pixels of the right column "right_column" disposed on the diagonal line from individual pixels of the left column "left_column", and calculates a sum of absolute values. Namely, the above-mentioned equation (24) is used for calculation in this processing.

Next, at step S325, it is determined whether or not the local energy E(N) is greater than a predetermined threshold T. If the local energy E(N) is equal to or smaller than the threshold T, such area is considered as a flat, low energy area including no edges. In this case, it is not necessary to calculate the direction of a potential edge. Consequently, the process proceeds to step S326, and standard linear interpolation processing is carried out. Namely, as shown in the above-mentioned equation (25), a pixel value of a new pixel (X+N/2, Y) is calculated from an average value of an adjacent left column central pixel "left_column(N/2)" and an adjacent right column central pixel "right column (N/2)".

At step S325, if it is determined that the energy E(N) is greater than the threshold T, such area is considered to be a high energy area including edges potentially. In this case, the area is considered as a high energy area including edges, and the process goes to step S327 where edge direction calculation processing is carried out.

Energy=$ABS$(left_column($N-x-1$)−right_column($x$))  (38)

The above calculation performs a sequential decrement of x from x=N−1 and continues as long as x is greater than −1.

A direction of a diagonal line of a pixel corresponding to the least value of the calculated energy is determined to be a local edge direction.

In the processing of step S327, if the edge direction is determined, further at step S328, the direction interpolating unit 131 carries out interpolation processing (direction interpolation processing to be carried out) by calculating an average value of two pixels in the edge direction determined at the step S327.

Next, at step S329, structural collector processing is carried out. Namely, by analyzing a relationship among a pixel interpolated onto the coordinates (X, Y+N/2) in the V buffer 51, a pixel of the coordinate left-column (N/2) which is a proximity pixel in the horizontal direction thereof, and a pixel of the coordinate right_column (N/2), the processing to check the consistency of the local structure is carried out. Consequently, according to the following equation, the interpolated pixel is subtracted from the central pixel of the left column, and the central pixel of the right column is subtracted from the interpolated pixel to obtain two results of subtraction, and these two results of subtraction are multiplied, thereby calculating a value H(N/2) indicating a change in the horizontal direction.

$$H(N/2) = (\text{left\_column}(N/2) - \text{V-buffer}(X + N/2, Y)) \times (\text{V-buffer}(X + N/2, Y) - \text{right\_column}(N/2)) \quad (39)$$

It is determined at step S330, based on the value (H(N/2)) calculated at the step S329, whether or not there is consistency in the interpolated local structure. Specifically, it is determined whether the value H(N/2) is positive or negative. If the value H(N/2) is positive, the pixel obtained in the direction interpolation processing of the step S328 is considered correct (consistent), and at step S331, the reliability of the interpolated pixel is set to 1 and outputted to the directional distribution generating unit 125.

If the value H(N/2) is determined to be negative (inconsistent, that is, if it is determined that the pixel value generated in the direction interpolation processing of the step S328 is not proper) at the step S330, the process goes to step S180, and the reliability ranking unit 124 set the reliability of the interpolated pixel to 0 and outputs it to the directional distribution generating unit 125.

It is determined at step S333 whether or not all the pixels due to be interpolated in the remarked area associated with the remarked pixel are interpolated. If it is determined that all the pixels due to be interpolated in the remarked A area are not interpolated, the processing returns to the step S321 where the processing from the steps S321 to S333 is repeated until all the pixels due to be interpolated are interpolated; and if it is determined at the step S333 that all the pixels due to be interpolated in the remarked A area are interpolated, the process goes to step S334.

Figure 42:
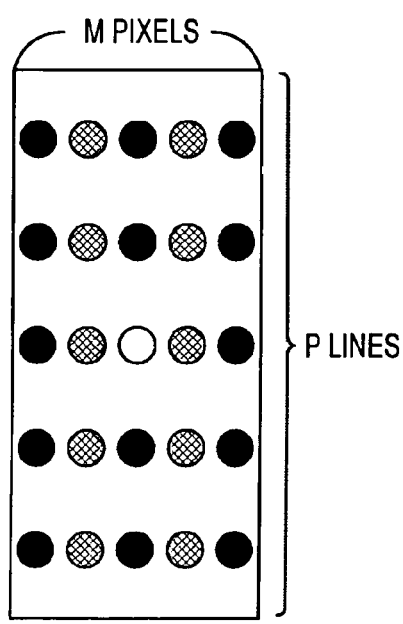
FIG. 42 is a diagram of assistance in explaining a remarked pixel.

In this context, the remarked area associated with the remarked pixel means, for example, the pixels due to be interpolated in the range of M(number of pixels)×P(lines) as shown in FIG. 42, and direction selection processing is carried out at the step S334. It should be noted that since the direction selection processing at the step S334 is similar to the processing at the step S182 described with reference to the flowchart of FIG. 40, its description will be omitted.

At step S335, the linear interpolating unit 127 obtains an average pixel value between the pixels present at the left and the right on the horizontal direction relative to the remarked pixel as the linear interpolated pixel and outputs the average pixel value to the compositing unit 130, while, at the same time, the slant interpolating unit 128 outputs an average pixel value between the pixels present on the selected direction inputted by the direction selecting unit 126 as the slant interpolated pixel value to the compositing unit.

At step S336, the slant weighting unit 129 sets a weight "weight_slant(X,Y)" in the slant direction of the remarked pixel (X,Y) as shown in the above-mentioned equation (19) and outputs it to the compositing unit 130.

At step S337, the compositing unit 130 calculates the above-mentioned equation (20), weights the linear interpolated pixel inputted by the linear interpolating unit 127 and the slant interpolated pixel for composition, and outputs the results as the interpolated pixel.

Figure 56:
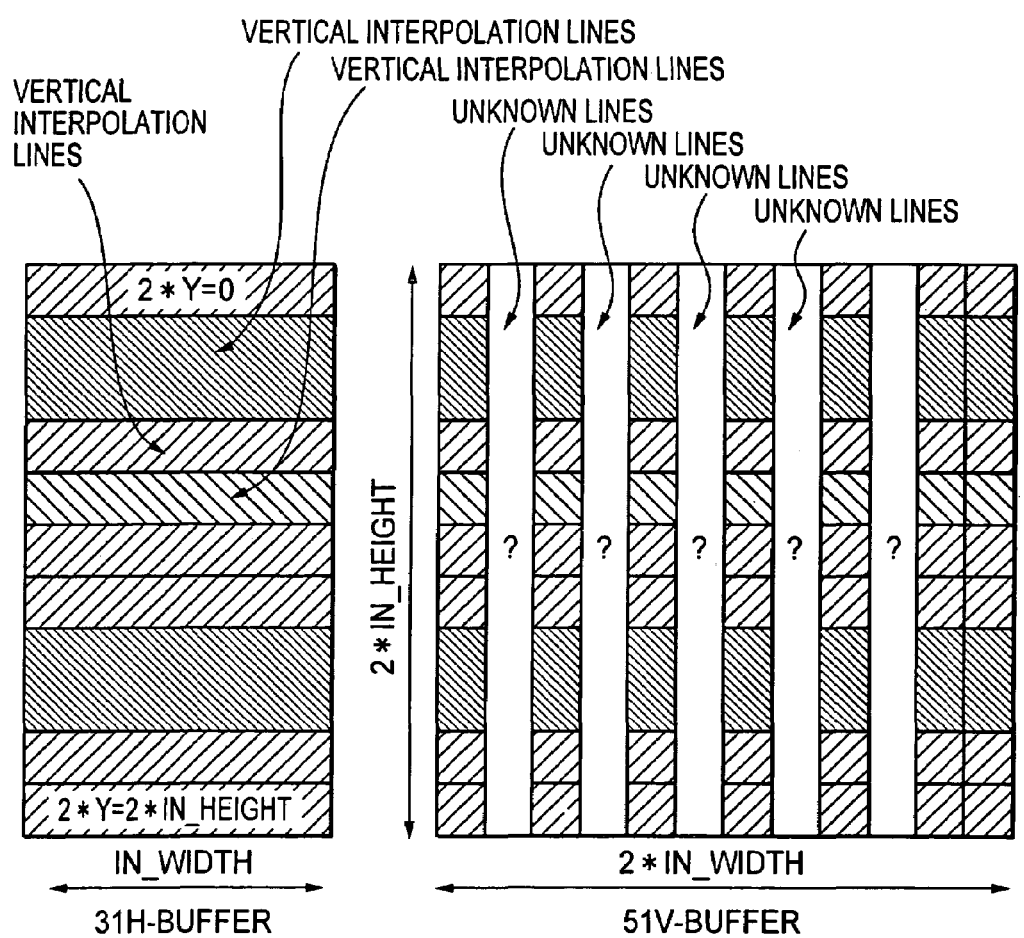
FIG. 56 is a diagram of assistance in explaining horizontal up-sampling processing in FIG. 55.

FIG. 56 is a conceptual representation of horizontal up-sampling in FIG. 55 mentioned above. As shown in the drawing, data on the X column of the H buffer 31 is copied onto the 2X column of the V buffer 51, and the column data in between is interpolated.

As mentioned above, it is possible to change the resolution of an image by any magnification. In this case, for example, if enlarging the image 6 times, the zoom processing is repeated 2 times, and after obtaining a 4-time enlarged image, a 3/2 times high-speed zoom processing may be carried out; or the zoom processing is repeated 3 times, and after obtaining an 8-time enlarged image, a 3/4 linear reduction processing may be carried out.

Figure 12:
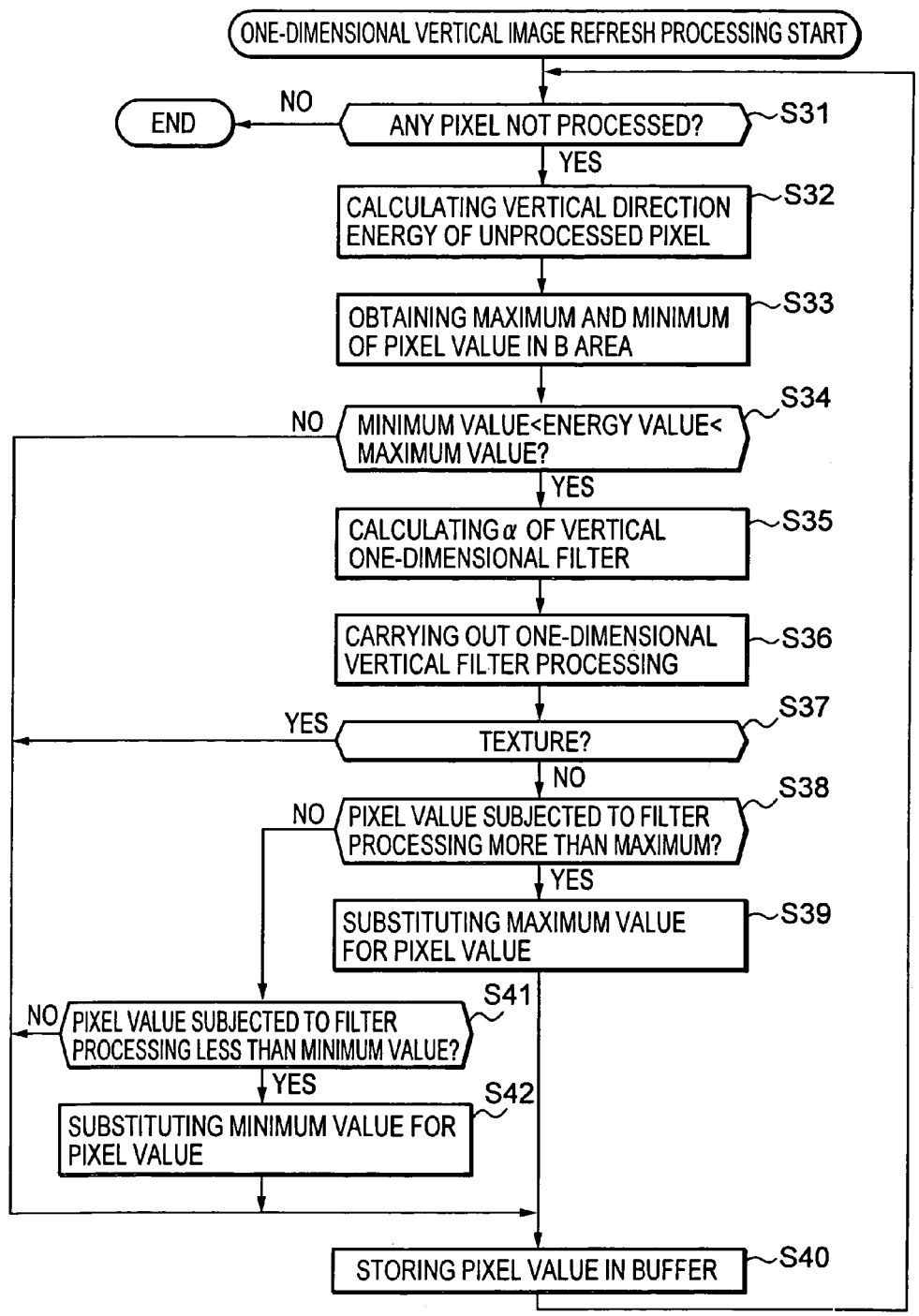
FIG. 12 is a flowchart of assistance in explaining one-dimensional vertical image refresh processing at a step 22 of FIG. 11.

Further, as explained flowcharts of FIG. 12 and FIG. 16, it is possible to separate processing contents and apply appropriate processing for each separated content. The one-dimensional vertical image refresh processing and the one-dimensional horizontal image refresh processing recognize the edges from the texture, and perform the filter processing and the clipping processing to the edges, while perform only the filter processing to the texture.

Still further, as mentioned above and shown in FIG. 10 or FIG. 52, in the high-speed zoom processing or the zoom processing, the execution of the one-dimensional vertical image refresh processing and the one-dimensional horizontal image refresh processing prior to performing the vertical up-sampling processing and the horizontal up-sampling processing makes it possible for the one-dimensional vertical image refresh processing and the one-dimensional horizontal image refresh processing to be accomplished only by carrying out processing with the number of pixels of the original image before the number of pixels is expanded. Accordingly, it is not necessary to correspond the number of filter taps of the one-dimensional vertical filter and the one-dimensional horizontal filter as shown in FIG. 14, FIG. 15, FIG. 18, and FIG. 19 to the number of pixels after the expansion processing, thereby enabling the amount of calculation processing to be reduced to that extent. Realization of higher speed processing is thus made possible.

Furthermore, since the coefficient α of the one-dimensional vertical filter and the one-dimensional horizontal filer dynamically corresponds to changes in the values of the vertical central pixel energy EV and the horizontal central pixel energy EH, it becomes possible to appropriately change the intensity of the enhancement processing for the edge or texture.

Moreover, as described with reference to flowcharts in FIG. 24, FIG. 40, FIG. 53, and FIG. 55, by using the directional distribution, the direction to be used in the direction interpolation may be accurately determined. In addition, a pixel value obtained by the slant interpolation determined by the directional distribution and a pixel value processed with the linear interpolation are subjected to the weighting based on the directional distribution for composition and the linear summation thereof to generate the interpolated pixel, thereby enabling the pixel value to be accurately interpolated.

Figure 57:
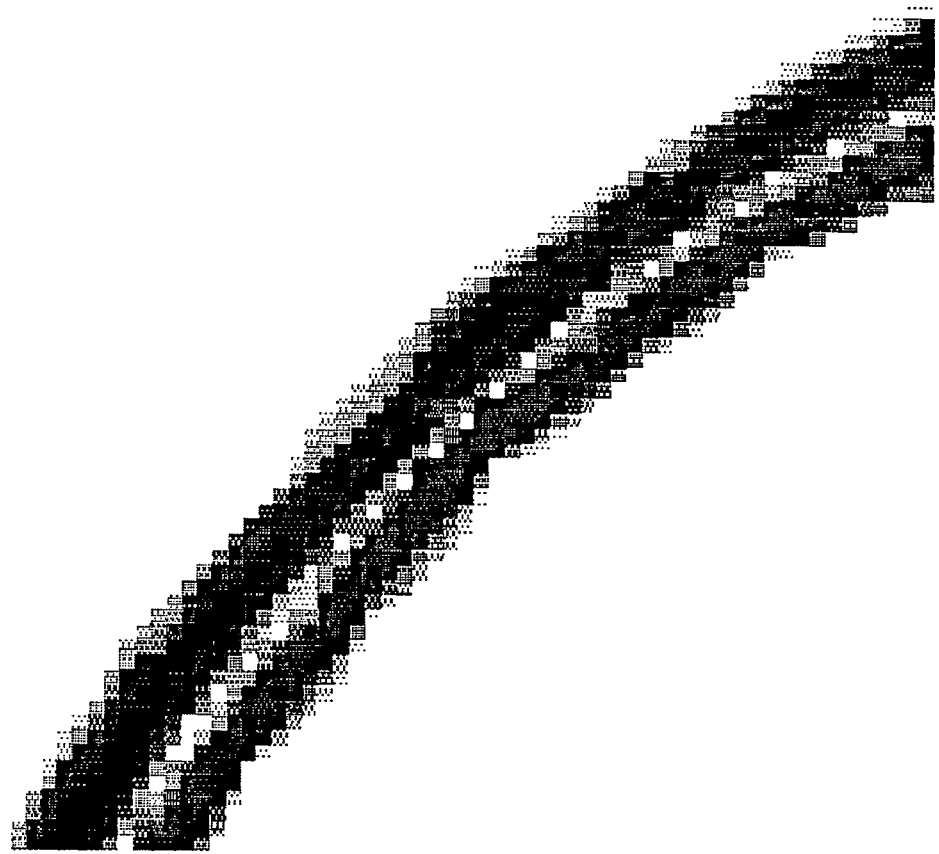
FIG. 57 is a diagram of an image whose resolution is converted by a conventional resolution conversion system.
Figure 58:
FIG. 58 is a diagram of an image whose resolution is converted by a resolution conversion system to which the present invention is applied.

As a result, it is possible to suppress errors observed in the image produced by converting the image resolution, so that a clear converted image may be generated. FIG. 57 shows an image subjected to resolution conversion according to the conventional technique (technique utilizing an invention of which application is filed as Japanese Patent Application 2001-201729). FIG. 58 is an image whose resolution has been converted by using the technique of the present invention.

The two figures are images both showing two uniform curves. The image in FIG. 58 has the thickness of two curves more uniformly expressed than the image of FIG. 57, thus generating a clearer image. Namely, according to the present invention, since the errors due to resolution conversion are suppressed, images of clear resolution conversion may be generated.

It should be noted that in the above-mentioned examples, description has been provided with respect to the cases of expanding respectively in the horizontal direction and in the vertical direction. However, it may be so arranged that expansion is made only in one of the directions. At this time, processing to expand only in the vertical direction will be the same processing as so-called IP conversion where a conversion is made from an interlace image to a progressive image. In other words, the present invention is also applicable to the IP conversion. In actual processing, it may be set as processing if the expansion rate of either the horizontal direction or the vertical direction in the above-mentioned processing is set to 1, or the processing may be realized by skipping either processing in the horizontal direction or vertical direction. Accordingly, description thereof is omitted.

Figure 59:
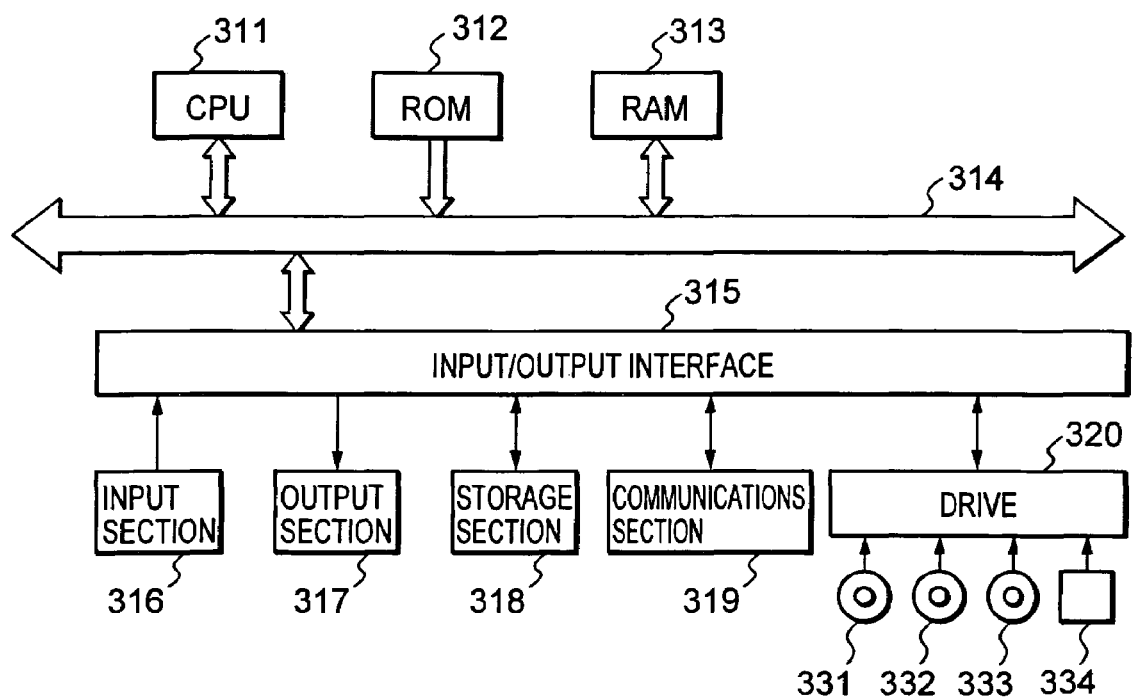
FIG. 59 is a block diagram of a hardware configuration of an image processing apparatus in FIG. 1.

FIG. 59 shows a hardware configuration of the image processing apparatus 2 having functional blocks as shown in FIG. 1. A CPU (Central Processing Unit) 311 executes various processing according to programs stored in a ROM (Read Only Memory) 312 or a program loaded from a storage section 318 to a RAM (Random Access Memory) 313. Data necessary for the CPU 311 to execute various processing and the like may be stored, as necessary, in the RAM 313.

The CPU 311, the ROM 312, and the RAM 313 are mutually connected via a bus 314. Further, to the bus 314 is connected an input/output interface 315.

To the input/output interface 315, there are connected an input section 316 including a keyboard, mouse and the like, a display including a CRT, an LCD and the like, an output section 317 including a speaker and the like, a storage section 318 including a hard disc and the like, and a communications section 319 including a modem, a terminal adapter and the like. The communications section 319 performs communications processing via a network as represented by the Internet and the like.

The input/output interface 315 may be connected with a drive 320, as necessary, so that a magnetic disc 331, an optical disc 332, a magneto-optical disc 333 or a semiconductor memory 334 is properly connected thereto, a computer program read therefrom being installed in the storage section 318, as necessary.

A series of processing mentioned above may be executed by means of hardware equipment but may also be executed by software. If executing a series of processing by software, programs constituting such a software are installed into a computer, which may be built-in to hardware of exclusive use, or a general-purpose personal computer, which is capable of executing various functions. Such programs may be installed onto the computers from a network and a recording medium.

The recording medium as shown in FIG. 59 is constituted by not only a package medium including the magnetic disc 331 (including a flexible disc), the optical disc 332 (CD-ROM (Compact Disc-Read Only Memory)), a DVD (including a Digital Versatile Disc)), the magneto-optical disc 333 (including an MD(Mini-Disc)), the semiconductor memory 334 or the like, in which a program is recorded and which is distributed to the user to provide the program separately from the computer, but also a ROM 312 in which a program is recorded and which is provided to the user as being built therein, and a hard disc as included in the storage section 318.

It is to be noted that in the present specification, the steps describing the program recorded on a recording medium naturally encompass not only processing steps to be carried out in time series in the described order, but also processing steps that are carried out in parallel or individually and not necessarily in the time series as described above.

As mentioned above, the apparatus and the method, and the program for image processing according to the present invention make it possible to have an accurate grasp of a direction of an edge portion including a pixel to be interpolated, and, further, to generate a more accurate interpolated pixel.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus for converting a spatial resolution of an original image so as to respectively multiply Z times either in a vertical direction or a horizontal direction or both directions, the image processing apparatus comprising:

an energy calculating unit configured to calculate a central pixel energy at a pixel position of interest;

an edge enhancement unit configured to enhance an edge based on the central pixel energy calculated by the energy calculating unit;

an edge direction detecting unit configured to detect a direction of the edge enhanced by the edge enhancement unit;

a linear interpolation unit configured to interpolate a linear interpolated pixel at the pixel position of interest by linear interpolation;

a selected direction interpolating unit configured to interpolate a selected direction interpolated pixel in a selected direction at the pixel position of interest based on the edge direction detected by the edge direction detecting unit, and a compositing and interpolating unit configured to interpolate a composition interpolated pixel by compositing the linear interpolated pixel and the selected direction interpolated pixel.

* * * * *